US010768927B2

(12) United States Patent
Yamaguchi et al.

(10) Patent No.: US 10,768,927 B2
(45) Date of Patent: Sep. 8, 2020

(54) MANAGEMENT SYSTEM AND MANAGEMENT METHOD

(71) Applicant: Hitachi, Ltd., Tokyo (JP)

(72) Inventors: Hiroaki Yamaguchi, Tokyo (JP); Yuma Tanahashi, Tokyo (JP); Masashi Nakaoka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 260 days.

(21) Appl. No.: 15/760,700

(22) PCT Filed: Jul. 14, 2016

(86) PCT No.: PCT/JP2016/070912
§ 371 (c)(1),
(2) Date: Mar. 16, 2018

(87) PCT Pub. No.: WO2018/011959
PCT Pub. Date: Jan. 18, 2018

(65) Prior Publication Data
US 2018/0260213 A1 Sep. 13, 2018

(51) Int. Cl.
*G06F 8/71* (2018.01)
*G06F 9/44* (2018.01)
(Continued)

(52) U.S. Cl.
CPC .................. *G06F 8/71* (2013.01); *G06F 8/64* (2013.01); *G06F 8/65* (2013.01); *G06F 9/44* (2013.01); *G06F 11/00* (2013.01); *G06F 3/048* (2013.01)

(58) Field of Classification Search
None
See application file for complete search history.

(56) References Cited

U.S. PATENT DOCUMENTS

2002/0103973 A1* 8/2002 Zimniewicz .............. G06F 8/61
711/119
2003/0120688 A1* 6/2003 Hill ........................... G06F 8/71
(Continued)

FOREIGN PATENT DOCUMENTS

WO 2013/140609 A1 9/2013
WO 2013/179469 A1 12/2013
(Continued)

OTHER PUBLICATIONS

International Search Report of PCT/JP2016/070912 dated Sep. 20, 2016.

*Primary Examiner* — Daxin Wu
(74) *Attorney, Agent, or Firm* — Mattingly & Malur, PC

(57) ABSTRACT

A management system and management method for facilitating resetting of necessary properties along with a version upgrade of a component are proposed. The management system and management method are designed to: update a version of a target component associated with a designated service template or its duplicate in response to a version upgrade request which designates a service template; estimate possible configurations as a post-reset configuration caused by the version upgrade of the target component with respect to each property group including properties associated with the version-upgraded target component, from among property groups of the designated service template or its duplicate; search for a property group having any of the estimated configurations from among property groups of a service template other than the designated service template or its duplicate; and display setting content of the property group detected by the search.

10 Claims, 45 Drawing Sheets

(51) Int. Cl.

| | |
|---|---|
| ***G06F 11/00*** | (2006.01) |
| ***G06F 8/61*** | (2018.01) |
| ***G06F 8/65*** | (2018.01) |
| *G06F 3/048* | (2013.01) |

(56) References Cited

U.S. PATENT DOCUMENTS

| | | | | |
|---|---|---|---|---|
| 2006/0150178 | A1* | 7/2006 | Jerrard-Dunne .......... | G06F 8/71 717/168 |
| 2008/0051921 | A1* | 2/2008 | Nammatsu ............. | G06Q 10/06 700/97 |
| 2008/0301626 | A1* | 12/2008 | Sivaram .................... | G06F 8/10 717/104 |
| 2010/0083211 | A1* | 4/2010 | Poole ........................ | G06F 8/71 717/101 |
| 2014/0089505 | A1* | 3/2014 | Haserodt ................. | H04L 67/34 709/225 |
| 2014/0149358 | A1* | 5/2014 | Aphale ............... | G06F 11/1458 707/654 |
| 2014/0317515 | A1 | 10/2014 | Suda | |
| 2015/0081874 | A1 | 3/2015 | Sawada et al. | |
| 2015/0149990 | A1* | 5/2015 | Nakamura ................ | G06F 8/65 717/171 |
| 2016/0004528 | A1* | 1/2016 | Price ......................... | G06F 8/65 717/173 |
| 2017/0004007 | A1 | 1/2017 | Kousaka et al. | |
| 2017/0161053 | A1 | 6/2017 | Hayakawa et al. | |

FOREIGN PATENT DOCUMENTS

| | | | |
|---|---|---|---|
| WO | 2016084255 | A1 | 6/2016 |
| WO | 2016/113913 | A1 | 7/2016 |

* cited by examiner

Component Management Table 421

| # | Component Name | Version | Executable File Path | Component uk |
|---|---|---|---|---|
| 1 | Provisioning volume | 01.00.00 | C:¥HCSA¥ProvisioningVolume ¥010000¥・・・.bat | 1 |
| 2 | Provisioning volume | 01.10.00 | C:¥HCSA¥ProvisioningVolume ¥011000¥・・・.bat | 2 |
| 3 | Create pair volume | 01.00.00 | C:¥HCSA¥CreatePairVolume ¥010000¥・・・.bat | 3 |
| 4 | ・・・ | ・・・ | ・・・ | ・・・ |

FIG.7

Component Property Management Table 422

| # (701) | Component uk (702) | Display Name (703) | Key Name (704) | Initial Value (705) | Input-Output Type (706) | Property Group (707) | Custom UI Generation Information (708) | Component Property uk (709) |
|---|---|---|---|---|---|---|---|---|
| 1 | 1 | HostName | storage.host.name | Null | In | Host Group | List | 1 |
| 2 | 1 | Number ofVolume | storage.number | Null | In | Volume usage Group | Integer | 2 |
| 3 | 1 | Volume Capacity | storage.capacity | 10GB | In | Volume usage Group | Unit List | 3 |
| 4 | 1 | Nunber of path | storage.number | 2 | In | Host Group | Integer | 4 |
| 5 | 1 | Volume uk | storage.volume.uk | Null | Out | Null | Null | 5 |
| 6 | 1 | Path info | storage.path.info | Null | Out | Null | Null | 6 |
| 7 | 2 | HostName | storage.host.name | Null | In | Host Group | List | 7 |
| 8 | 2 | Volume uk | storage.volume.uk | Null | In | Volume usage Group | Integer | 8 |
| 9 | 2 | Path info | storage..path.info | Null | In | Path Info Group | Text Field | 9 |
| ... | ... | ... | ... | ... | ... | ... | ... | ... |

FIG.8

ST Management Table 423

| 801 # | 802 ST Name | 803 ST Version | 804 ST uk | 805 Flow uk | 806 ST Type |
|---|---|---|---|---|---|
| 1 | Provisioning & pair | 01.00.00 | 1 | 1 | Release |
| 2 | Provisioning & pair | 01.10.00 | 2 | 2 | Debug |
| 3 | provisioning | 01.00.00 | 3 | 3 | Release |
| ... | ... | ... | ... | ... | ... |

FIG.9

Flow Management Table 424

| # (901) | Flow uk (902) | Configuration Component uk List (903) | Property Mapping List (904) |
|---|---|---|---|
| 1 | 1 | 1, 2 | {Service Property uk(1)=Component uk(1).storagehost.name},{Service Property uk(2)=Component uk(2).storage.volume.uk},{Component uk(1).storage.pathinfo=Component uk(2).storage.pathinfo};• • |
| 2 | 2 | 1 | {Service Property uk(8)=Component uk(1).storagehost.name},{Service Property uk(9)=Component uk(1).storage.volume.uk},• • • |
| 3 | 3 | 2 | Null |
| … | … | … | … |

FIG.10

ST Property Management Table 425

| # (1001) | ST uk (1002) | ST Property uk (1003) | Display Name (1004) | Key Name (1005) | Input-Output Type (1006) | Property Group (1007) | Custom UI Generation Information (1008) | Property Group uk (1009) |
|---|---|---|---|---|---|---|---|---|
| 1 | 1 | 1 | HostName | service1.host.name | In | Host Group | List | 1 |
| 2 | 1 | 2 | Number of Volume | service1.volume.number | In | Volume usage Group | Integer | 1 |
| 3 | 1 | 3 | Volume Capacity | service1.volume.capacity | In | Volume usage Group | Unit List | 1 |
| 4 | 1 | 4 | Number of path | service1.path.number | In | Path info Group | Integer | 2 |
| 5 | 1 | 5 | Number of Path Generations | service1.pair.generation.number | In | Path info Group | Integer | 2 |
| 6 | 1 | 6 | Volume uk | service1.volume.uk | Out | Null | Null | 2 |
| 7 | 1 | 7 | Path info | service1.path.info | Out | Null | Null | 3 |
| ... | ... | ... | ... | ... | ... | ... | ... | ... |

FIG.11

Service Management Table 426

| # (1101) | Service Name (1102) | Service Description (1103) | ST uk (1104) | Service uk (1105) |
|---|---|---|---|---|
| 1 | execute Provisioning & pair | Provisioning volume and then create pair volume | 1 | 1 |
| 2 | execute Provisioning & pair 2 | Provisioning volume and then create pair volume | 1 | 2 |
| 3 | execute provisioning | Provisioning volume | 3 | 3 |
| 4 | ... | ... | ... | ... |

FIG.12

Service Property Setting Table 427

| # (1201) | Property Set Value (1202) | Service Template Property uk (1203) | Service uk (1204) |
|---|---|---|---|
| 1 | STORAGEHOST | 1 | 1 |
| 2 | 1 | 2 | 1 |
| 3 | 20 | 3 | 1 |
| 4 | Null | 4 | 1 |
| 5 | 2 | 5 | 1 |
| 6 | STORAGEHOST2 | 1 | 2 |
| 7 | 2 | 2 | 2 |
| 8 | ... | ... | ... |

FIG.19

Step Management Table 428

| # (1901) | Outdated ST uk (1902) | Outdated ST version (1903) | Step name (1904) | Current component name (1905) | Current version (1906) | Latest component name (1907) | Latest version (1908) | Status (1909) |
|---|---|---|---|---|---|---|---|---|
| 1 | 1 | 001 | Host Name | Host Name | 001 | Host Name | 002 | Applied |
| 2 | 1 | 001 | Volume Capacity | Volume Capacity | 001 | Volume Capacity | 002 | Not applied |
| ... | ... | ... | ... | ... | ... | ... | ... | ... |

FIG.38

Property Group Management Table 429

3801 3802 3803 3804

| # | Property Group uk | Property Group Name | ST uk |
|---|---|---|---|
| 1 | 1 | hostGroup | 1 |
| 2 | 2 | volumeUsageGroup | 1 |
| 3 | 3 | PairGroup | 1 |
| 4 | 4 | PairUsageGroup | 2 |
| ... | ... | ... | ... |

FIG.39

Property Mapping Management Table 430

| # (3901) | Property Mapping uk (3902) | Mapping Source STP uk (3903) | Mapping Source CP uk (3904) | Mapping Destination STP uk (3905) | Mapping Destination CP uk (3906) |
|---|---|---|---|---|---|
| 1 | 1 | 1 | Null | Null | 2 |
| 2 | 2 | 2 | Null | Null | null |
| 3 | 3 | 3 | Null | Null | 5 |
| 4 | 4 | Null | null | null | 6 |
| 5 | 5 | 4 | null | null | 7 |
| 6 | 6 | 5 | null | null | 8 |
| ... | ... | ... | ... | ... | ... |

FIG.40

Pre-Component-VUP Property Mapping Management Table 431

| # (4001) | Property Mapping uk (4002) | Mapping Source STP uk (4003) | Mapping Source CP uk (4004) | Mapping Destination STP uk (4005) | Mapping Destination CP uk (4006) |
|---|---|---|---|---|---|
| 1 | 1 | 1 | Null | Null | 1 |
| 2 | 2 | 2 | Null | Null | 3 |
| 3 | 3 | 3 | Null | Null | 4 |
| 4 | 5 | 4 | Null | Null | 7 |
| 5 | 6 | 5 | Null | Null | 8 |
| ... | ... | ... | ... | ... | ... |

FIG.42

Component Property Difference Table 4200

| Pre-VUP Component uk (4201) | Post-VUP Component uk (4202) | Difference Component Property uk (4203) | Difference Type (4204) | Related Property Group uk (4205) | Related ST Property uk (4206) |
|---|---|---|---|---|---|
| 1 | 2 | 3 | Property Deletion | 2 | 2 |
| 3 | 4 | 6 | Property Addition | Null | Null |

FIG.43

Search Property Group Configuration Management Table 4300

| Property Group uk (4301) | Related Component Property uk List (4302) | Related ST Property uk List (4303) | Property Group Configuration Correction Information (4304) |
|---|---|---|---|
| 1 | 2,7 | 1,4 | Null |
| 3 | 5 | 3 | Null |
| 2 | 8 | 5 | Property Deletion |
| 1 | 2,7,6 | 1,4,0 | Property Addition |
| 2 | 8,6 | 5,0 | Property Addition |
| 3 | 5,6 | 3,0 | Property Addition |
| 0 | 6 | 0 | Property Addition |

FIG.44

Search Target Property Group Configuration Management Table 4400

| Property Group uk (4401) | Related Component Property uk List (4402) | ST Property uk List (4403) |
|---|---|---|
| 4 | 9,10 | 7,8 |
| 5 | 2,7 | 9,10 |
| 6 | 8 | 11 |
| 7 | 8,6 | 13,14 |
| 8 | 6 | 15 |

FIG.45

Search Result Table 4500

| Property Group uk (4501) | Matched Property Group Configuration Property Group List (4502) | Unnecessary-ST-Property-Deleted Property Group Configuration List (4503) | Necessary-ST-Property-Added Property Group Configuration List (4504) |
|---|---|---|---|
| 1 | 5 | Null | Null |
| 2 | Null | 2 | 7 |
| 0 | Null | Null | 8 |

MANAGEMENT SYSTEM AND MANAGEMENT METHOD

TECHNICAL FIELD

The present invention generally relates to a technique for automating the operation of an operation target apparatus.

BACKGROUND ART

The scale of computer systems has been expanded greatly in recent years; and accordingly, more time and effort-consuming tasks are required to configure a computer system and operate target apparatuses to be operated (operation target apparatuses). An automation technique is a technique for automating the management and maintenance (hereinafter collectively referred to as the "operation") of such operation target apparatuses. A technique disclosed in PTL 1 is designed so that with a management system that realizes such automation technique, components within a flow are represented with an icon indicating, as a flow icon, that the components are fully automated if all of them are designed for full-automation operation; and the components are represented with an icon indicating that some of them are designed for full-automation operation and the rest of them are designed to be set manually if both the components for the full-automation operation and the components to be set manually coexist.

CITATION LIST

Patent Literature

PTL 1: WO2013/140609

SUMMARY OF THE INVENTION

Problems to be Solved by the Invention

Improvements of the components will be made continuously because of, for example, functional expansion or bug fixing. However, PTL 1 does not disclose such improvements of the components. Furthermore, in some case, it is necessary to change settings of properties associated with the relevant components along with the improvements of the components; however, PTL 1 does not disclose such change of the settings of the components, either.

Means to Solve the Problems

A management system includes: an interface device connected to an operation target system including one or more operation target apparatuses: a storage resource that stores a management program; and a processor that creates or edits a template for operation automation, which is a service template associated with one or more components, by executing the management program, wherein the processor: (1) receives a version upgrade request which designates the service template; (2) upgrades a version of a target component associated with the designated service template or its duplicate in response to the version upgrade request; (3) estimates each of all possible configurations as a post-reset configuration caused by the version upgrade of the target component with respect to each property group including one or more properties of the designated service template or its duplicate, which are associated with the version-upgraded target component, from among property groups formed of one or more properties of the designated service template or its duplicate; (4) searches for a property group having any of the estimated configurations from among property groups formed of one or more properties of a service template other than the designated service template or its duplicate; and (5) displays setting content of the property group detected by the search.

A management method executed in a management system for managing an operation target system including one or more operation target apparatuses is provided, wherein the management system includes: an interface device connected to the operation target system: a storage resource that stores a management program; and a processor that creates or edits a template for operation automation, which is a service template associated with one or more components, by executing the management program, and wherein the management method includes: a first step executed by the processor receiving a version upgrade request which designates the service template; a second step executed by the processor upgrading a version of a target component associated with the designated service template or its duplicate in response to the version upgrade request; a third step executed by the processor estimating each of all possible configurations as a post-reset configuration caused by the version upgrade of the target component with respect to each property group including one or more properties of the designated service template or its duplicate, which are associated with the version-upgraded target component, from among property groups formed of one or more properties of the designated service template or its duplicate; a fourth step executed by the processor searching for a property group having any of the estimated configurations from among property groups formed of one or more properties of a service template other than the designated service template or its duplicate; and a fifth step executed by the processor displaying setting content of the property group detected by the search.

Advantageous Effects of the Invention

The present invention can make it easier to reset necessary properties along with a version upgrade of a target component.

BRIEF DESCRIPTION OF DRAWINGS

FIG. 7 illustrates the structure of a component property management table;

FIG. 8 illustrates the structure of an ST (service template) management table;

FIG. 9 illustrates the structure of a flow management table;

FIG. 10 illustrates the structure of an ST property management table;

FIG. 11 illustrates the structure of a service management table;

FIG. 12 illustrates the structure of a service property setting table;

FIG. 19 illustrates the structure of a step management table;

FIG. 38 illustrates the structure of a property group management table;

FIG. 39 illustrates the structure of a property mapping management table;

FIG. 40 illustrates a pre-component-version-upgrade property mapping management table;

FIG. 42 illustrates the structure of a component property difference table;

FIG. 43 illustrates the structure of a search property group configuration management table;

FIG. 44 illustrates the structure of a search target property group configuration management table;

FIG. 45 illustrates the structure of a search result table;

DESCRIPTION OF EMBODIMENTS

Figure 1:
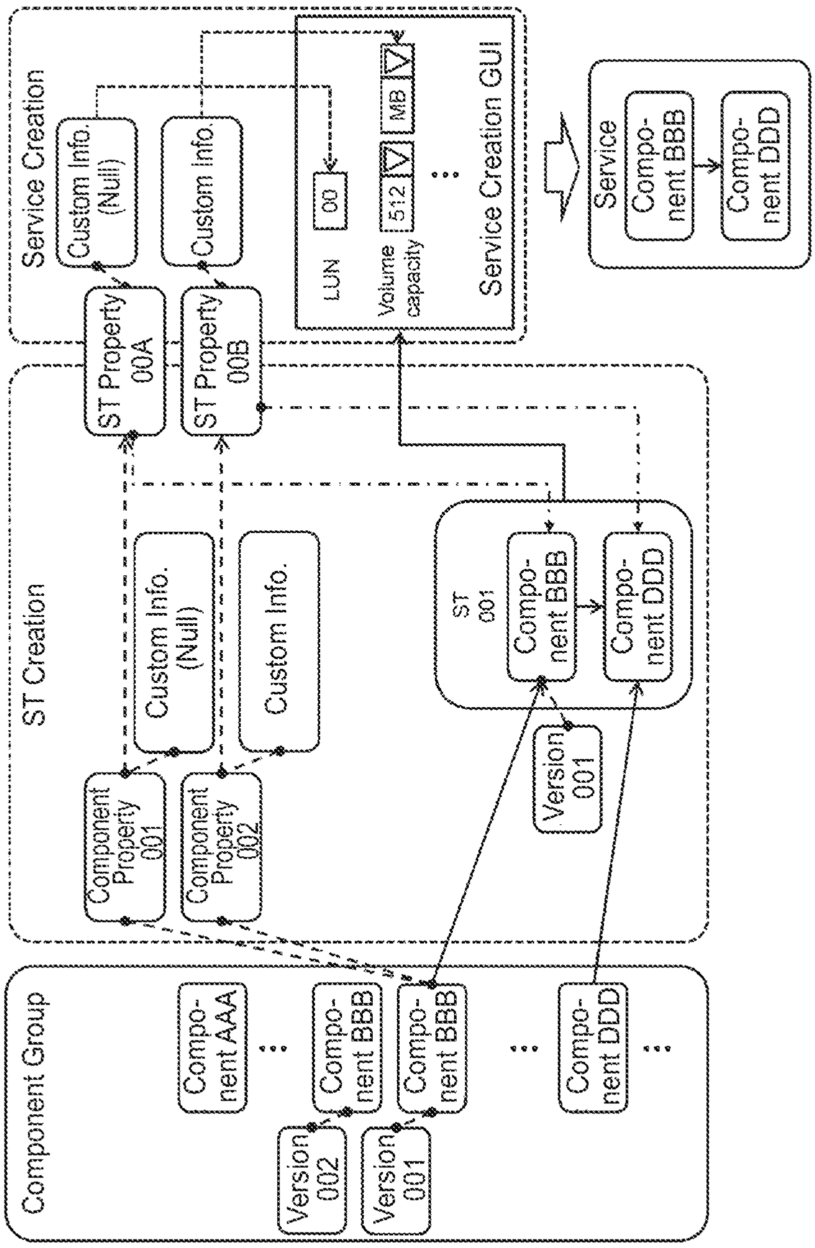
FIG. 1 illustrates a first outline of an embodiment.

An embodiment will be explained below. Incidentally, the embodiment described below does not limit the invention to the scope of claims and various elements explained in the embodiment and all combinations of such elements are not necessarily essential as the solving means of the invention.

Furthermore, information may be explained with the expression "kkk table(s)" in the following description; however, the information may be expressed with a data structure other than that of the tables. At least one of the "kkk tables" can be called "kkk information" in order to indicate that such information does not depend on the data structure. Moreover, the table structure is one example and two or more tables may be integrated into one table or one table may be divided into a plurality of tables.

Furthermore, processing may be sometimes explained by using a "program" as a subject; however, the program is executed by a processor (such as a CPU [Central Processing Unit] to execute specified processing by using, for example, storage resources (such as a memory) and/or communication interface devices (such as communication ports) as appropriate, so that the subject of the processing may be the processor. The processing explained by using the program as its subject may be recognized as processing executed by the processor or an apparatus including such processor. Furthermore, the processor may include a hardware circuit for executing a part or whole of the processing. The program may be installed from a program source into each controller. The program source may be, for example, a program distribution computer or a computer-readable storage medium.

Furthermore, regarding the embodiment described below, there are a first management system for managing a computer system (hereinafter referred to as the computer management system) and a second management system for supporting automation of the system operation (hereinafter referred to as the operation automation system). However, the computer management system and the operation automation system may be one management system. Furthermore, the computer management system may be included in an operation target apparatus.

Furthermore, regarding the description below, the management system may be composed of one or more computers. Specifically speaking, for example, when the management computer displays information (specifically speaking, when the management computer displays information on its display device or when the management computer transmits display information to a remote display computer), the management computer is the management system. Furthermore, for example, when a plurality of computers realize functions equal to those of the management computer, the plurality of computers (which may include a display computer if information is displayed by the display computer) are the management system. In this embodiment, a management server for the operation automation system is the management computer and a management client of the operation automation system is the display computer.

Furthermore, the management computer includes: an interface device connected to an I/O system including a display system; a storage resource for storing information (such as a memory); and a processor connected to the interface device and the storage resource. The display system may be a display device included in the management computer or a display computer connected to the management computer. The I/O system may be an I/O device (such as a keyboard and a pointing device, or a touch panel) included in the management computer or a display computer or another computer connected to the management computer. When it is stated that the management computer "displays the display information," it means that the management computer displays the display information on the display system; and the management computer may display the display information on the display device included in the management computer or the management computer may transmit the display information to the display computer (in the latter case, the display information is displayed by the display computer). Furthermore, when it is stated that the management computer inputs/outputs information, the information may be input to, and output from, the I/O device of the management computer or the information may be input to, and output from, the remote computer (such as the display computer) connected to the management computer. To output the information may be to display the information.

Furthermore, the expressions "uk (unique key)" and "key name" may be used as identification information of an element in the description given below; however, other types of identification information (such as a number) may be used instead of, or in addition to, at least one of these expressions.

Outlines of Embodiment

Figure 2:
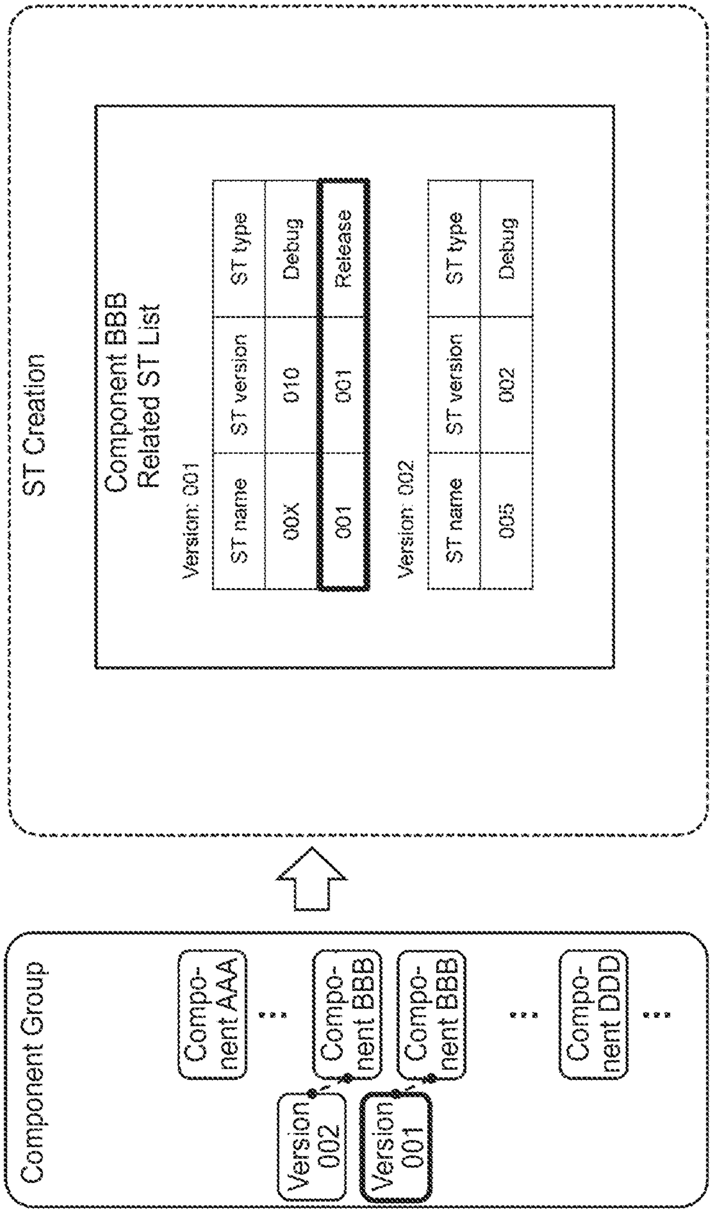
FIG. 2 illustrates a second outline of the embodiment.

FIG. 1 illustrates a first outline of an embodiment. FIG. 2 illustrates a second outline of the embodiment.

The operation automation system manages a large number of components of the system operation. The "system operation" herein means the operation of the computer system. A "component" is part of the system operation and is one independent processing (task). A component(s) is one unit (one unit included in an ST) associated with a service template (hereinafter referred to as an ST). Examples of components are a plug-in component(s) and an ST component(s) (ST treated as a component). The details will be described later.

The plug-in component is, for example, a processing module for executing a script and may be an executable file. The plug-in component is provided in the operation automation system in advance; however, the invention is not limited to this example and the plug-in component can be added to the operation automation system later. The plug-in component(s) may be, for example, a component(s) for causing the configuration of a storage apparatus to be changed (for example, creation of a logical volume); however, the invention is not limited to this example and there may be a component(s) to be used to combine components, or a component(s) which can be used in a versatile manner. For example, there may be a software component(s) for repeated execution, a file transfer component(s), a file execution component(s), and so on as the plug-in components.

Incidentally, possible cases may include: a case where a component (package) is downloaded from outside the operation automation system and then imported; a case where a user of the operation automation system creates or improves a component; or a case where an ST is a component. However, a component may be imported into the operation automation system in cases other than those listed above. Incidentally, one of the following examples may be possible as a component improvement example: (1) a modification of a failure inside the component; (2) an improvement of internal processing efficiency; (3) an apparatus which is an operation target of the component has been changed (for example, as the specifications of a command for managing a certain apparatus have been changed, it becomes necessary to also change the component which executes the command); (4) the number of apparatuses which are operation targets of the component has increased (for example, in addition to a first vendor's apparatus, a second vendor's apparatus has become newly available for the operation); (5) the number of input/output properties of the component has increased or decreased; (6) the format of a value assigned to the input/output property of the component has been changed; (7) a default value associated with the component has been changed or added; and (8) things that can be processed as the component have been increased or the processing efficiency has been improved.

The operation automation system manages a large number of components (component group). In this embodiment, an ST (service template) is created based on two or more components from among a large number of components, a service is created based on the created ST, and the created service is executed. The outlines of component management, ST creation, ST finalization, service creation, and service execution will be explained below.

<Component Management>

The operation automation system manages a large number of components (component group). A component(s) may be added or edited by a component providing user. The operation automation system manages one or more component properties associated with the relevant component with respect to each component. Furthermore, the operation automation system manages versions of the relevant component with respect to each component. FIG. 1 illustrates component properties and versions by taking component BBB as an example; however, regarding another component, component properties and versions of that other component are associated with the other component.

The "component properties" are properties of a component. There are two types of component properties: component input properties and component output properties. The component input properties are properties regarding input of a value for a defined item (display name) and the component output properties are properties regarding output of the value for the defined item (display name). At least one of one or more component input properties and zero or more component output properties is associated with one component. Specifically speaking, depending on a component, there may be zero output property, but one or more input properties are associated with each component. The input value may be, for example, a copy of a value which was input as a property of a service created in the past or a copy of a value which was output for another already-executed component. The output value may be configuration information or the like after execution of the component.

Component BBB of version 001 and component BBB of version 002 are managed, respectively. Specifically speaking, if there are different "versions" of the same component, they are treated as if they were different components. In other words, even if a component is updated (for example, improved), the pre-update component will not be overwritten with the updated component and the updated component is managed separately from the pre-update component. When a component is updated and if the pre-update component is automatically replaced with the updated component as in a case of a software update, this may cause troubles in the operation automation. Particularly, when the pre-update component is an element of a service which has been already created, there is a high possibility of causing troubles. So, in this embodiment, when a component is updated, the operation automation system sets first-type identification information (for example, a component name) of the updated component to be the same as first-type identification information of the pre-update component, while it sets at least one of a version and second identification information (for example, a component uk [component unique key]) to be different values from a version and second identification information of the pre-update component. Accordingly, the operation automation system can manage the updated component as a component separate from the pre-update component.

The "component providing user" is a user of an operation automation system 301 who, for example, adds or updates a component(s). The component providing user can, for example, creates, adds, or updates a component(s) via, for example a GUI (Graphical User Interface), a CLI (Common Language Infrastructure), or an API (Application Programming Interface). A component(s) added or updated by the component providing user may be typically a plug-in component(s). Incidentally, the plug-in component is created by, for example, a vendor of a management program 432 or a vendor of the operation target apparatus. Both the plug-in component(s) and the ST component(s) can be associated with an ST. The plug-in component may be a minimum unit and the ST component may be a package of one or more plug-in components and an ST with which the plug-in components are associated. The plug-in component may include component input properties and the content of processing executed based on input values which are input to the component input properties. The ST component may also include the component input properties and the content of processing executed based on input values which are input to the component input properties. The component input properties of the ST component may be ST input properties described later.

<ST Creation>

The operation automation system displays an ST creation screen. The ST creation screen displays an information input UI. An ST creation user inputs information into the ST creation screen by means of the user operation. For example, the operation automation system accepts, via the ST creation screen, the selection of two or more components from among a large number of components and designation of the sequential execution order of the two or more components. The operation automation system creates an ST for a service flow based on the selected two or more components and the designated sequential execution order.

The "ST creation user" is a user of the operation automation system 301 who creates an ST. The ST creation user creates the ST by using the ST creation screen as described above. The ST creation user may be the same as, or different from, the component providing user. Incidentally, the aforementioned ST component may be typically a component formed of an ST which was created by the ST creation user and has been verified. However, the ST component may be created by other vendors or users.

The "user operation" is the operation performed by the user on the screen by using an input device. The input device used for the user operation is generally a combination of a pointing device (such as a mouse) and a keyboard, or a touch screen. Input via the screen is performed by the user operation.

The "ST" is a service template. In this embodiment, the ST may be sometimes abbreviated as "ST." The ST can be expressed as an object indicating automatic execution content which is not instantiated.

The "service flow" is typically a sequence of selected two or more components. The sequence of the components follows the designated sequential execution order. When the number of the selected components is only one, the number of components to form the service flow is also one.

The operation automation system creates an ST based on the selected two or more components and the designated sequential execution order via the ST creation screen as described above. Specifically speaking, for example, the operation automation system creates a plurality of ST's properties (for example, ST properties 00A and 00B), which respectively correspond to a plurality of component properties (for example, component properties 001 and 002) associated with the selected two or more components, and associates the plurality of created ST properties with an ST (for example, ST001). An ST property corresponding to a component property is automatically created by the operation automation system based on that component property. A value input by means of the user operation during or after the creation of the ST property may be included in the ST property, but the ST property may be created without input by means of the user operation (that is, manual input). The "ST property/properties" is property/properties of the ST. There are two types of the ST properties: ST input properties and ST output properties. The ST input properties are properties regarding input of a value for a defined item (display name), while the ST output properties are properties regarding output of the value for the defined item (display name). At least one of one or more ST input properties and zero or more ST output properties is associated with one ST. Specifically speaking, the number of the ST output properties does not always have to be one.

In the example of FIG. 1, let us assume that a service flow is a combination of component BBB "Provisioning volume" (to create a logical volume in a storage apparatus) and component DDD "Create pair volume" (to create a logical volume [secondary volume] which constitutes a pair with a logical volume [primary volume]) and an ST (ST001) of that service flow is created.

<ST Finalization>

When the operation automation system receives finalization of the created ST by means of the user operation, it sets and manages an ST type of the created ST as "Release" (see FIG. 2). The ST type "Release" means that the ST has been finalized and a service can be created based on that ST. On the other hand, an ST which has not been finalized is of an ST type "Debug." The ST type "Debug" means that the ST is being edited. Incidentally, the operation automation system may be designed to not accept the selection of any ST of the ST type "Debug" during the service execution (for example, by not displaying [disabling] the ST of the ST type "Debug" as selectable). As an example, a service creation user described later may be designed to be able to create a service of only an ST whose ST type is "Release"; and since the ST creation user also has a testing purpose, the ST creation user may be designed to be able to create a service of both the ST types "Release" and "Debug." Incidentally, needless to say, the operation automation system recognizes the users in order to implement the above-described processing.

<Service Creation>

The operation automation system manages created ST's. The operation automation system receives the selection of any one of ST's of the ST type "Release" and displays the service creation screen based on the selected ST. The service creation user inputs information into the service creation screen by means of the user operation. The operation automation system creates a service based on the information which has been input via the service creation screen.

The "service creation user" is a user who creates (or executes) a service. The service creation user and the ST creation user may be different users or the same user.

A "service" is an instantiated ST. Specifically speaking, a necessary value for an ST to execute a service is left blank; and the service has the necessary value input to the ST. Incidentally, regarding the above-mentioned necessary value to execute the service, a default value can be sometimes set as information of the ST property.

Incidentally, a service may be sometimes described as an "operation service" in order to express that it is related to operation. Incidentally, it can be said that in a certain situation, a "service" represents operation processing to be executed on an operation target apparatus designated by the user. For example, this expression is applicable when an ST input property 1304C is designated in an example of FIG. 13. Furthermore, when the operation target apparatus to be designated is not embedded in the component itself or a default value of the input property of the component is not given, it can be said as a different way of recognizing the "service" and the "ST" that regarding the processing content indicated by the "service," a definition of is input value clarifies the operation target apparatus to be designated as the apparatus where a configuration change should be made or from which information should be acquired, while regarding the "ST" the operation target apparatus to be designated is unclear.

Incidentally, the operation automation system may associate a service property with the created service. The "service property" is an input/output property (property of at least one of input and output) of the service. At least one of a value which is input to the ST upon the service creation and a value which is output from the component upon the service execution is set to the service input/output property. Specifically speaking, for example, upon the execution of the service, a value which is input to the input property when creating the service may be input to a component associated with an ST of that service and processing may be executed. Furthermore, as a value which is output from the component is set to the output property of the service, the set value (for example, configuration information after execution of the component) may be displayed on a service execution result screen.

<Service Execution>

The operation automation system transmits a command for executing the created service to the computer management system. The computer management system executes the service in accordance with that command.

The above explanation has described the outline of each of the component management, the ST creation, the service creation, and the service execution.

Custom UI generation information which is information defining a custom UI is associated with at least each one ST input property among a plurality of ST's properties. However, regarding a default UI, the custom UI generation information is "Null" (information for the default UI). The custom UI and the default UI will be described later. Furthermore, the "custom UI generation information" may be sometimes abbreviated as "custom Info." in the drawings. The custom UI generation information of an ST property is UI generation information (for example, information including necessary information to generate an UI) associated with a component property corresponding to that ST property. In some case, the custom UI generation information may be associated with at least each one component input property of the plurality of component properties.

The operation automation system can display screens such as the ST creation screen and the service creation screen in a sequence of flows. A UI is displayed on at least one screen. In this embodiment, a UI is one element displayed on a screen. A screen including one or more UI's can be also called a GUI. Incidentally, a UI may be sometimes called a "UI element" in the following explanation.

<UI Generation and Display>

In this embodiment, the operation automation system generates a UI displayed at least on the service creation screen, for example, as described below.

Specifically speaking, the operation automation system generates each of a plurality of UI's based on a plurality of pieces of the custom UI generation information which correspond to a plurality of ST's properties of the selected ST, respectively. The operation automation system displays the plurality of generated UI's on one service creation screen. In this embodiment, one UI is generated based on one piece of custom UI generation information. In other words, the relationship between the custom UI generation information and the UI's is 1:1. However, the relationship between the custom UI generation information and the UI's may be n:1, 1:n, or m:n (m and n represent integers equal to 2 or more).

According to the above-described UI generation, for example, even if component DDD is replaced with component EEE in a service flow composed of component BBB and component DDD, a UI of component EEE instead of component DDD is generated and displayed as the UI to be displayed on the service creation screen after the replacement of the component. Accordingly, the UI generation is efficient.

<Custom UI>

Furthermore, in this embodiment, a custom UI is prepared as a UI instead of or in addition to a default UI.

The "default UI" is a UI of a key-value format for a text field; and specifically speaking, the "default UI" is a combination of a display name of an ST property (component property) and the text field. Incidentally, the reason for adopting the text field for the default UI is because it can be applicable for a wide range of input formats. The text field is displayed regardless of the display name (input item) of the ST property (component property). Therefore, the user has to think of information such as a value or name to be input by seeing the display name and then input that information into the text field by key typing. Accordingly, an erroneous input such as a typographical error may occur. Furthermore, even if there is an invalid value or name as the ST property (component property), there is a possibility that such invalid value or name may be input. Furthermore, the user is required to have a high level of knowledge.

On the other hand, the "custom UI" is not a UI of the key-value format for the text field, but is a UI for which usability is considered. For example, the custom UI is a UI including the display name of the ST property (component property) and one or more GUI elements (widgets) like at least one of a pull-down menu, a checkbox, a radio button, and so one. Therefore, the custom UI neither causes erroneous inputs nor requires the user to have the high-level knowledge as compared to the default UI. Incidentally, the custom UI may also include a text field, but is a UI with higher usability (for example, a UI including a list of invalid values, names, and so on which are displayed close to the text field) than that of a UI like the default UI (a UI in the key-value format for the text field).

Referring to an example of FIG. 1, both a default UI (a set of the display name "LUN" and the text field) and a custom UI (a set of the display name "Volume Capacity," a pull-down menu of the volume capacity, and a pull-down menu of the volume capacity unit [for example, MB (megabyte)]) coexist on one service creation screen.

Accordingly, in this embodiment, not all the UI's have to be custom U I's. Even if both a component which is not associated with the custom UI and a component which is associated with the custom UI coexist in one service flow, the custom UI is also displayed as defined in addition to the default UI on the service creation screen. Since many components of the system operation exist, it would take a long time for a vendor of the operation automation system to supply their own products if they try to change all the UI's to custom UI's and then supply the components. In this embodiment, even if any component which is not associated with the custom UI generation information of the custom UI is supplied earlier, or even if the ST creation user uniquely creates its own component and incorporates it into an ST, the service creation user can enjoy the benefit of the custom UI when creating a service.

Incidentally, even when a custom UI is added to the component properties (ST properties) and an old custom UI is changed to a new custom UI, the UI displayed on the screen will be the UI before the change (that is, the default UI or the old custom UI). Specifically speaking, for example, when the operation automation system receives a request to change the UI of a component which is associated with an existing ST, the operation automation system creates a copy of the component for which the UI change request is received (that is, creates a new component of a different version based on the existing component) and creates a component with the changed UI. Then, the operation automation system creates a copy of an existing ST (that is, creates a new ST of a different version based on the existing ST) and replaces the existing component in the created new ST with the new component of the different version. If the UI which is associated with the component used in the existing ST is automatically changed, there is a possibility that the ST which was originally working well may no longer become available (for example, a value which was originally available for input can no longer be input). In this embodiment, it is possible to replace the UI for components without adversely affecting the available ST.

Furthermore, even if a UI which is associated with a component property of a component associated with an already-created ST is changed and a new component is added, the operation automation system displays the UI before the change by using the existing component on a service creation screen based on that ST. As a result, it is possible to avoid the possibility that a value which was originally available for input can no longer be input, by changing the related UI after creating the ST. A specific example in which the UI before the change is created and its display is maintained will be explained with reference to FIG. 26.

<Display of Component Versions and Related ST's>

The operation automation system manages the relationship between the versions of components and ST's which are associated with the components of such versions (the related ST's) as explained with reference to FIG. 1. When receiving the selection of a component (for example, component BBB) from the user as illustrated in FIG. 2, for example, upon or before the service creation, the operation automation system displays a related ST list for each version of the selected component. The related ST list includes information of the related ST (for example, an ST name, an ST version, and an ST type) with respect to each related ST. As a result, at least one of (A) and (B) below can be implemented.

(A) When an updated component is imported, the user can select a pre-update component and thereby find whether there is any related ST for the pre-update component or not, from the related ST list of each version with respect to the pre-update component. Furthermore, if the pre-update component has a related ST, the ST type of the related ST can be found. The user can judge whether the component which is associated with the existing ST should be replaced with the updated component or not, based on the existence or non-existence of the related ST and the ST type. For example, if the pre-update component does not have any related ST, the user can judge that it is unnecessary to replace the component which is associated with the existing ST with the updated component. Furthermore, for example, if a related ST of the ST type "Release" exists with respect to the pre-update component (for example, component BBB of version 001), the user can judge that: a problem may occur if the pre-update component associated with that related ST is replaced with the updated component; and, therefore, a new ST in which the pre-update component is replaced with the updated component should be created. Furthermore, for example, if a related ST exists with respect to the pre-update component, but a related ST of the ST type "Release" does not exist (for example, component BBB of version 002), the user can judge that the pre-update component associated with the related ST may be replaced with the updated component.

(B) The user can tell whether a related ST for the selected component exists or not and the ST type of the related ST from a related ST list of each version with respect to the selected component (for example, component BBB). The user can judge the influence caused by updating the selected component (for example, the necessity to make the component of a new version, the necessity to replace the component associated with the related ST, and the necessity to create a new ST) on the basis of whether the related ST exists or not and the ST type. For example, if a related ST of the ST type "Release" does not exist with respect to the selected component, the user may update the component without changing the version of the selected component (that is, the user may replace the component itself without adding a component of a different version). Furthermore, for example, if a related ST of the ST type "Release" exists with respect to the selected component, the user can judge that it is necessary to make a component of a new version the updated component with respect to the selected component.

It is normally desirable to avoid replacing the component which is associated with the finalized ST with the updated component even if the component is updated (even if the version is upgraded). According to this embodiment, a list indicating with which ST a component of each version is associated is displayed as described above. Therefore, it is easy to judge which one is the ST associated with the component which should be or should not be replaced with the updated component.

<ST Version Upgrade>

In this embodiment, even if a component of a new version is added to a component group with respect to any one of components associated with an ST (service template), the version upgrade of that ST will not be performed automatically. Specifically speaking, the component associated with that ST will never be automatically replaced with the new added component. The version upgrade of the ST will be performed in response to an explicit request from the user. Since the ST will never be automatically backed up, the operation of a service which is created by using that ST can be guaranteed.

The version upgrade of an ST which is designated by an explicit backup request (hereinafter referred to as the designated ST) is possible in response to that backup request from the user (for example, the ST creation user). The "version upgrade of the designated ST" is to make a version of a target component associated with the designated ST or its duplicate different from the version of the target component which is already associated with the designated ST. The "target component" is a version change target component. The target component may be a component selected by the user (for example, the ST creation user) or a component automatically selected by the operation automation system. A pre-version-change target component and a post-version-change target component are the same component (for example, components with the same name) except for differences in specified attributes such as versions (for example, the versions and the uk's).

The version upgrade of the designated ST may be, for example, either one of the following: (a) to replace a target component of the designated ST itself with the target component of a different version; and (b) to associate a component other than the target component of the designated ST with the duplicate of the designated ST, associate the target component of a different version from the version of the target component of the designated ST with the duplicate of the designated ST, and consequently create a new ST with the duplicate of the designated ST having the target component of the different version.

Furthermore, for example, the following case would also be possible. Specifically speaking, a new component is added, but that component is not associated with any ST's, and the component is added as a component of a new version. The component of the new version is associated with any one of ST's. However, a problem is discovered during execution (for example, a test) of a service using the ST and, therefore, a component of an old version which has never been associated with any ST's is associated with the ST (or a duplicate of the ST). Such a case may also fall under the "version upgrade of the designated ST."

Accordingly, the version upgrade of the designated ST is typically to increase the version of the target component which is associated with the designated ST (for example, to make it the latest version); however, even if the version of the target component which is associated with the designated ST is decreased, it can also fall under the version upgrade of the designated ST (for example, when the target component whose version is decreased has never been associated with any one of ST's or when an ST [or a duplicate of the ST] after decreasing the version of the target component is different from any one of created ST's).

The operation automation system receives a version upgrade request which designates an ST (for example, a request which is associated with a uk of the designated ST) and makes the version of the target component, which is associated with the designated ST or its duplicate, different from the version of the target component which is already associated with the designated ST in response to the version upgrade request.

Even if a component is used for a plurality of ST's, it is sometimes necessary to change whether a version change of the component (for example, a version upgrade) is possible or not, depending on each ST. For example, there may be a case where there is a possibility that a version upgrade of a component may cause the operation of the same ST's to become unstable so that any unnecessary version upgrade should be avoided as much as possible with respect to such ST's, while it is desired that a component with the latest functions should be used with respect to some other ST's. Both of these cases can be dealt with. Incidentally, a new ST can be created by using a component whose version has been changed; however, in this case, it is necessary for the ST creation user to start over the ST creation operation, for example, by setting properties from the beginning, so that it is inconvenient for the person who creates the ST.

The version upgrade of the designated ST may be performed in response to a version upgrade request received by the operation automation system via an interface from the ST creation user who created the designated ST. Specifically speaking, for example, when a plurality of ST creation users are registered in the operation automation system and when the operation automation system receives a request to upgrade the version of the designated ST from a user other than the ST creation user of the designated ST, the operation automation system may: perform the version upgrade of the designated ST regardless of attributes of that user; perform the version upgrade of the designated ST only when the attributes of that user satisfy specified conditions; or return a response to that user that the version upgrade cannot be performed.

Figure 18:
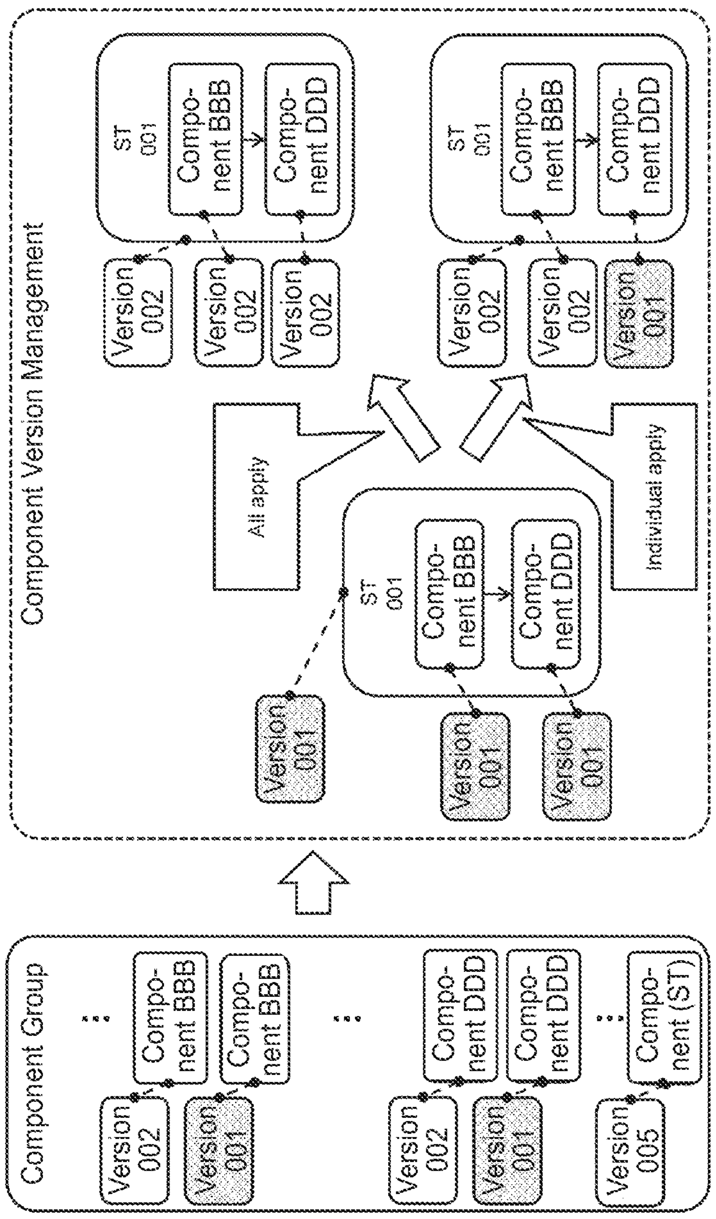
FIG. 18 illustrates a third outline of the embodiment.

FIG. 18 illustrates a third outline of the embodiment.

The "version upgrade of the designated ST" may include replacement of a target component of the designated ST itself with a target component of another version; however, in this embodiment, the operation automation system maintains the designated ST itself and creates a duplicate of the designated ST (however, its target component is of a version different from the version of the target component associated with the designated ST) as a new version of the designated ST. Specifically speaking, regarding the version upgrade of the designated ST, the target component of the different version, instead of the target component before the version change, is associated with the duplicate of the designated ST.

If an ST before the version upgrade has already been used stably, that ST will be maintained (the ST itself will never be updated), so that it is possible to avoid any problems which might occur along with the version upgrade of the ST. Furthermore, it is easy to manage versions to use the ST as a component of another ST.

Furthermore, there are two modes of ST version upgrades: an "All apply" mode and an "Individual apply" mode. The "All apply" mode is a mode to replace components of all old versions, which are associated with the duplicate of the designated ST (the designated ST of a different version), with components of all the latest version. The "Individual apply" mode is a mode to change the version of a component selected by the ST creation user from among components which are associated with the duplicate of the designated ST.

For example, let us assume as illustrated in FIG. 18 that component BBB (old version 001) and component DDD (old version 001) are associated with (or are included in) the designated ST 001 (version 001). Furthermore, let us assume that component BBB of the latest version 002 exists with respect to component BBB and component DDD of the latest version 002 exists with respect to component DDD. The operation automation system accepts the selection of either the "All apply" mode or the "Individual apply" mode with respect to the designated ST 001 (version 001) via a user interface (for example, GUI).

When the "All apply" mode is selected, the operation automation system replaces all the components of the old versions (component BBB [old version 001] and component DDD [old version 001]) which are associated with the duplicate of the designated ST 001 (ST001 of version 002) with all the components of the latest version (component BBB [the latest version 002] and component DDD [the latest version 002]).

When the "Individual apply" mode is selected, let us assume that the operation automation system receives the selection of component BBB (old version 001) and version 002 after the change from the ST creation user via the user interface. The operation automation system replaces component BBB (old version 001), which is selected from among the components associated with the duplicate of the designated ST, with component BBB (changed version 002).

Accordingly, the user can select whether to easily upgrade the version of the ST without individually selecting a component or to upgrade the version to the ST which satisfies the user's needs by individually selecting the component.

Figure 36:
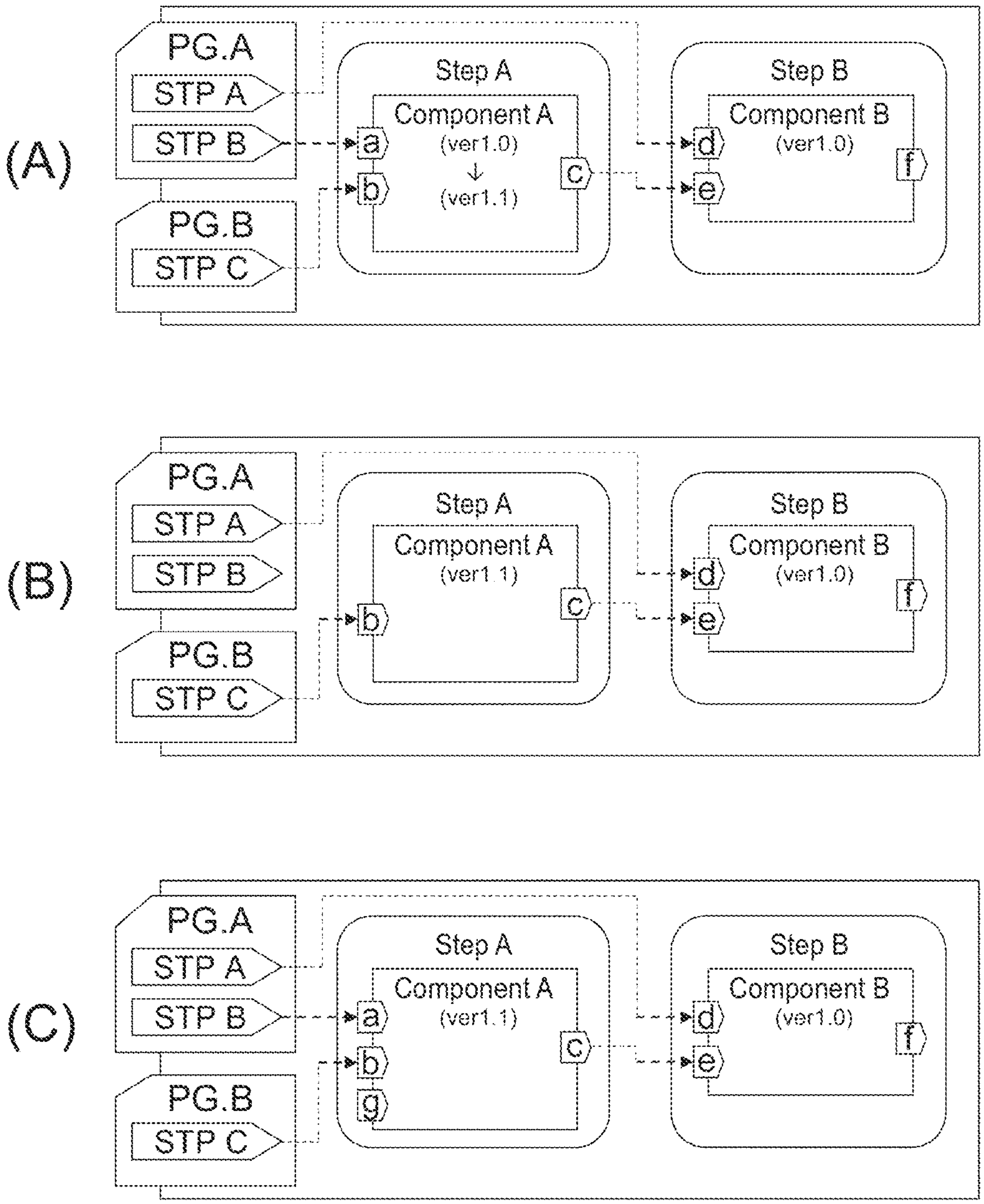
FIG. 36(A)-(C) illustrate a fourth outline of the embodiment.
Figure 37:
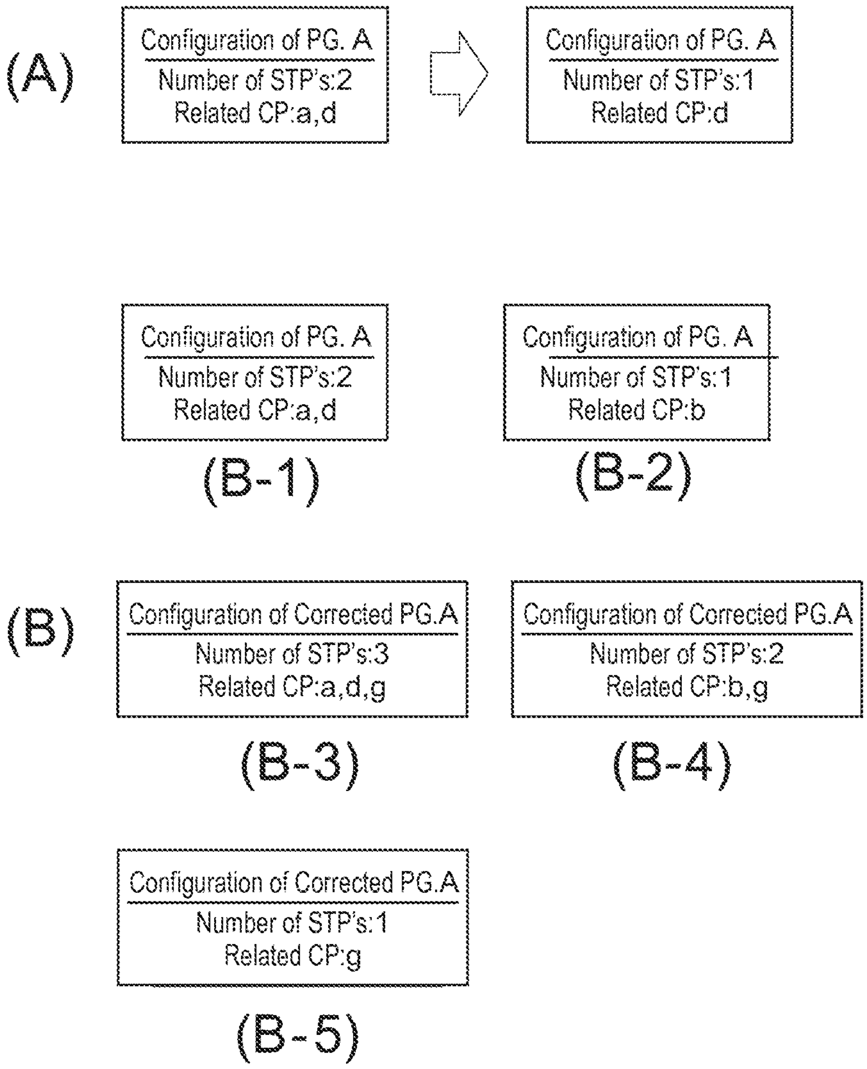
FIG. 37(A)-(B) illustrate the fourth outline of the embodiment.

FIG. 36 and FIG. 37 illustrate a fourth outline of the embodiment.

When performing the version upgrade of the designated ST as described above, it is sometimes necessary to update a property group which is associated with the component whose version has been upgraded (target component) in the designated ST after the version upgrade.

For example, referring to FIG. 36(A), when process is composed of two steps, step A and step B, in which the designated ST is executed sequentially, step A is associated with component A (version 1.0), and step B is associated with component B (version 1.0), a case where component A is updated to a new version (version 1.1) as a result of the version upgrade the designated ST will be examined. Incidentally, "a" and "b" in the drawing represent component input properties of component A; "c" represents a component output property of component A; "d" and "e" represent component input properties of component B; and '1' represents a component output property of component B. Furthermore, referring to FIG. 36, let us assume that property group A ("PG.A") is composed of ST property A ("STP A") which is associated with the component input property "d" of component B, and ST property B ("STP B") which is associated with the component input property "a" of component A; and property group B ("PG.B") is composed of ST property C ("STP C") which is associated with the component input property "b" of component A.

In this case, for example, when component A no longer requires the component input property "a" as a result of the version upgrade as illustrated in FIG. 36(B), ST property B of property group A which is associated with that component input property becomes no longer necessary, so that a task to delete ST property B from property group A is required with respect to the designated ST after the version upgrade.

Furthermore, for example, when component A requires a new component input property "g" as a result of the version upgrade as illustrated in FIG. 36(C), the required task is to add a new ST property, which is to be associated with that component input property with respect to the designated ST whose version has been upgraded, to property group A or property group B or to define a new property group including only that ST property as its constituent element.

However, specialized knowledge is required to reset the property group as described above and it is also necessary to upload files again in order to reset the ST property and the property group, so that such property resetting has troublesome problems.

So, when the operation automation system according to this embodiment performs the version upgrade of the designated ST, the operation automation system estimates possible configurations as a post-reset configuration of each property group associated with the component of the upgraded version as a result of the version upgrade of the designated ST, searches for a property group having such configuration from among property groups associated with other ST's, and displays the setting content of each property group detected by the search.

Accordingly, since the property group having the "possible configuration as the post-reset configuration of each property group associated with the component of the upgraded version" can be estimated as a property group which is reset when performing the version upgrade of the relevant component as a result of the version upgrade of the designated ST which was executed in the past, the setting content of such property group is displayed and, therefore, the operation to reset the properties of a necessary property group with respect to the designated ST after the version upgrade can be performed easily with reference to the displayed setting content.

Incidentally, the "configuration of the property group" herein used means a combination of the number of ST properties belonging to the relevant property group and component properties with which those ST properties are associated respectively.

For example, in the example of FIG. 36(B), the component property "a" of component A has been deleted as a result of the version upgrade of the designated ST, so that ST property B which was associated with this component property becomes an unnecessary ST property and the configuration indicating that "the number of ST properties: '1'; and the component property with which the ST property is associated (related CP); 'd'" as illustrated in the right-side part of FIG. 37(A) from which this ST property has been deleted from property group A is the "possible configuration as the post-reset configuration of each property group associated with the component of the upgraded version."

Furthermore, for example, in the example of FIG. 36(C), the component property "g" has been added to component A as a result of the version upgrade of the designated ST, so that the ST property associated with this component property becomes a necessary ST property and the configuration as illustrated in FIG. 37(B-3) or FIG. 37(B-4) in which this ST property is added to property group A or property group B, the configuration as illustrated in FIG. 37(B-5) including only the ST property associated with the added component property, and the same configuration as the original configuration of property group A or property group B as illustrated in FIG. 37(B-1) or FIG. 37(B-2) also become the "possible configuration as the post-reset configuration of each property group associated with the component of the upgraded version."

Therefore, when the version of component A is upgraded in the designated ST as illustrated in FIG. 36(A), the property group having the configuration illustrated in the right-side part of FIG. 37(A) and the property groups having the configurations illustrated in FIG. 37(B-1) to FIG. 37(B-5) are the property groups which should be searched and the setting content of these property groups detected by the search will be displayed.

The outlines of the embodiment have been described above. The embodiment will be explained below in detail.

<System Configuration of this Embodiment>

Figure 3:
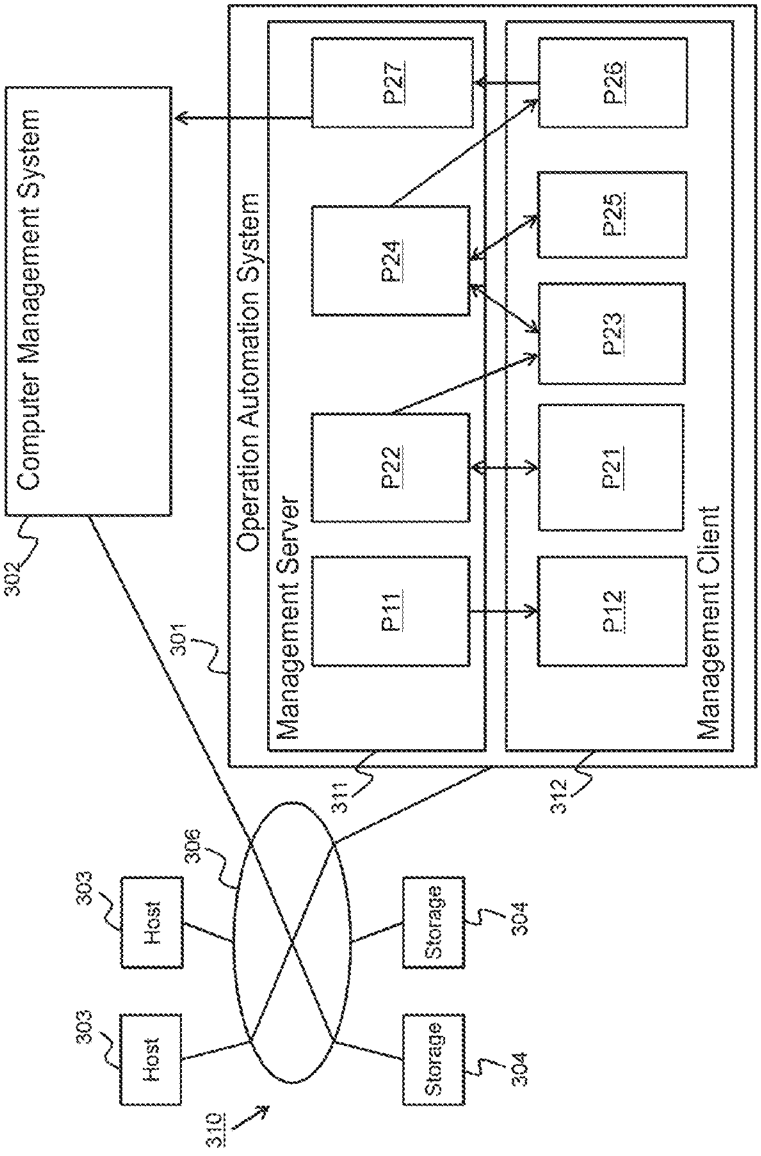
FIG. 3 illustrates the configuration of the entire system according to the embodiment.

FIG. 3 illustrates the configuration of the entire system according to the embodiment.

A computer management system 302 is connected to a computer system 310 and an operation automation system 301 is connected to the computer management system 302. The operation automation system 301 may be integrated with the computer management system 302.

The computer system 310 includes one or more host computers (hereinafter referred to as the host(s)) 303 and one or more storage apparatuses 304. The hosts 303 and the storage apparatuses 304 are connected via a communication network 306. The host 303 includes an I/F (communication interface device) connected to the storage apparatus 304, a storage resource like a memory, and a processor connected to them. The storage apparatus 304 includes one or more PDEV's (physical storage devices) and a controller connected to the one or more PDEV's. The controller provides the host 303 with logical volumes. The host 303 transmits an I/O (Input/Output) request, which designates a provided logical volume, to the storage apparatus 304. The controller for the storage apparatus 304 inputs/outputs data into/from the logical volume in accordance with the I/O request. I/O target data is input to, or output from, one or more PDEV's based on which an I/O destination area of the logical volume is formed. Incidentally, the host 303 and the storage apparatus 304 are examples of operation target apparatuses.

The computer management system 302 is a management system for managing the computer system 310. The computer management system 302 executes a service in accordance with a command from the operation automation system 301. When the service is executed, for example, a logical volume is created in the storage apparatus 304 and a secondary volume is created in the storage apparatus 304.

The operation automation system 301 is a management system for supporting automation of the system operation. The operation automation system 301 includes a management server 311 and a management client connected to the management server 311. Information is displayed by the management client 312 based on display information transmitted by the management server 311 to the management client 312. Specifically speaking, the management server 311 displays the information via the management client 312.

Specifically speaking, for example, the management server 311 identifies the relationship between a component and related ST's (P11) and displays a related ST list for each version of the component (P12).

Furthermore, for example, the management server 311 displays an ST creation screen (P21) and accepts the creation (including editing) of an ST via the ST creation screen from the ST creation user (P22). The management server 311 displays the service creation screen based on the finalized ST (P23). The management server 311 receives the information from the service creation user via the service creation screen and creates and retains a service based on the input information (P24). The management server 311 can display a screen for editing the service (P25) and can also accept editing of the service. The management server 311 displays a screen to execute the created (including editing) service (P26). The management server 311 accepts the execution of the service via the service execution screen from the service creation user and transmits a command to execute the accepted service to the computer management system 302 (P27).

Each processing group (one or more processing sequences) of the processing P11, P12, and P21 to P27 illustrated in FIG. 3 is performed by execution of a program group (one or more computer programs) by the processor.

Figure 4:
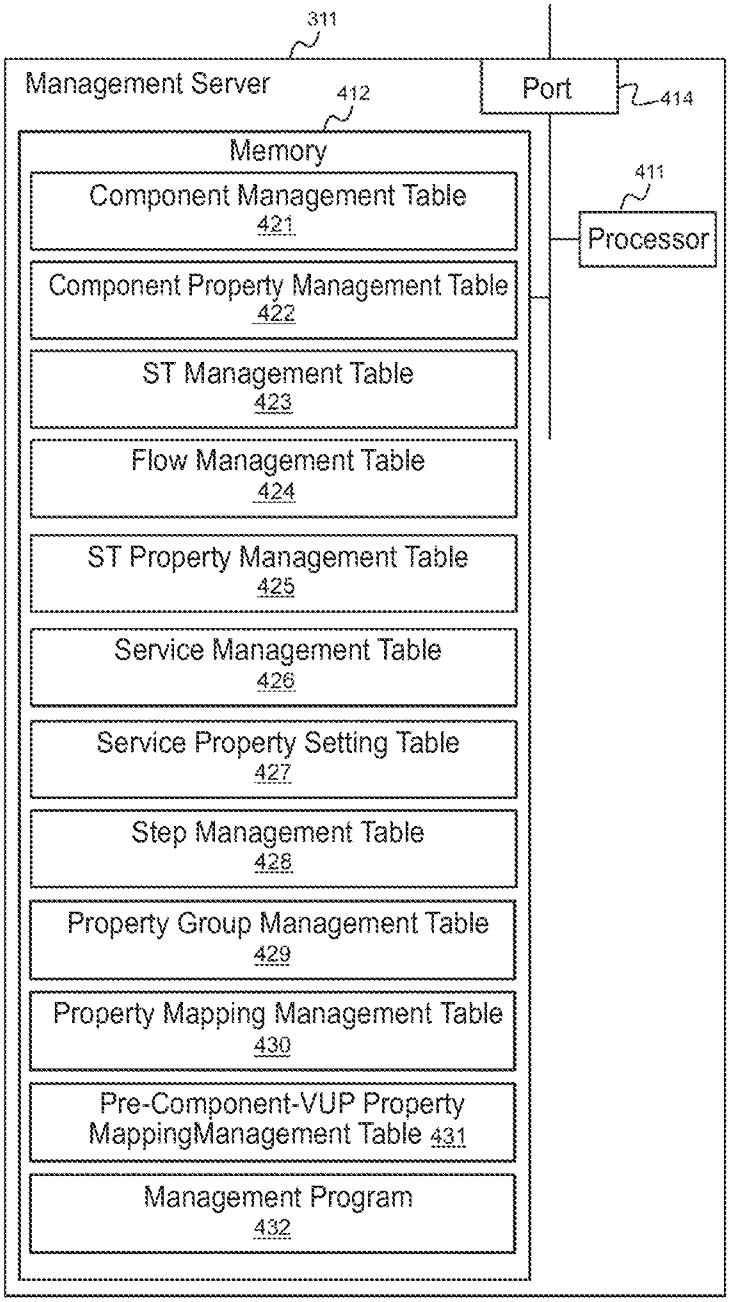
FIG. 4 illustrates the configuration of a management server.

FIG. 4 illustrates the configuration of the management server 311.

The management server 311 includes a communication port 414 (an example of an I/F), a memory 412 (an example of a storage resource), and a processor connected to them (typically a microprocessor like a CPU) 411. The management server 311 communicates with at least the computer management system 302 and the management client 312 via the communication port 414.

The memory 412 is not limited to a semiconductor memory and may be a hard disk drive. The memory 412 stores computer programs and management tables. Specifically speaking, for example, the memory 412 stores a component management table 421, a component property management table 422, an ST management table 423, a flow management table 424, an ST property management table 425, a service management table 426, a service property setting table 427, a step management table 428, a property group management table 429, a property mapping management table 430, a pre-component-version-upgrade property mapping management table 431, and a management program 432. The management program 432 is executed by the processor 411, thereby performing, for example, the processing P11, P12, P24, and P27 illustrated in FIG. 3.

Figures 5, 6:
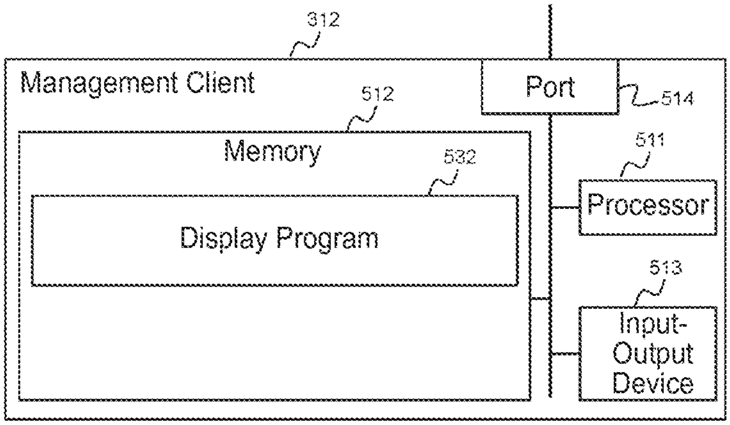
FIG. 5 illustrates the configuration of a management client.
FIG. 6 illustrates the structure of a component management table.

FIG. 5 illustrates the configuration of the management client 312.

The management client 312 includes a communication port 514 (an example of an I/F), an input-output device 513, a memory 512 (an example of a storage resource), and a processor connected to them (typically a microprocessor like a CPU) 511.

The memory 512 is not limited to a semiconductor memory and may be a hard disk drive. The memory 512 stores a display program 532. The display program 532 is executed by the processor 511, thereby performing, for example, the processing P12, P21, P23, P25, and P26 illustrated in FIG. 3.

The structures of the management information (the tables 421 to 431) which the management server 311 has will be explained.

FIG. 6 illustrates the structure of the component management table 421.

The component management table 421 includes information about components. The component management table 421 has a record for each component and each record stores a management number 601, a component name 602, a version 603, an executable file path 604, and a component uk 605. The management number 601 is a serial number of the relevant record. The component name 602 is the name of a component. The version 603 indicates the version of the component. The executable file path 604 indicates a path (path name) to an executable file of the component. The component uk 605 is a unique key (number) of the component. The uk is an example of identification information.

The same components of different versions have the same component name 602 (for example, "Provisioning Volume") and have different versions 603 (for example, "01.00.00" and "01.10.00") as can be seen from FIG. 6. Specifically speaking, the same components of different versions are managed as separate components. However, if a plurality of components have the same component name 602, you can tell that originals of these components are the same.

FIG. 7 illustrates the structure of the component property management table 422.

The component property management table 422 includes information about component properties. The component property management table 422 has a record for each component property and each record stores a management number 701, a component uk 702, a display name 703, a key name 704, an initial value 705, an input-output type 706, a property group 707, custom UI generation information 708, and a component property uk 709.

The management number 701 is a serial number of the relevant record. The component uk 702 is a unique key of a component. The display name 703 is a component property name displayed on the screen and corresponds to, for example, an input item or an output item.

The key name 704 is a name for uniquely identifying the relevant component property and is an example of identification information of the component property. The initial value 705 is a value that is set to a generated UI in advance. The initial value 705 "Null" means that there is no initial value. Specifically speaking, when the UI is displayed, its input column or output column is blank.

The input-output type 706 is information for distinguishing whether the component property is a component input property or a component output property (in other words, whether the value on the UI is an input value or an output value). The value of the input-output type 706 is: "In" when the corresponding component property is the component input property; and "Out" when the corresponding component property is the component output property.

The property group 707 indicates the name of a property group to which the relevant component property belongs. Specifically speaking, in this embodiment, at least one property group exists and at least one of one or more component properties and one or more ST properties (for example, one or more ST properties which correspond to such one or more component properties, respectively) is associated with the property group. The value "Null" of the property group 707 means that the corresponding component property does not belong to any one of property groups.

The custom UI generation information 708 indicates the type of a generated custom UI. The value "Null" of the custom UI generation information 708 means that the custom UI generation information is information for a default UI. The component property uk 709 is a unique key of the corresponding component property.

FIG. 8 illustrates the structure of the ST management table 423.

The ST management table 423 includes information about ST's. The ST management table 423 has a record for each ST and each record stores a management number 801, an ST name 802, an ST version 803, an ST uk 804, a flow uk 805, and an ST type 806.

The management number 801 is a serial number of the relevant record. The ST name 802 is the name of the relevant ST. The ST version 803 is the version of the ST. The ST uk 804 is a unique key of the ST. The flow uk 805 is a uk of a service flow corresponding to the ST. The ST type 806 indicates the type of the ST. The value "Debug" of the ST type 806 means that the ST can be edited; and the value "Release" of the ST type 806 means that the ST has been finalized (or cannot be edited).

The same ST's of different versions have the same ST name 802 (for example, "Provisioning & Pair") and different ST versions 803 (for example, "01.00.00" and "01.10.00") as can be seen from FIG. 8. Specifically speaking, the same ST's of different ST versions are managed as separate ST's. However, if a plurality of ST's have the same ST name 802, you can tell that originals of these ST's are the same.

A version of a component associated with an ST can be replaced (that is, the component can be updated) when the ST with which that component is associated has not been finalized (Debug) as mentioned earlier. Incidentally, in order to avoid any confusion that may be caused by editing the ST which already exists as a service (for example, any influence on the component associated with the ST), in this embodiment, the management program 432 is prohibited from returning the finalized ST (an ST of the ST type "Release") to an edit state (Debug). When the management program 432 receives a request from the user to edit the finalized ST, the management program 432 generates a copy of the finalized ST and displays the ST copy as a target ST to be edited. As a variation, even if the ST has been finalized, the management program 432 may permit the finalized ST to return to the edit state if there is no service which is being executed or in a state of waiting to be executed (for example, if a service is not being created or has already been created based on the ST); and the management program 432 may be prohibited from returning the ST to the edit state if the ST has been finalized and there is at least one service which is being executed or in a state of waiting to be executed.

FIG. 9 illustrates the structure of the flow management table 424.

The flow management table 424 includes information about service flows. The flow management table 424 has a record for each service flow and each record stores a management number 901, a flow uk 902, a configuration component uk list 903, and a property mapping list 904.

The management number 901 is a serial number of the relevant record. The flow uk 902 is a unique key (number) of the relevant flow.

The configuration component uk list 903 is a list of uk's for components which constitute the relevant service flow. Regarding the configuration component uk list 903, the uk's for the components are aligned in the alignment order of components in the relevant service flow (as in the order of execution of the components).

The property mapping list 904 is a list of uk's for service properties of a service corresponding to the relevant service flow. Regarding the list 904, a uk of a service property is, for example, a combination of the component uk and the key name of the component. Incidentally, a combination of component properties of component uk's such as "{component uk(1).storage.pathinfo=component uk(2).storage.pathinfo}" means that an output value from one component becomes an input value to the other component.

FIG. 10 illustrates the structure of the ST property management table 425.

The ST property management table 425 includes information about ST properties. The ST property management table 425 has a record for each ST property and each record stores a management number 1001, an ST uk 1002, an ST property uk 1003, a display name 1004, a key name 1005, an input-output type 1006, a property group 1007, custom UI generation information 1008, and a property group uk 1009.

The management number 1001 is a serial number of the relevant record. The ST uk 1002 is an ST uk of an ST with which the relevant ST property is associated.

The ST property uk 1003 is a unique key (for example, a number) of the ST property.

The display name 1004 is an ST property name displayed on the screen. The key name 1005 is a name for uniquely identifying the relevant ST property and is an example of identification information of the ST property.

The input-output type 1006 is information for distinguishing whether the ST property is an ST input property or an ST output property (in other words, whether the value on the UI is an input value or an output value). The value of the input-output type 1006 is: "In" when the corresponding ST property is the ST input property; and "Out" when the corresponding ST property is the ST output property.

The property group 1007 indicates the name of a property group to which the relevant component property belongs. Specifically speaking, in this embodiment, at least one property group including "Null" described below exists and at least one of one or more component properties and one or more ST properties is associated with the property group. The value "Null" of the property group 1007 means that the corresponding ST property does not belong to any one of property groups. Furthermore, the property group uk 1009 is a unique key of the property group 1007.

The custom UI generation information 1008 indicates the type of a generated custom UI. The value "Null" of the custom UI generation information 1008 means that a default UI is associated with the corresponding ST property. Incidentally, the custom UI generation information may include custom UI generation details information (for example, the number of widgets, types of the respective widgets, display target text, and a list to be displayed). The custom UI generation details information (not shown) may be associated with the ST property. The custom UI may be generated based on the custom UI generation details information associated with the ST property.

FIG. 11 illustrates the structure of the service management table 426.

The service management table 426 includes information about services. The service management table 426 has a record for each service and each record stores a management number 1101, a service name 1102, a service description 1103, an ST uk 1104, and a service uk 1105.

The management number 1101 is a serial number of the relevant record. The service name 1102 is the name of the relevant service. The service description 1103 is an explanatory description about the service and may include, for example, processing and its sequential order of the service. The ST uk 1104 is an ST uk of an ST corresponding to the service. The service uk 1105 is a unique key (number) of the service.

FIG. 12 illustrates the structure of the service property setting table 427.

The service property setting table 427 includes information about service properties. The service property setting table 427 has a record for each service property and each record stores a management number 1201, a property set value 1202, an ST property uk 1203, and a service uk 1204.

The management number 1201 is a serial number of the relevant record. The property set value 1202 is an input value (or an output value) of the corresponding ST property. "Null" means that there is no input value (or output value). The ST property uk 1203 is an ST property uk of the corresponding ST property. The service uk 1204 is a service uk of the corresponding service.

FIG. 12 shows that five ST properties are associated with a service of the service uk "1" and values such as "STORAGEHOST" and "1" are input (or output) into/from five UI's (at least one of the default UI and the custom UI) which correspond to the five ST properties, respectively.

FIG. 19 illustrates the structure of the step management table 428.

The step management table 428 includes information about steps. The "steps" are elements of a service flow represented by an ST and the service flow is configured as the alignment of two or more components by associating the components with the elements. One component corresponds to one or more steps in an ST. Specifically speaking, one component (its version(s) may be the same or different) is sometimes associated with a plurality of steps. In the explanation of this embodiment, a component associated with any one of ST's can be called a "step." The step management table 428 has a record for each step and each record stores a management number 1901, an outdated ST uk 1902, an outdated ST version 1903, a step name 1904, a current component name 1905, a current version 1906, a latest component name 1907, a latest version 1908, and a status 1909.

The management number 1901 is a serial number of the relevant record. The outdated ST uk 1902 is a uk of an ST to which the relevant step belongs and whose version can be upgraded. When the version of the ST with which the step is associated (hereinafter referred to as the "target ST" in the explanation of FIG. 19) cannot be upgraded (for example, when any one of components associated with the target ST has only single version), the value of the outdated ST uk 1902 is a value meaning that the version cannot be upgraded (for example, "Null"). The step name 1904 is the name of the relevant step (for example, a display name) (for example, the same value as the display name 703 in FIG. 7). The current component name 1905 is the name of a component corresponding to the step (the current component) (for example, the display name). The current version 1906 indicates the version of the current component corresponding to the step. The latest component name 1907 is the name of a component of the latest version of the current component corresponding to the step (the latest component) (for example, the display name). The latest version 1908 indicates the version of the latest component corresponding to the step. When no component of the latest version exists (in other words, when the current version is the latest version), the value of the latest component name 1907 and the value of the latest version 1908 are respectively a value meaning that no component of the latest version exists (for example, "Null"). Furthermore, regarding a component after a version change, the management program 432 receives input of a component name, which is different from the component name of the component before the version change, from the user, for example, when changing the version of the component and can associate the different component name with the component after the version change. Therefore, the current component name 1905 may be sometimes different from the latest component name 1907 regarding the same step. Furthermore, a component is used naturally not only by the user who created it, but also by other users (for example, an ST created by the ST creation user) and a versatile display name can be defined as the step name 1904. Specifically speaking, a display name as a step can be defined separately from a display name of a component. Furthermore, since a step is unique (the same step does not exist for a plurality of ST's), it can be said that the purpose of processing executed by a step is clearer than that for a component. For example, at least either substantiation or differentiation of the processing content can be realized by setting values to the properties of a step and defining the sequential execution order. As display names of steps are defined separately from display names of components, it can be expected that the user can easily identify what kind of processing will be executed in a service flow. The status 1909 indicates whether a version change of the step associated with the target ST has been made or not. When the version change has been made, the value of the status 1909 is "Applied"; and when the version change has not been made or when the latest version does not exist, the value of the status 1909 is "Not applied."

FIG. 38 illustrates the structure of the property group management table 429.

The property group management table 429 includes information about all property groups registered in the system. The property group management table 429 has a record for each property group and each record stores a management number 3801, a property group uk 3802, a property group name 3803, and an ST uk 3804.

The management number 3801 is a serial number of the relevant record. The property group uk 3802 is a unique key of the relevant property group. Furthermore, the property group name 3803 is the name of the corresponding property group and the ST uk 3804 is a unique key of an ST with which the corresponding property group is associated.

FIG. 39 illustrates the structure of the property mapping management table 430.

The property mapping management table 430 includes information about association of properties defined in all the ST's (property mapping). The property mapping management table 430 has a record for each association of the properties and each record stores a management number 3901, the property mapping uk 3902, a mapping source ST property uk 3903, a mapping source component property uk 3904, a mapping destination ST property uk 3905, and a mapping destination component property uk 3906.

The management number 3901 is a serial number of the relevant record. The property mapping uk 3902 is a unique key of the corresponding property mapping. Furthermore, when a mapping source (the side to assign a value of the property) for the corresponding property mapping is an ST property, the mapping source ST property uk 3903 is a unique key of that ST property; and when the mapping source for the corresponding property mapping is a component property (to be exact, a component output property), the mapping source component property uk 3904 is a unique key of that component property.

When a mapping destination (the side to receive a value of the property) for the corresponding property mapping is an ST property, the mapping destination ST property uk 3905 is a unique key of that ST property; and when the mapping destination for the corresponding property mapping is a component property (to be exact, a component input property), the mapping destination component property uk 3906 is a unique key of that component property.

Incidentally, "Null" in FIG. 39 means that no input value (or output value) exists.

FIG. 40 illustrates the structure of the pre-component-version-upgrade property mapping management table 431.

The pre-component-version-upgrade property mapping management table 431 includes information about association of mapping defined by all ST's before the version upgrade of each component whose version has been upgraded. The pre-component-version-upgrade property mapping management table 431 has a record for each mapping of properties regarding each component whose version has been upgraded and each record stores a management number 4001, a property mapping uk 4002, a mapping source ST property uk 4003, a mapping source component property uk 4004, a mapping destination ST property uk 4005, and a mapping destination component property uk 4006.

The management number 4001 is a serial number of the relevant record. The property mapping uk 4002 is a unique key of the corresponding property mapping. Furthermore, when a mapping source (the side to assign a value of the property) for the corresponding property mapping is an ST property, the mapping source ST property uk 4003 is a unique key of that ST property; and when the mapping source for the corresponding property mapping is a component property (to be exact, a component output property), the mapping source component property uk 4004 is a unique key of that component property.

When a mapping destination (the side to receive a value of the property) for the corresponding property mapping is an ST property, the mapping destination ST property uk 4005 is a unique key of that ST property; and when the mapping destination for the corresponding property mapping is a component property (to be exact, a component input property), the mapping destination component property uk 4006 is a unique key of that component property.

Incidentally, "Null" in FIG. 40 means that no input value (or output value) exists.

The structures of the tables 421 to 431 have been explained above. Incidentally, in the above explanation, the identification information such as the display name, the key name, and the uk may be information which is input by the user or information determined by the management program 432.

Respective examples about the details of the relationship between the ST input properties and the ST output properties and the details of UI generation/display will be explained below.

Figure 13:
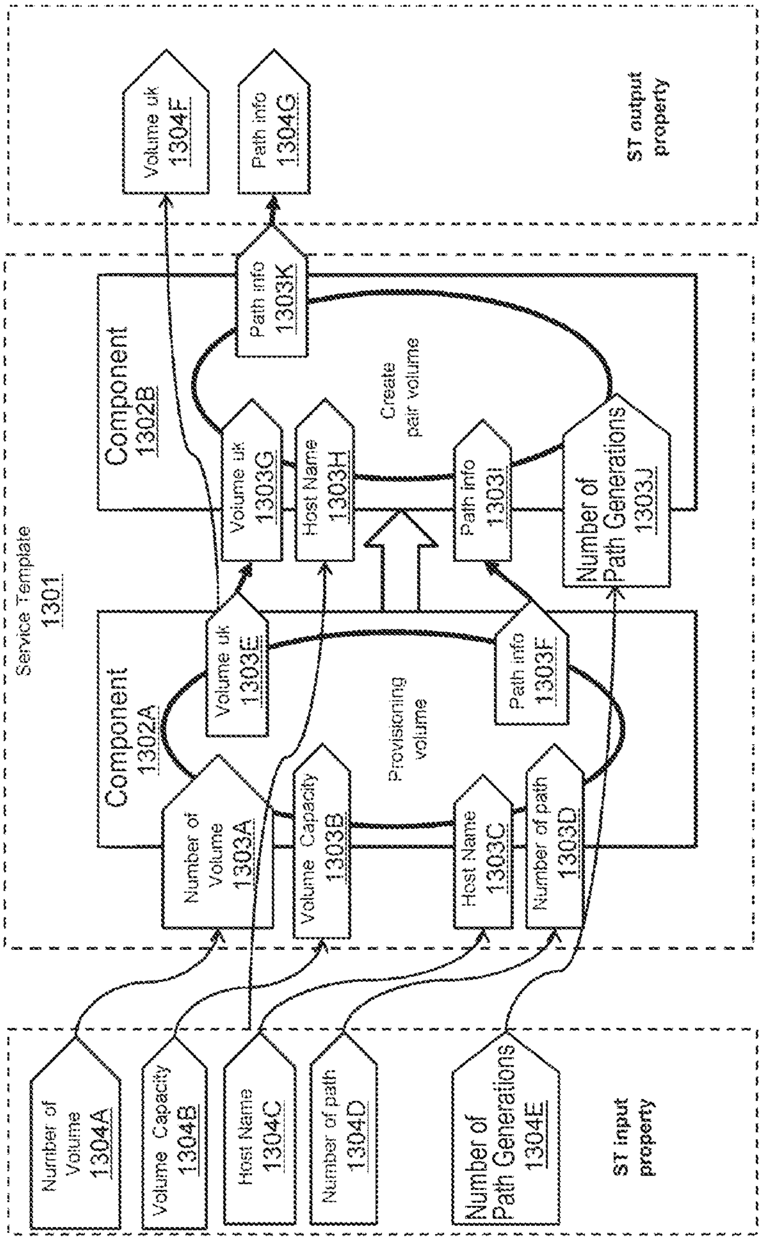
FIG. 13 illustrates an example of the relationship between ST input properties and ST output properties.

FIG. 13 illustrates an example of the relationship between the ST input properties and the ST output properties.

A service flow corresponding to an ST 1301 is composed of a component 1302A ("Provisioning Volume") and a component 1302B ("Create pair volume"). In the service flow, the sequential execution order is set so that the component 1302B is executed after the component 1302A.

The component 1302A is associated with four component input properties 1303A to 1303D. Display names of the four component input properties 1303A to 1303D are "Number of Volume," "Volume Capacity," "Host Name," and "Number of Path," respectively. Furthermore, the component 1302A is associated with two component output properties 1303E and 1303F. Display names of the two component output properties 1303E and 1303F are "Volume uk" and "Path info," respectively.

The component 1302B is associated with four component input properties 1303G to 1303J. Display names of the four component input properties 1303G to 1303J are "Volume uk," "Host Name," "Path info," and "Number of Path Generations," respectively. Furthermore, the component 1302B is associated with one component output property 1303K. A display name of the component output property 1303K is "Path info."

Regarding these component properties, the component output property 1303E of the display name "Volume uk" and the component input property 1303G of the same display name "Volume uk" have the same key name. Similarly, the component output property 1303F of the display name "Path info" and the component input property 13031 of the same display name "Path info" have the same key name. As a result, an output value from the component output property 1303E becomes an input value of the component input property 1303G; and furthermore, an output value from the component output property 1303F becomes an input value of the component input property 13031. Accordingly, regarding "Volume uk" and "Path info," the output values are used as the input values as they are. So, the ST creation user does not have to input values for "Volume uk" and "Path info." Therefore, erroneous inputs can be prevented.

The ST 1301 of the service flow including such components are associated with ST input properties 1304A to 1304E and ST output properties 1304F and 1304G by the management program 432. The ST input property 1304A is an ST input property generated based on the component input property 1303A and, therefore, the display name is "Number of Volume." The ST input property 1304B is an ST input property generated based on the component input property 1303B and, therefore, the display name is "Volume Capacity." The ST input property 1304C is an ST input property generated based on the component input properties 1303C and H and, therefore, the display name is "Host Name." The ST input property 1304D is an ST input property generated based on the component input property 1303D and, therefore, the display name is "Number of Path." The ST input property 1304E is an ST input property generated based on the component input property 1303J and, therefore, the display name is "Number of Path Generations." The ST output property 1304F is an ST input property generated based on the component output property 1303E and, therefore, the display name is "Volume uk." The ST output property 1304G is an ST input property generated based on the component output property 1303K and, therefore, the display name is "Path info." These ST input properties and ST output properties are generated by the management program 432 based on the component input properties and the component output properties, respectively.

Figure 14:
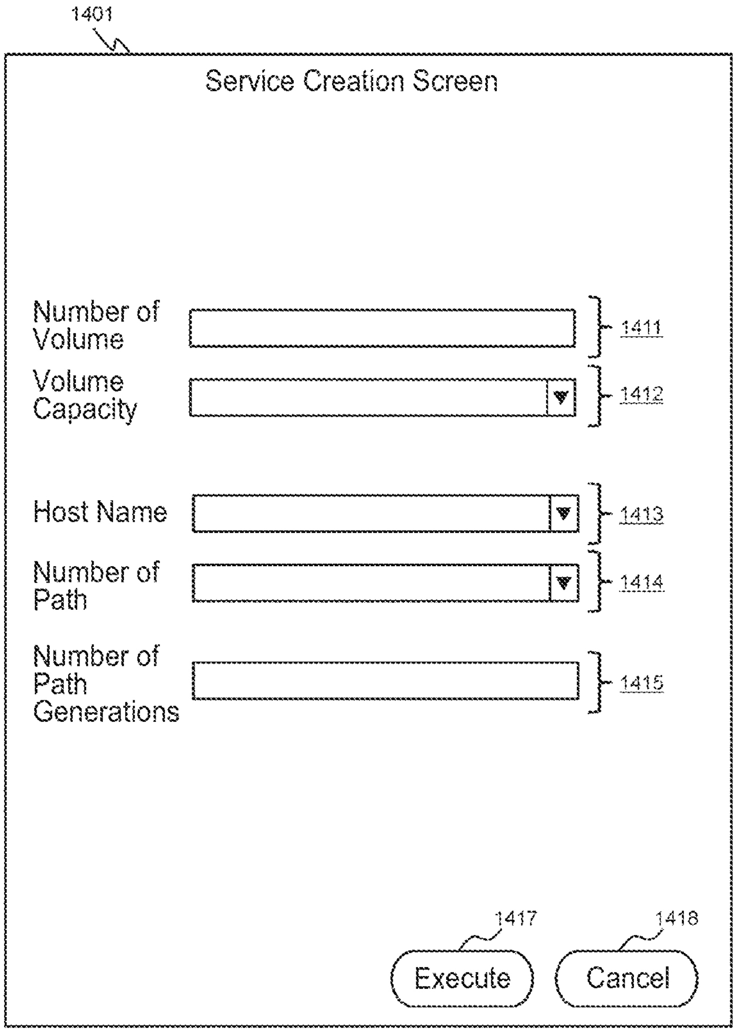
FIG. 14 illustrates an example of a service creation screen corresponding to the ST in FIG. 13.

FIG. 14 is an example of the service creation screen corresponding to the ST in FIG. 13.

A service creation screen 1401 is where UI's 1411 to 1415 which correspond to the ST input properties 1304A to 1304E, respectively, are displayed. Each of the UI's 1411 to 1415 is a UI generated by the management program 432. Among the UI's 1411 to 1415, each of the UI's 1411 and 1415 is a default UI and each of the UI's 1412 to 1414 is a custom UI. Each of the UI's 1411 to 1415 is generated based on the custom UI generation information associated with the relevant ST input property.

The service creation screen 1401 is provided with an execute button 1417 and a cancel button 1418. If the ST creation user thinks that values which are input to the UI's 1411 to 1415 are fine, they press the execute button 1417 and a service is thereby created based on the input values and a command to execute the service is transmitted to the computer management system. If the ST creation user wants to cancel the values which are input to the UI's 1411 to 1415, they press the cancel button 1418 and all the UI's 1411 to 1415 are thereby changed to blanks.

Incidentally, whether the UI's displayed on the service creation screen 1401 are default UI's or custom UI's depend on the custom UI generation information which is associated with the ST properties of the ST. So, all the UI's displayed on the screen 1401 may sometimes be custom U I's.

Furthermore, the management program 432 may display UI's for each property group based on which property group each of the ST input properties 1304A to 1304E belongs to. For example, two or more UI's which belong to the same property group may be surrounded with one frame. If the ST properties of the same field belong to the same property group, the positions of UI's become the positions according to the property group. As a result, improvements of visibility can be expected.

A specific example of display in this embodiment will be explained below.

Figure 15:
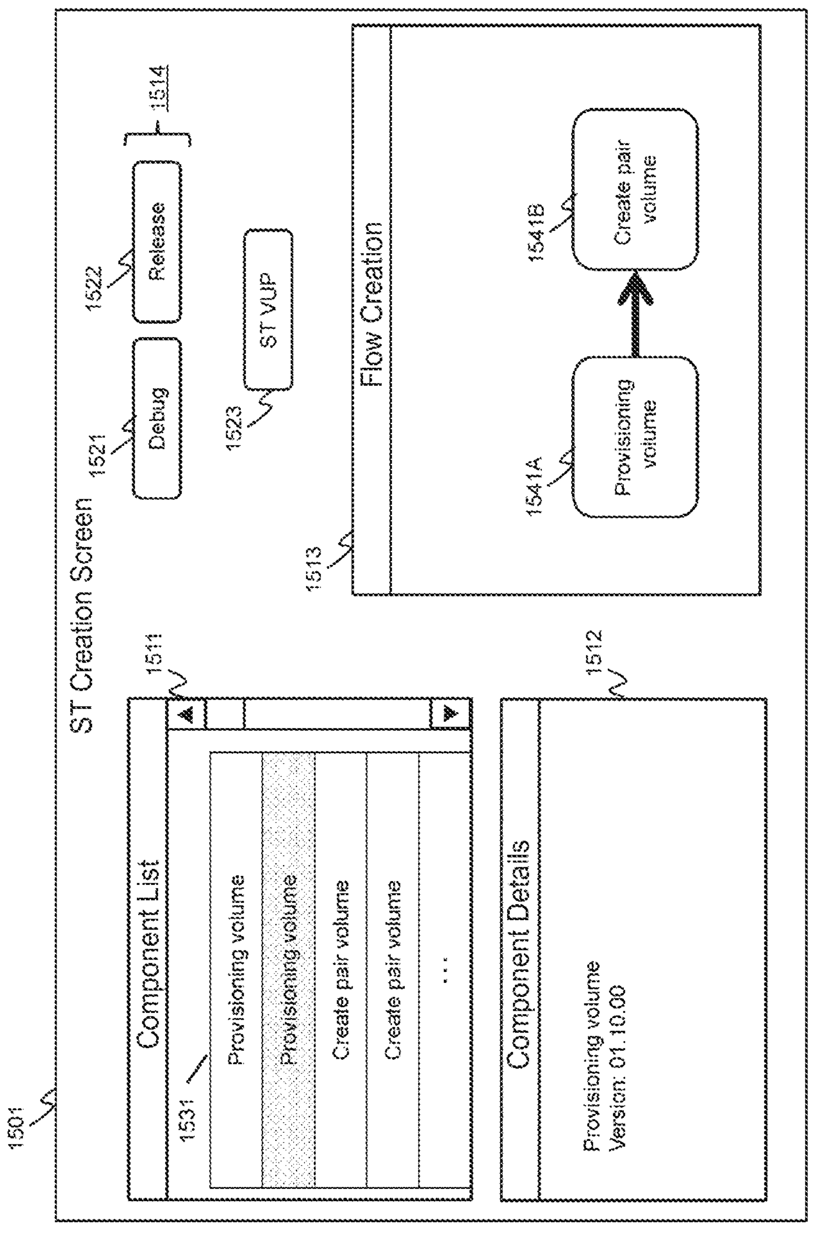
FIG. 15 illustrates an example of an ST creation screen.

FIG. 15 illustrates an example of an ST creation screen.

An ST creation screen 1501 includes a component list plane 1511, a component details plane 1512, a flow creation plane 1513, an ST type selection tool 1514, and an ST VUP button 1523.

The component list plane 1511 is where a component name list (a list of component names recorded in the component management table) 1531 of managed components is displayed by the management program 432.

The component details plane 1512 is where the details corresponding to a component selected from the component list 1531 (for example, a component name and a version) are displayed by the management program 432.

The flow creation plane 1513 is where icons 1541A and 1541B of components selected from the component list 1531 are displayed in accordance with the user operation and a service flow is defined by connecting the component icons 1541A and 1541B. For example, the management program 432 displays the icons 1541A and 1541B of the components in the flow creation plane 1513 in accordance with the user operation to drag the components selected from the component list 1531 and drop them in the flow creation plane 1513. Every time a component is dragged from the component list 1531 and dropped, the management program 432 adds the component icon to the flow creation plane 1513. Furthermore, the management program 432 puts an arrow link from a first component icon to a second component icon in accordance with the user operation and thereby defines that the second component should be executed after the first component.

The ST type selection tool 1514 includes a Debug button 1521 and a Release button 1522. When the Release button 1522 is pressed, the management program 432 saves an ST of a service flow, which is displayed on the flow creation plane 1513, as the ST type "Release." On the other hand, when the Debug button 1521 is pressed, the management program 432 saves the ST of the service flow, which is displayed on the flow creation plane 1513, as the ST type "Debug."

The ST VUP button 1523 is a button to command an ST version upgrade. When the ST VUP button 1523 is pressed, the management program 432 displays an ST list screen described later (see FIG. 27).

The structure of the ST creation screen 1501 has been explained above.

If there is any newly imported component, the component list 1531 on the ST creation screen 1501 includes the component name of the newly imported component. When the ST creation user selects the component name of the new component and performs the user operation to display its related ST's (that is, when the ST creation user designates the selected component name as a related ST display target), the management program 432 displays a related ST list for each version, for example, in a pop-up manner.

Figure 16:
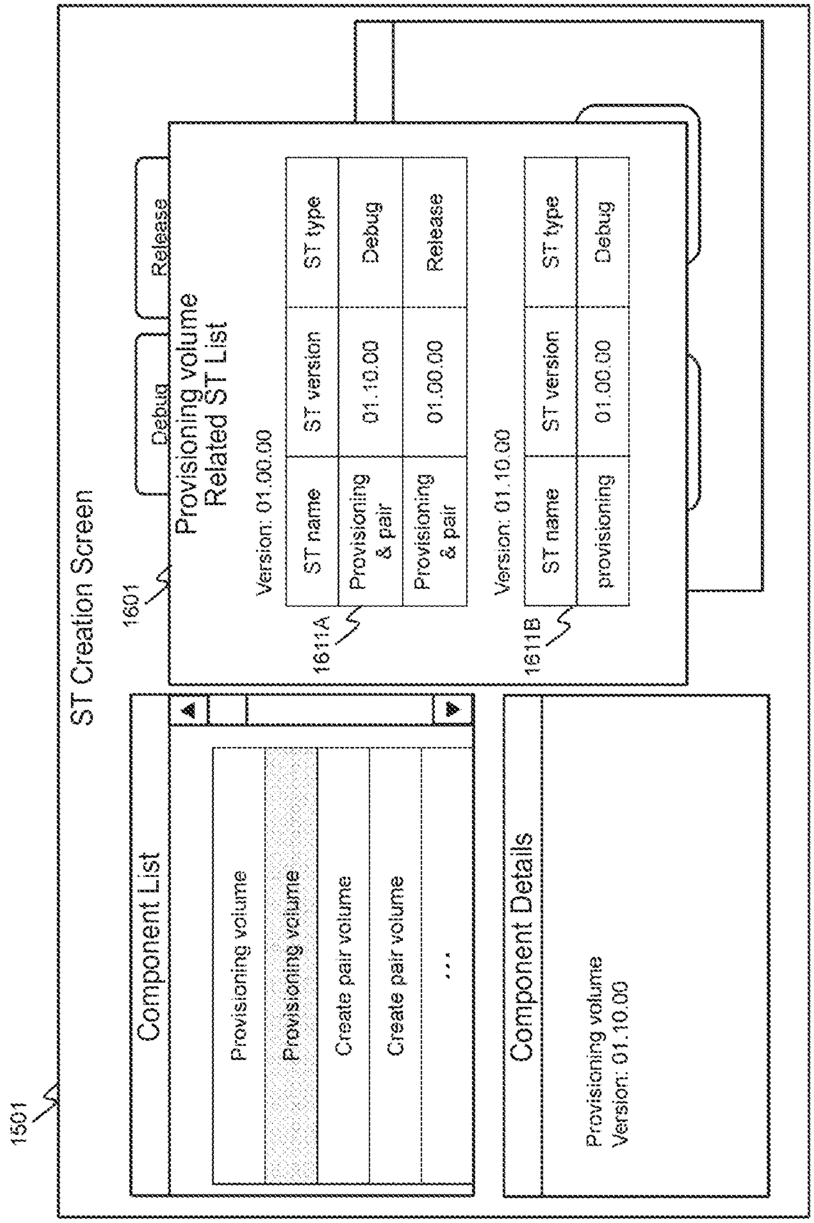
FIG. 16 illustrates an example of a related ST list for each version.

FIG. 16 illustrates an example of the related ST list for each version.

The management program 432 identifies the version and the component uk of the same component name from the component management table 421 as the component name selected from the component list 1531. The management program 432 identifies a flow uk corresponding to the identified component uk from the flow management table 424 and identifies an ST name and ST type corresponding to the identified flow uk from the ST management table 423. Accordingly, the management program 432 generates and displays related ST lists (lists of ST names, versions, and ST types of the related ST's) 1611A and 1611B for each version of the component selected from the component list 1531. These lists 1611A and 1611B are displayed, for example, on a pop-up screen 1601 on the ST creation screen 1501.

For example, when a new component is imported, the ST creation user normally examines whether or not it is necessary to adapt the new component to an existing ST which uses the component of an old version. When this happens, which ST should be enhanced is unclear unless the relationship between the component and the ST can be recognized.

According to this embodiment, the related ST's (ST's which are associated with components with the same component name as that of the selected component) are displayed for each version with respect to the component selected from the component list 1531. Accordingly, the ST creation user can recognize ST's which are using components with the same component name as that of the selected component. Therefore, when a new component is imported, which ST needs the replacement with the new component can be easily determined.

Incidentally, the user operation to display the related ST list may be performed before updating the component. For example, the management program 432 displays the related ST's for the component in order for the ST creation user to judge whether to update the component or not. When the ST creation user finds that the ST type "Release" does not exist with respect to the component, the ST creation user may determine to update the selected component without updating its version. On the other hand, when the ST creation user finds that the ST type "Release" exists with respect to the component, the ST creation user may determine to update the selected component and also update its version.

Meanwhile, a service can be created by using the service creation screen on the basis of an ST created by using the ST creation screen 1501 as described above.

Figure 17:
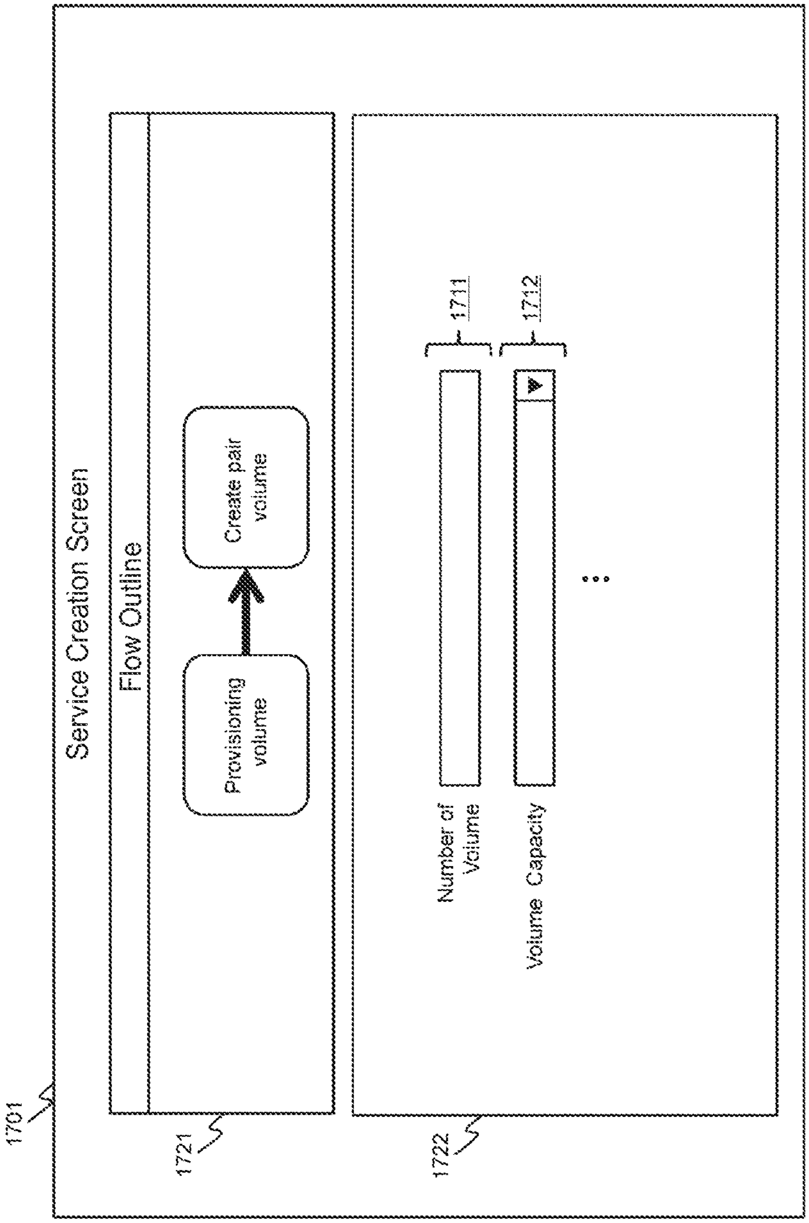
FIG. 17 illustrates a specific example of a service creation screen.

FIG. 17 illustrates a specific example of the service creation screen.

A service creation screen 1701 includes a flow outline plane 1721 and a UI plane 1722. The management program 432 generates a schematic diagram of a service flow of a finalized ST, for example, on the basis of the flow management table 424 and displays the generated schematic diagram on the flow outline plane 1721.

Furthermore, the management program 432: generates a UI based on custom UI generation information which is associated with an ST input property of the finalized ST; and displays the generated UI on the UI plane 1722. For example, both a default UI 1711 and a custom UI 1712 coexist in the UI plane 1722 as illustrated in the drawing.

The custom UI has higher usability than that of the default UI and it is easier for the service creation user to input a value. Therefore, for example, whether or not any effective custom UI generation information (the custom UI generation information which is not "Null") is associated or not may be also displayed, in addition to the component name, in the component list 1531 on the ST creation screen 1501 illustrated in FIG. 16. If there are a component(s) associated with the custom UI and a component(s) which is/are not associated with the custom UI among a plurality of components with the same component name, the ST creation user selects the component, which is associated with the custom UI, as the component to be associated with an ST. Accordingly, it is possible to create the ST in to which a value can be easily input when creating a service.

Incidentally, a schematic diagram of the ST service flow may be displayed on the service creation screen 1701, for example, as illustrated in the drawing.

The processing executed in this embodiment will be explained below.

Figure 20:
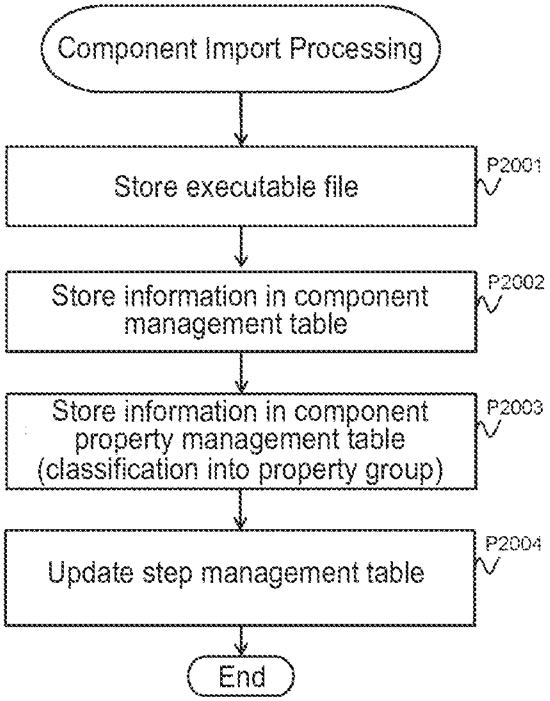
FIG. 20 illustrates a flowchart of component import processing.

FIG. 20 illustrates a flowchart of component import processing.

The management program 432 receives an information package of a component (including, for example, an executable file and component properties) and stores the executable file of the component in the memory 412 (or an auxiliary storage apparatus such as an external storage apparatus) (P2001). The information package of the component may include a part or whole of the custom UI generation information.

The management program 432 stores information such as a path name of the executable file in the component management table 421 (P2002).

Furthermore, the management program 432 stores information about the component properties in the component property management table 422 (P2003). Incidentally, part of attributes of the component property management table 422 may be added or changed by a component providing user or the ST creation user after the component is imported. For example, there may be a case where it is not desirable to confuse the display name 703 with a display name of another component. Then, since the positions of UI's can be grouped with respect to a property group, the ST creation user may add or change the property group.

Furthermore, the management program 432 updates the step management table 428 as necessary (P2004). Specifically speaking, for example, the management program 432 may search the step management table 428 for an old-version step (component) of the imported component. When the management program 432 finds the old-version step (component), it may update the latest component name 1907 and the latest version 1908 corresponding to the found step. Furthermore, when a value of the status 1909 corresponding to the found step (component) is "Applied," the management program 432 may update the value to "Not applied." Furthermore, when the respective values of the outdated ST uk 1902 and the outdated ST version 1903 corresponding to the found step (component) are "Null," the management program 432 may update the value of the outdated ST uk 1902 to an uk of an ST associated with the found step and may update the value of the outdated ST version 1903 to a version of the ST associated with the found step.

In this embodiment, the custom UI generation information does not exist in the operation automation system 301 in advance (that is, the custom UI generation information is not built in the operation automation system 301), but it is input incidentally along with the component to be imported. Accordingly, an appropriate UI for the component to be imported can be automatically added as an operation target of the operation automation system 301 at the appropriate timing of importing the component.

Incidentally, regarding the component import processing of a component of a different version even with the same component name, a new component uk is assigned to the imported component in the component management table. Therefore, components to be used for ST's and services which have already been created will not be changed automatically. This advantage has been explained earlier. However, if the imported component has the same component name, but is of a different version, the components to be used for the ST's and the services which have already been created may be automatically changed by the component import processing by, for example, assigning the same component uk as that of the conventional version.

Figure 21:
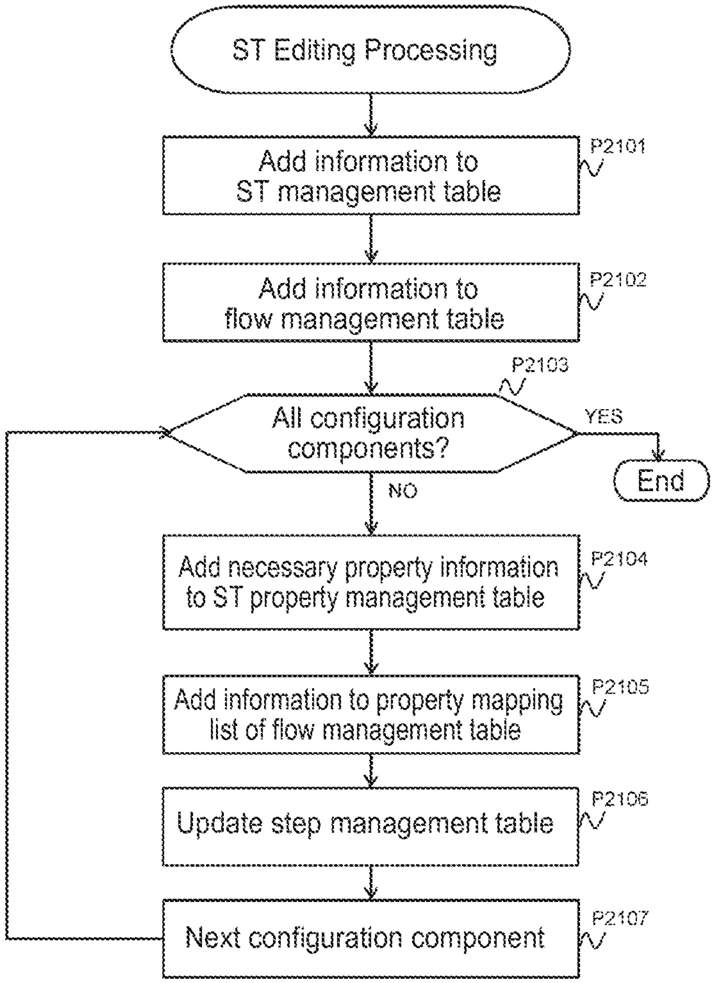
FIG. 21 illustrates a flowchart of ST editing processing.

FIG. 21 is a flowchart of ST editing processing.

The ST editing processing is processing in the ST creation processing. The ST creation user puts necessary components in the flow creation plane 1513 on the ST creation screen 1501 and determines the sequential order of the components and the ST editing processing illustrated in FIG. 21 is processing for temporarily saving an ST of a service flow in the flow creation plane 1513.

The management program 432 stores information about the ST (such as the ST name, the ST version, and the ST uk) in the ST management table 423 (P2101). Furthermore, the management program 432 stores information about a service flow of the ST (such as the flow uk and the configuration component uk list) in the flow management table 424 (P2102).

The management program 432 executes P2104 to P2107 with respect to each of all components indicated by the configuration component uk list of the service flow of the ST (for example, in the sequential order of components indicated by the configuration component uk list) (P2103). Specifically speaking, the management program 432 stores information about ST properties corresponding to component properties of the components, which are selected from the configuration component uk list, in the ST property management table 425 (P2104). This processing includes storing values of the custom UI generation information 708 and the property group 707 of the component property management table in the custom UI generation information 1008 and the property group 1007 of the ST property management table 425. In P2104, for example, the management program 432 judges whether an output property of the previous component can be associated with an input property of the next component or not (whether their key names are the same or not); and if the judgment result is affirmative, the management program 432 may associate the output property with the input property. The management program 432 adds information, which is based on the ST properties stored in P2104, in the corresponding property mapping list 904 (P2105). The management program 432 updates the step management table 428 and, for example, adds a record corresponding to the components (steps), which are associated with the ST, to the step management table 428 (P2106). Then, the management program 432 selects the next component from among the components indicated by the configuration component uk list (P2107). Incidentally, when an input property of a certain component is associated with an output property of another component, registration in the ST property management table 425 may be omitted.

Figure 22:
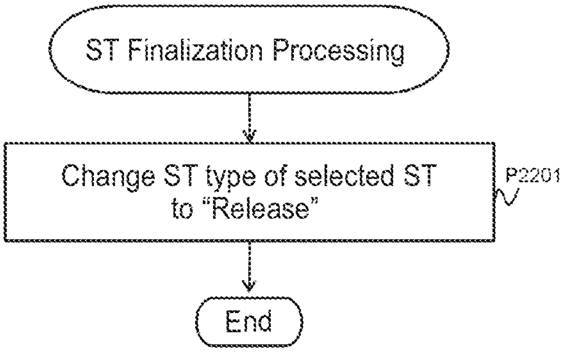
FIG. 22 illustrates a flowchart of ST finalization processing.

FIG. 22 is a flowchart of ST finalization processing.

The management program 432 receives designation of the ST type "Release" with respect to an ST selected from created (registered) ST's and changes the ST type of the ST from "Debug" to "Release" (P2201). Regarding the ST whose ST type has been changed to "Release," the management program 432 prohibits editing of such ST. Incidentally, possible examples of such editing prohibition include rejecting the user operation regarding editing and making it impossible to select the ST, regarding which editing is prohibited, when performing editing.

Figure 23:
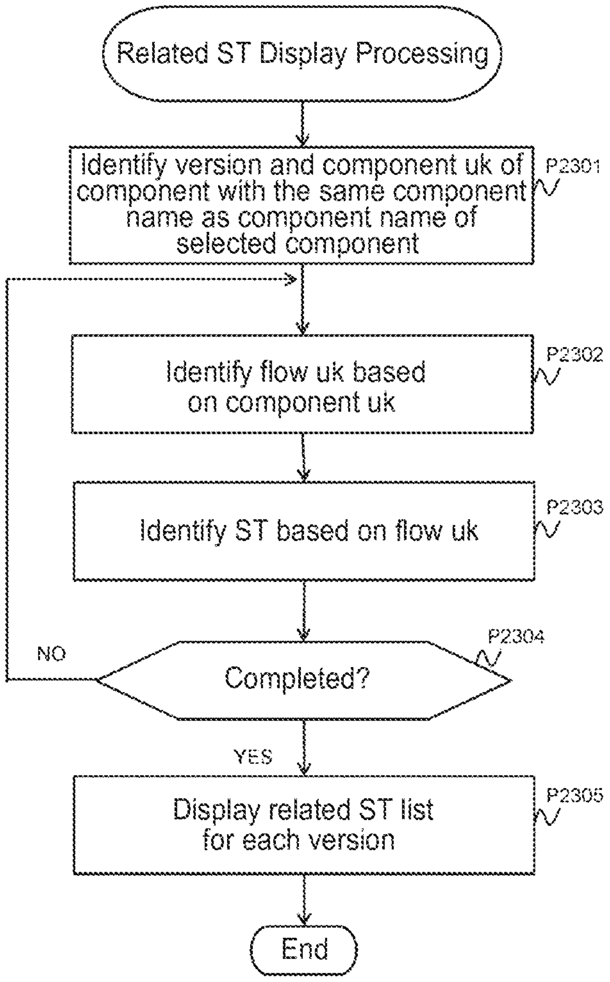
FIG. 23 illustrates a flowchart of related ST display processing.

FIG. 23 is a flowchart of related ST display processing.

The management program 432 identifies the version and component uk, which have the same component name as that of the selected component (for example, the component selected from the component list 1531 in FIG. 15), from the component management table 421 (P2301). The management program 432 identifies the flow uk, which corresponds to the identified component uk from the flow management table 424 (P2302). The management program 432 identifies the ST name and the ST type, which correspond to the identified flow uk, from the ST management table 423 (P2303). The management program 432 executes P2302 and P2302 with respect to all component uk's identified in P2301 (P2304). Then, the management program 432 generates and displays a related ST list (a list of ST names, versions, and ST types of related ST's) for each version of the selected component (P2305).

Figure 24:
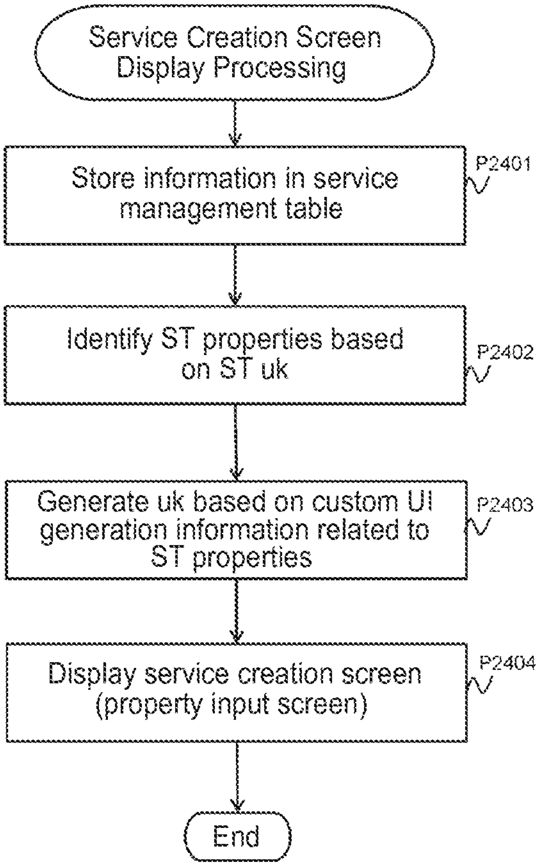
FIG. 24 illustrates a flowchart of service creation screen display processing.

FIG. 24 is a flowchart of processing for displaying the service creation screen 1701.

The management program 432 receives the selection of the finalized ST from the service creation user and stores service information (for example, the ST uk) corresponding to the selected ST in the service management table 426 (P2401). The management program 432 identifies information about all ST properties, which correspond to the ST uk of the selected ST, from the ST property management table 425 (P2402). The management program 432: generates a UI (a default UI or a custom UI) with respect to each ST input property on the basis of the custom UI generation information 1008 which is associated with the identified ST property (P2403); and displays the service creation screen 1701 (property input screen) including the generated UI's (P2404).

Incidentally, component properties of the corresponding components may be identified by referring to values of the property mapping list 904 of the flow management table 424 instead of the custom UI generation information 1008 to which P2403 refers, and reference may be made to the custom UI generation information 708 of the component property management table 422. This is because when deciding a UI on the service generation screen, a highly convenient screen can be generated without having the ST creation user design the service creation screen for each ST by, whether directly or indirectly, referring to the custom UI generation information of the components.

Figure 25:
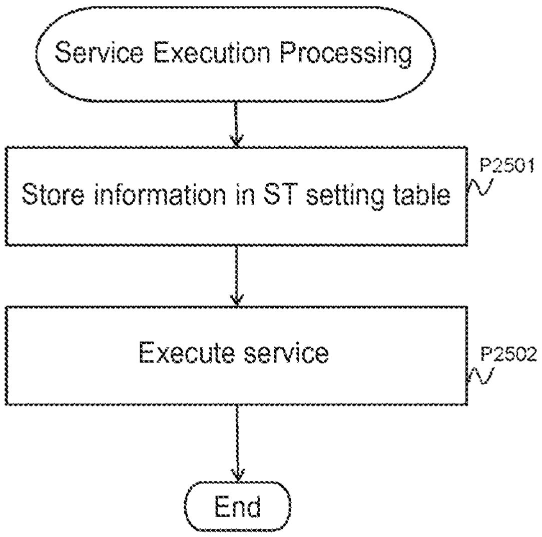
FIG. 25 illustrates a flowchart of service execution processing.

FIG. 25 is a flowchart of service execution processing.

When values are input to the UI's on the screen displayed by the processing in FIG. 24 and the execution is designated by the service creation user, the service execution processing is started. Incidentally, as the created service is registered and enters a state of waiting for execution, the service execution processing may be dissociated by designating the execution of the service in the state of waiting for execution.

The management program 432 stores the values, which are input to the service creation screen 1701 (the property input screen), in the service property setting table 427 (P2501). Then, the management program 432 executes the service based on the set values which have been input (P2502). Specifically speaking, the management program 432 performs, for example, the following.

(A) The management program 432 selects an ST on which the service is based.

(B) The management program 432 refers to the configuration component uk list 903 of the flow of the ST selected in (A) and identifies components to be executed together with the sequential execution order.

(C) The management program 432 executes the components as identified in (B). In (C), the management program 432 selects an input property of an appropriate service property or an output property of another component and input that value by referring to the property mapping list 904. The input value is an input value which is set to the input property of the execution target component. Incidentally, the "execution of the component" means to execute an executable file described in the executable file path 604.

(D) After executing the components in accordance with the sequential execution order, the management program 432 selects an output property of the component which is related to the output property of the ST by referring to the property mapping list 904, and displays the value as the execution result of the service as the output property of the ST. Incidentally, needless to say, the processing of the custom UI and the property group may also be applied to the execution result of the service.

Incidentally, the processing content described in the executable file is typically to transmit requests, such as a change of the configuration to the operation target apparatus or acquisition of configuration information, metric information, and status from the operation target apparatus, directly or indirectly to the operation target apparatus. Incidentally, an example of direct transmission of a request to the operation target apparatus is a case where the operation automation system directly transmits the request to the operation target apparatus; and possible examples of indirect transmission of a request are a case where the request is transmitted to the computer management system 302 and a case where a maintenance message is transmitted to a customer engineer of the operation target apparatus and the customer engineer performs maintenance services as the operation of the operation target apparatus.

Figure 26:
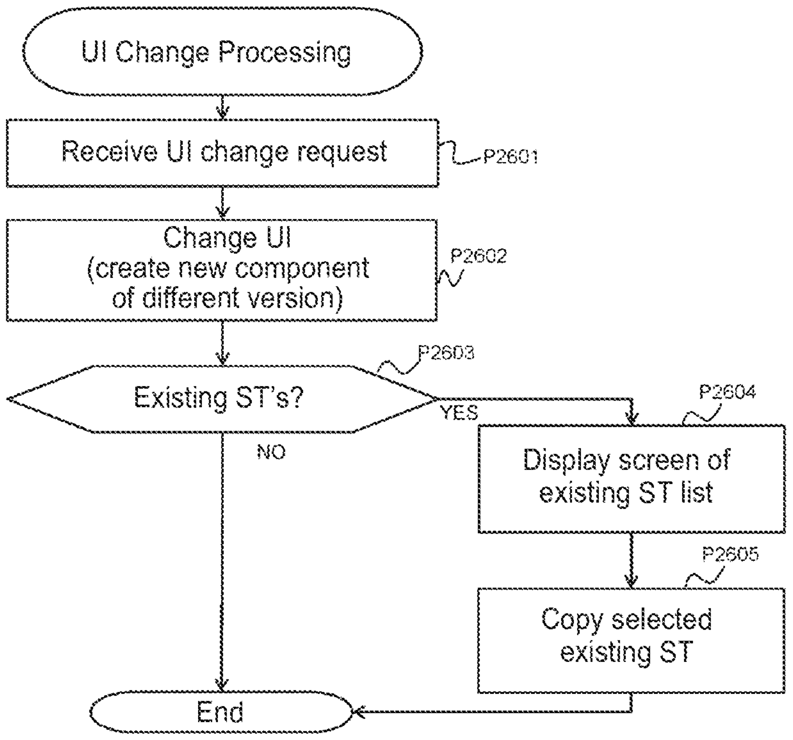
FIG. 26 illustrates a flowchart of UI change processing.

FIG. 26 is a flowchart of UI change processing.

The management program 432 receives a UI change request (P2601) and executes P2602. In P2602, the management program 432 executes the UI change in accordance with the UI change request. When the UI is changed, the management program 432 creates a copy of a component associated with the pre-change UI and then assigns a new version (a version different from the version of the component associated with the pre-change UI) to the component copy. Then, the management program 432 associates the changed UI (the custom UI generation information indicating the changed UI) with the component copy. The management program 432 stores (or adds) information about the component copy (the component of a new version) in the component management table 421 and stores (or adds) information about component properties associated with the component copy in the component property management table 422. Incidentally, if the component associated with the change target UI is not associated with any existing ST (or any existing finalized ST [ST of the ST type "Release"]), the management program 432 may accept the UI change without creating a copy of the component.

The management program 432 judges whether the US designated by the change request is associated with an existing ST or not (P2603).

If the judgment result of P2603 is affirmative (P2603: YES), the management program 432 displays a list screen of existing ST's related to the existing component (P2604). When this happens, the management program 432 creates a copy of the existing ST selected by the user (for example, creates a new ST of a different version based on the existing ST) (P2605) and replaces the existing component, which is used by the created ST copy, with a component of a new version. As a result, associating the changed UI with the existing ST is avoided. The "existing ST" herein used is an ST of the ST type "Release" and an ST of the ST type "Debug" may be excluded.

Incidentally, the component UI change processing may be implemented in cases other than the above-described case. For example, a case where the component providing user imports a component whose version has become new or imports an ST as a component as a result of updating the UI is a case where the version upgrade is performed by changing the custom UI generation information related to the ST.

<ST Version Upgrade>

Next, the details of the ST version upgrade will be explained.

Figure 27:
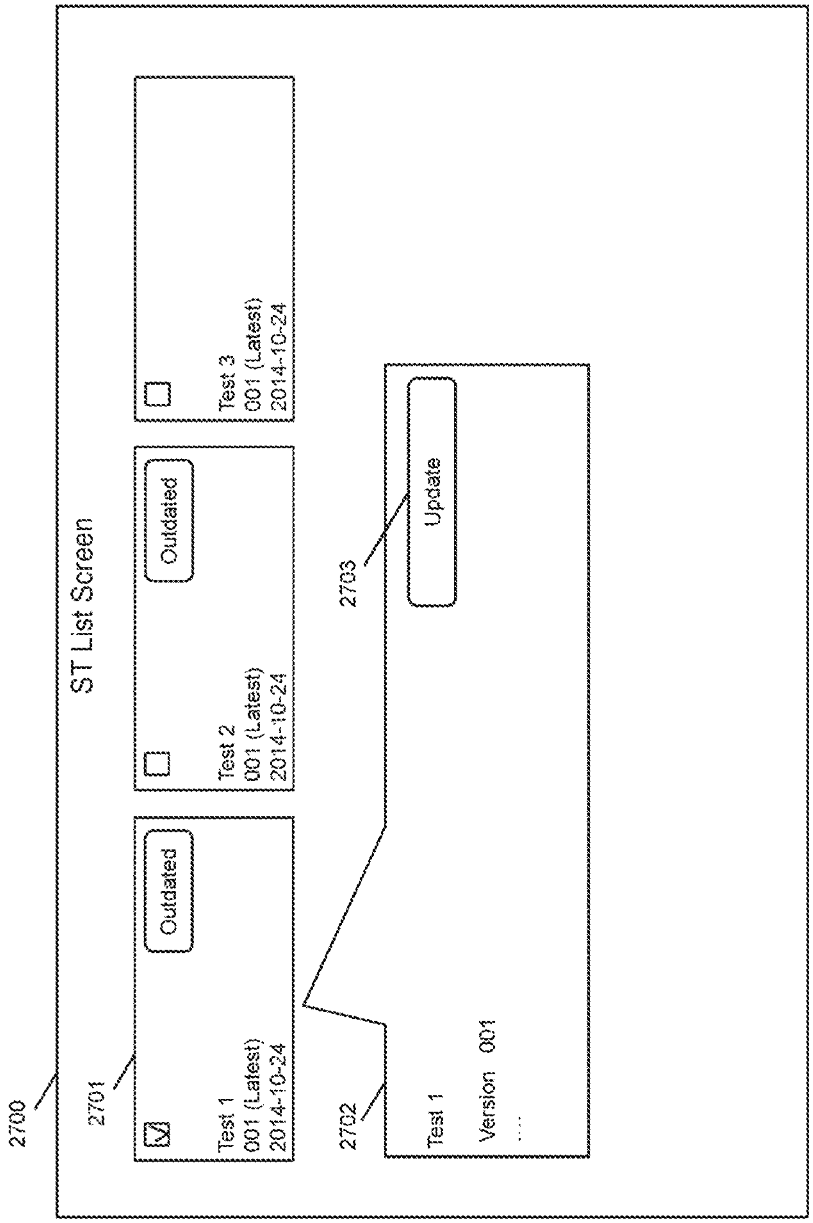
FIG. 27 illustrates the structure of an ST list screen.

FIG. 27 illustrates the structure of an ST list screen.

The ST list screen 2700 is a screen for displaying an ST list. Specifically speaking, the management program 432 identifies a plurality of ST's based on the ST management table 423 and displays the ST list screen 2700 which displays a plurality of ST blocks (display objects) 2701 corresponding to the plurality of identified ST's, respectively.

The management program 432 may judge whether the relevant ST is an ST whose version can be updated or not (in other words, whether a component of the latest version exists and is associated with a component (step) of an old version or not), based on the step management table 428 with respect to each of the plurality of identified ST's. For example, if each value of the outdated ST uk 1902 and the outdated ST version 1903 is not "Null" and the relevant ST is an ST associated with the status 1909 "Not applied," the judgment result may be affirmative. If the judgment result is affirmative, the management program 432 displays the ST block 2701 by associating the ST block 2701 with a display object meaning that it is the ST whose version can be upgraded, for example, a mark which displays "Outdated." The ST creation user can tell whether the version of the ST can be upgraded or not, by checking whether the mark "Outdated" exists or not. Accordingly, the ST creation user can easily decide the timing to upgrade the version of each ST.

A checkbox is displayed for each ST block 2701. When a check mark is entered in the checkbox, the management program 432 identifies the details of the relevant ST corresponding to the ST block 2701, in which the check mark is entered, from, for example, the ST management table 423 and displays the identified details 2702. Furthermore, the management program 432 displays an "Update" button 2703 with respect to the ST block 2701 in which the check mark is entered. When the "Update" button 2703 is pressed, the ST corresponding to the pressed "Update" button 2703 becomes a designated ST and an ST version upgrade screen is displayed by the management program 432.

Figure 28:
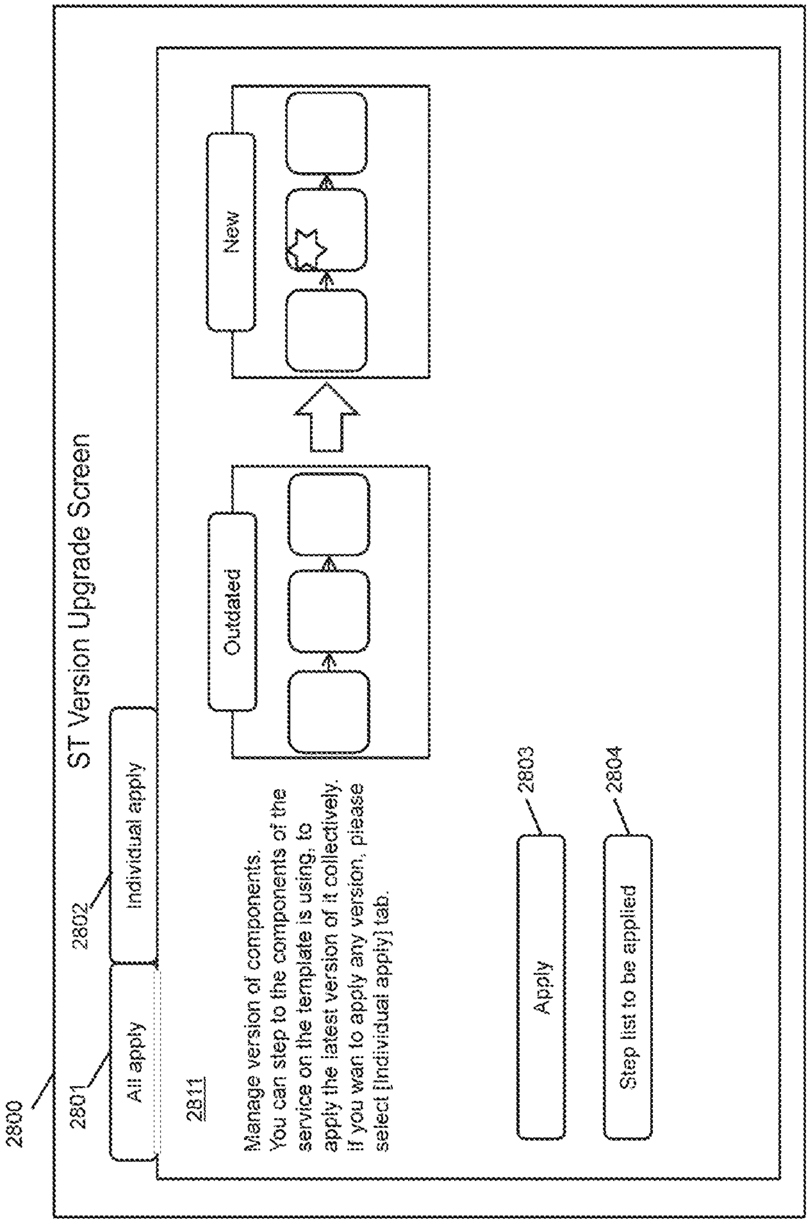
FIG. 28 illustrates the structure of an ST version upgrade screen in a state where an "All apply" tab is selected.

FIG. 28 illustrates the structure of an ST version upgrade screen.

On an ST version upgrade screen 2800, either an "All apply" screen 2811 with an "All apply" tab 2801 or an "Individual apply" screen with an "Individual apply" tab 2802 is displayed as a front screen and the front screen can be switched by selecting either one of the tabs. FIG. 28 illustrates a state where the "All apply" tab 2801 is selected and, therefore, the "All apply" screen 2811 is displayed as the front screen.

On the "All apply" screen 2811, an "Apply" button 2803 and a "Step list to be applied" button 2804 are displayed by the management program 432.

When the "Apply" button 2803 is pressed, a version upgrade request which is associated with the designated ST (that is, which designates the ST) is input to the management program 432 and the management program 432 executes the ST version upgrade processing in response to the request. Specifically speaking, for example, the management program 432 identifies all components of the latest version, which respectively correspond to all steps of old versions associated with a duplicate of the designated ST, from the step management table 428 and replaces all the steps of the old versions respectively with all the components of the latest version. During the processing, the management program 432 may display the progress of the processing (for example, the number of the components of the old versions and the number of the steps which have been replaced [that is, whose version upgrade has been performed] [whose status 1909 has become "Applied"]).

Figure 29:
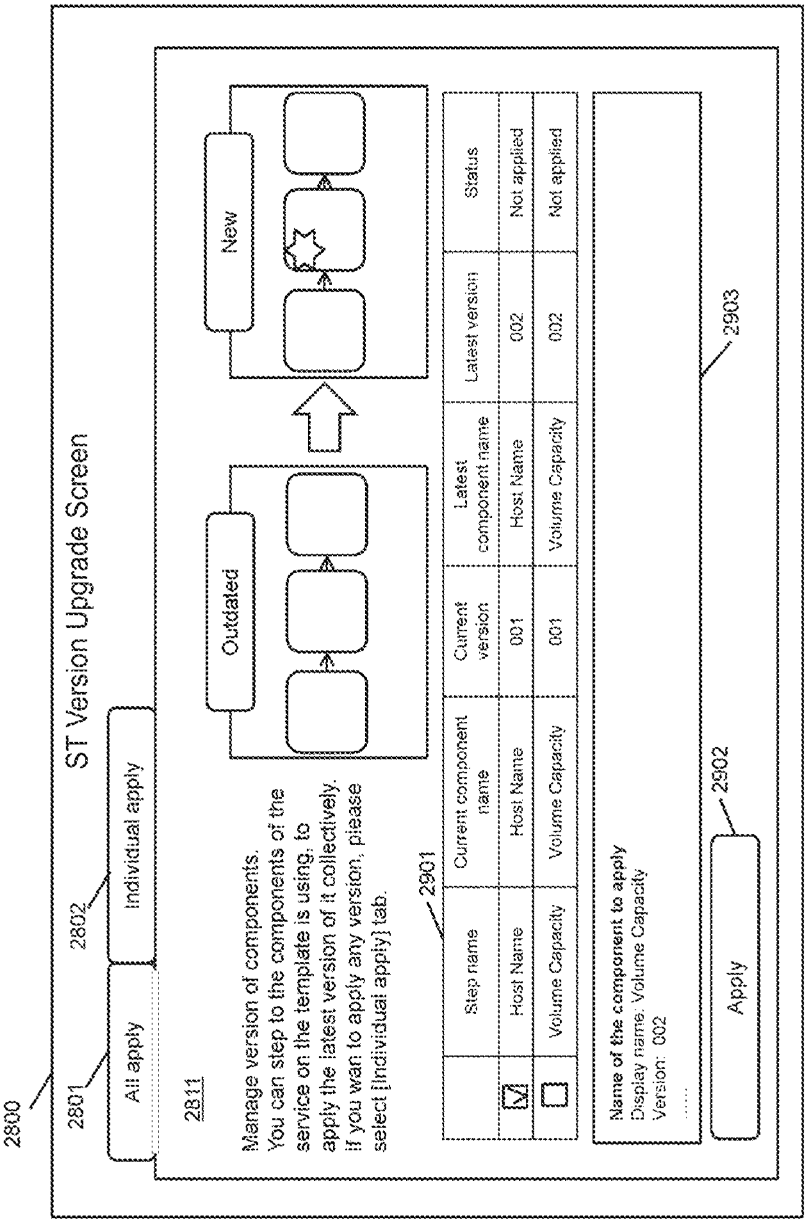
FIG. 29 illustrates the structure of the ST version upgrade screen when a "Step list to be applied" button is pressed.

When the "Step list to be applied" button 2804 is pressed, the management program 432 identifies all records corresponding to the designated ST (all records whose outdated ST uk 1902 and outdated ST version 1903 correspond to the designated ST) from the step management table 428 and displays a list 291 of information about all old-version steps (components) corresponding to the all the identified records respectively on the "All apply" screen 2811 as illustrated in FIG. 29. One or more records of the list 2901 correspond to one or more steps (old versions) associated with the designated ST, respectively. Each record has a checkbox. When the ST creation user enters a check mark in the checkbox (that is, selects the step) and presses the "Apply" button 2902, a version upgrade request which associates the designated ST with the selected step is input to the management program 432. The management program 432 replaces the old-version step, which is associated with the duplicate of the designated ST (that is, the step selected by the ST creation user), with the component of the latest version in response to the request. Incidentally, in this example, the component after the replacement is always the component of the latest version; however, a UI which accepts the changed version of the selected step (component) (or another UI) may be displayed on the "All apply" screen 2811 by the management program 432. That UI may be a custom UI or a default UI. Specifically speaking, information about the UI on the ST version upgrade screen 2800 (for example, whether it is a custom UI or a default UI) may be included in the component properties and the UI expanded on the ST version upgrade screen 2800 (for example, the "All apply" screen 2811 and the "Individual apply" screen described later) may be generated based on that information by the management program 432. Furthermore, a details field 2903 may be displayed, in addition to the list 2901, on the "All apply" screen 2811 by the management program 432 when the "Step list to be applied" button 2804 is pressed. Detailed information about the latest component (a component of the latest version) corresponding to a record selected by the user from the list 2901 (for example, a record on which a mouse cursor is placed and clicked) may be displayed in the details field 2903 by the management program 432.

Figure 30:
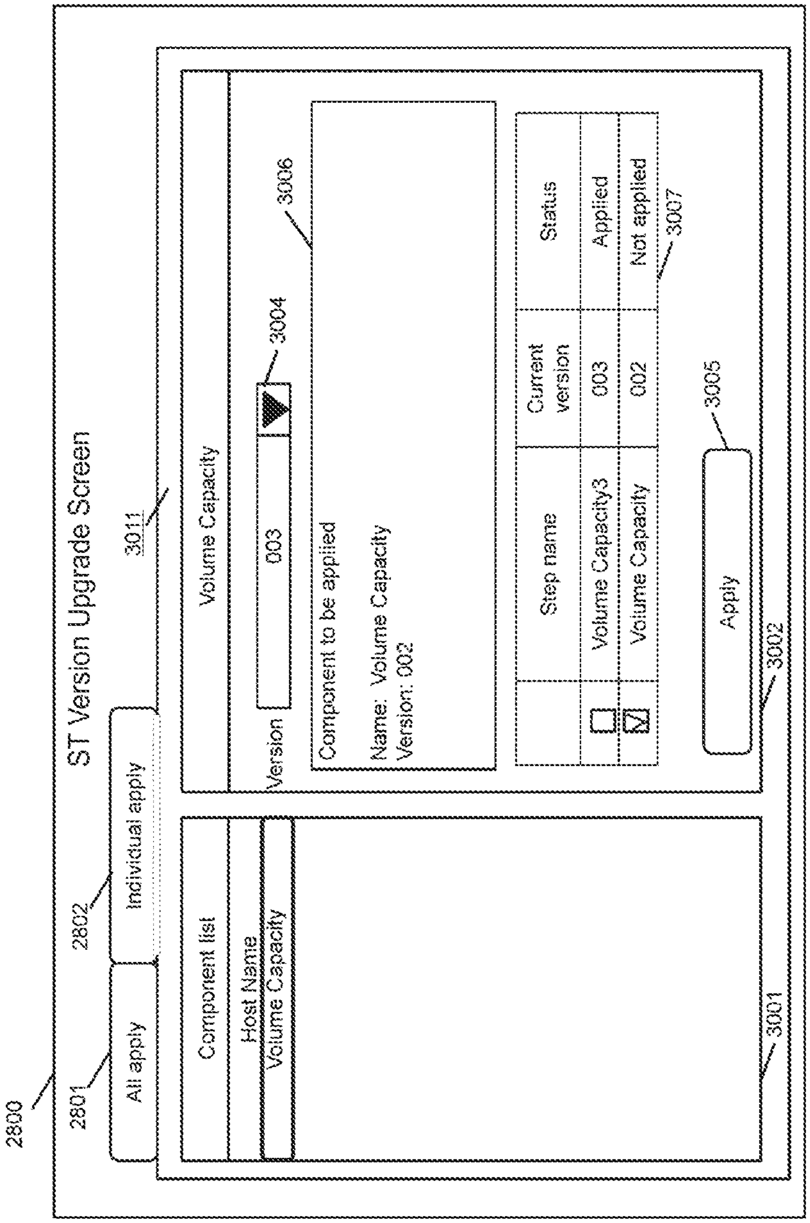
FIG. 30 illustrates the structure of the ST version upgrade screen when an "Individual apply" tab is selected.

When the "Individual apply" tab 2802 is selected, an "Individual apply" screen 3011 is displayed as the front screen by the management program 432 as illustrated in FIG. 30 (FIG. 30). The "Individual apply" screen 3011 includes a component list plane 3001 and a selected component plane 3002.

The component list plane 3001 is a vertically long plane located on the left side of the "Individual apply" screen 3011. The component list plane 3001 is where not a list of all the components associated with the designated ST, but a list of only components, regarding which a plurality of versions exist, from among the components associated with the designated ST is displayed. Specifically speaking, for example, the management program 432: identifies a record of the step management table 428 in which values of the latest component name 1907 and the latest version 1908 are not "Null"; and displays a list of the latest component name 1907 described in the identified record in the component list plane 3001. A version change target step (component) is selected from this list by the ST creation user. Any step whose version cannot be changed (that is, any step regarding which only a single version exists) is not displayed in the component list plane 3001. Therefore, the visibility is high.

Incidentally, a plurality of the same components (steps) may be associated with the designated ST (however, their versions may be sometimes the same and sometimes different) as described later and the plurality of the same components may be displayed on the list; however, in this embodiment, regardless of the number of the same components associated with the designated ST, the number of components displayed on the list with respect to the same components is one. As a result, the visibility is further enhanced.

Furthermore, a list of all components associated with the designated ST may be displayed in the plane 3001 in response to a request from an ST management user.

Information about a component selected from the list displayed in the component list plane 3001 is displayed in the selected component plane 3002. According to an example of FIG. 30, two steps are associated with the component ("Volume Capacity") selected from the list (the list of current component names), so that the respective step names of the two steps associated with the selected component are displayed in the selected component plane 3002. Each step may have a different step name.

Information about the selected component is displayed in the selected component plane 3002. Specifically speaking, for example, the selected component plane 3002 is where a version-designating pull-down menu 3004, a details field 3006, a candidate step list 3007, and an "Apply" button 3005 are displayed.

The version-designating pull-down menu 3004 is a UI for designating a changed version. The version-designating pull-down menu 3004 displays a menu of versions which can be designated with respect to the selected component as identified from the component property management table 422.

The details field 3006 is where detailed information about a step selected from the candidate step list 3007 (for example, a step corresponding to a record in which a check mark is entered) (for example, information identified from the step management table 428) is displayed.

The candidate step list 3007 is a list of one or more steps associated with the component selected from the list in the plane 3001. Referring to FIG. 30, the component "Volume Capacity" is selected from the list in the plane 3001; however, since two steps are associated with that component in the designated ST, the candidate step list 3007 has two records which correspond to the two steps, respectively. Each record includes a checkbox and at least part of the relevant record in the step management table 428 (for example, the step name, the current version, and the status).

FIG. 30 shows that the designated ST includes the component (step) of version 003 "Volume Capacity 3" and the component (step) of version 002 "Volume Capacity." Furthermore, since the status of the component of version 003 "Volume Capacity 3" is "Applied," version 003 of the component "Volume Capacity 3" is the same as the version designated in the version-designating pull-down menu 3004 or the version has been upgraded and, therefore, you can tell that it is unnecessary to set it as a version upgrade target. Steps are unique and there is no identical step in a plurality of different ST's. Furthermore, referring to FIG. 30, since a check mark is entered with respect to the component "Volume Capacity" (version 002) whose status is "Not applied" (that is, the component "Volume Capacity" (version 002) is selected), detailed information about the component (step) "Volume Capacity" (version 002) is displayed in the details field 3006. The version selected by using the version-designating pull-down menu 3004 is the changed version with respected to the selected step "Volume Capacity" (version 002). Detailed information about the component of the version selected in the version-designating pull-down menu 3004 may be displayed in the details field 3006 by the management program 432.

When the "Apply" button 3005 is pressed, a version upgrade request with which the designated ST, the selected step, and the changed version are associated is input to the management program 432. The management program 432 replaces the old-version step associated with the duplicate of the designated ST (that is, the step selected by the ST creation user) with the component of the changed version in response to the request.

Thus, in the "Individual apply" mode, the ST creation user can change the version of only a desired step from among the steps associated with the designated ST. Therefore, only a component regarding which a change of the version (typically the version upgrade) with respect to the designated ST would cause no problem can be selected from among the steps associated with the designated ST and then the version can be changed. As a result, the probability of any problem caused by the ST version upgrade can be reduced.

Regardless of either the "All apply" mode or the "Individual apply" mode, the component (step of the pre-change version (for example, an old version) is replaced with the component of the changed version (for example, the latest version) upon the ST version upgrade. Regarding the ST version upgrade in this embodiment, an input value of a component input property associated with the component of the pre-change version (at least a value which is set by the user such as the ST creation user or the component creation user) is input to (or is carried over to) a component input property associated with the component of the changed version.

Figure 31:
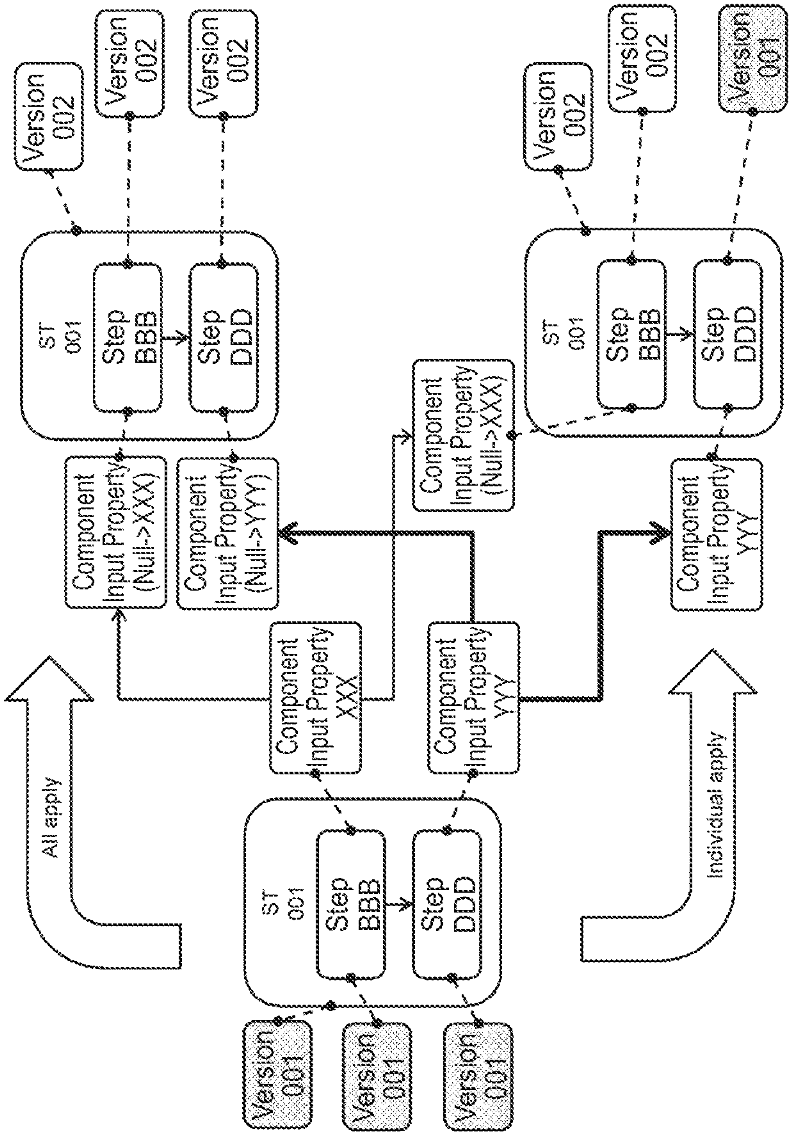
FIG. 31 illustrates succession of input values of component input properties.

FIG. 31 illustrates succession of input values of component input properties.

Let us assume that component BBB (version 001) and component DDD (version 001) are associated with ST001 (version 001). Let us assume that an input value of a component input property associated with component BBB (version 001) (for example, a value which is set by the user) is "XXX" and an input value of a component input property associated with component YYY (version 001) is "YYY."

In the "All apply" mode, all step BBB and step DDD of the old version which are associated with a duplicate of ST001 (ST001 of version 002) are replaced with step BBB of new version 002 and step DDD of new version 002, respectively, as described earlier. When this happens, the management program 432 changes the value of the component input property associated with step BBB of the new version 002 from "Null" to the input value "XXX" of the component input property associated with step BBB of the old version 001 and changes the value of the component input property associated with step DDD of the new version 002 from "Null" to the input value "YYY" of the component input property associated with step DDD of the old version 001.

In the "Individual apply" mode, only the selected step BBB from among step BBB and step DDD of the old version, which are associated with the duplicate of ST001 (ST001 of version 002), is replaced with step BBB of the new version 002 as described earlier. When this happens, the management program 432 changes the value of the component input property associated with step BBB of the new version 002 from "Null" to the input value "XXX" of the component input property associated with step BBB of the old version 001. On the other hand, the input value of the component input property associated with step DDD whose version has not been changed remains as "YYY."

Thus, upon the ST version upgrade, the input value of the component input property associated with the component before the version change is automatically carried over to the component input property associated with the component after the version change as a result of the version change of the component. Accordingly, it is possible to reduce the labor and time for the user to manually input the same input value for the component after the version change as the input value for the component before the version change.

Furthermore, in this embodiment, a component is typically a plug-in component, but an ST itself can be a component as mentioned earlier. Therefore, the management program 432 can associate each one or more of at least one plug-in component and at least one created ST, as a component, with the relevant ST in response to the operation from the user.

Accordingly, a created ST can be associated, as one component, with an ST, so that it is possible to create a higher level of ST's. When one component associated with an ST is another ST, the ST associated as a component will be hereinafter referred to as a "child ST" and the ST with which the child ST is associated will be hereinafter referred to as a "parent ST." Incidentally, a case where the version upgrade is performed with respect to ST's having such parent-child relationship will be examined. For example, the following cases will be examined:

(Case 1) when the version upgrade is performed by designating an ST associated with a parent ST; and (Case 2) when the version upgrade is performed by designating an ST associated with a child ST.

In either case, the version upgrade of the parent ST or the child ST which is associated may also be performed in addition to the designated ST. However, these ST's should be provided with their duplicates and their versions should preferably be upgraded separately.

Firstly, Case 1 will be explained. Assuming that only the ST after the version upgrade is made to exist without its duplicate, the child ST before the version upgrade will no longer exist and, therefore, the associated parent ST will be forced to use the component after the version upgrade. This will cause the same problems as those explained above. Therefore, it would be better if both ST's before and after the version upgrade exist by allowing its duplicate to exist. Furthermore, the same problem will occur when the parent ST is automatically associated with the ST after the version upgrade. Therefore, the version upgrade of the child ST and the version upgrade of the parent ST should better be performed separately.

Next, Case 2 will be explained. Assuming that the version upgrade of the child ST is performed along with the version upgrade of the parent ST, if the version upgrade of the child ST is performed without allowing its duplicate to exist, the ST before the version upgrade will no longer exist and the problem of the incapability to execute other parent ST's or the incapability of the user to use the ST before the version upgrade will occur. Therefore, the version upgrade of the child ST should better be performed by allowing its duplicate to exist. However, if a plurality of parent ST's have a common child ST and furthermore the version upgrade of the parent ST's automatically causes the version upgrade of the child ST by allowing its duplicate to exist, the child ST will be replicated every time the version upgrade of the parent ST is performed. When there are, for example, four parent ST's which are associated with the child ST and the version upgrade of each parent ST is performed five times, duplicates of the child ST in the amount of 4×5=20 will exist and, therefore, it becomes difficult to manage versions of the child ST. Therefore, the version upgrade of the child ST should be better performed separately from the version upgrade of the parent ST. Incidentally, the above-described idea of separate version upgrades by allowing duplicates to exist may be applied to both the "All apply" mode and the "Individual apply" mode. Incidentally, as an example of application to the "Individual apply" mode, when performing the version upgrade of the parent ST, it is possible to not display that a component associated with the associated child ST is a version upgrade target.

Figure 32:
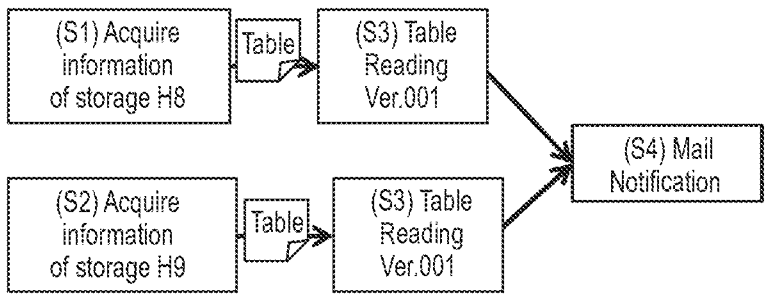
FIG. 32 illustrates a first phase of a use case example.

Meanwhile, a plurality of the same components are associated with one ST as already mentioned earlier (for example, referring to FIG. 18, an ST [version 005] exists as a component in a component group). Regardless of whether in the "All apply" mode or in the "Individual apply" mode, the management program 432 can judge whether the plurality of the same components are associated with the designated ST or not, based on the step management table 428. Then, if the judgment result is affirmative in the "All apply" mode, the management program 432 accepts the selection of whether each of the plurality of the same components should be a version change target or not, and the designation of a changed version if the relevant component should be the version change target. If the judgment result is affirmative in the "Individual apply" mode, the management program 432 generates and displays the candidate step list 3007 (see FIG. 30) including a plurality of records corresponding to the plurality of the same components respectively and thereby accepts the selection of whether each of the plurality of the same components should be a version change target or not, and the designation of a changed version if the relevant component should be the version change target. One reason why such processing is executed is because use cases explained with reference to, for example, FIG. 32 to FIG. 34 are possible (steps are indicated as "(S)" in FIG. 32 to FIG. 34).

Specifically speaking, referring to FIG. 32, let us assume that one ST (hereinafter referred to as the "target ST" in the explanations of FIG. 32 to FIG. 34) defines a flow of the following steps. Specifically speaking, (S1) a table in which information of storage H8 is described is acquired; and (S3) the table acquired in the previous step is read. On the other hand, (S2) a table in which information of storage H9 is described is acquired; and (S3) the table acquired in the previous step is read. Then, (S4) the information described in each read table is reported by e-mail. Thus, the target ST includes each one of steps (S1), (S2), and (S4) and two steps (S3). Specifically speaking, the same two steps (S3) exist in the target ST. The version in either step (S3) is 001.

Figure 33:
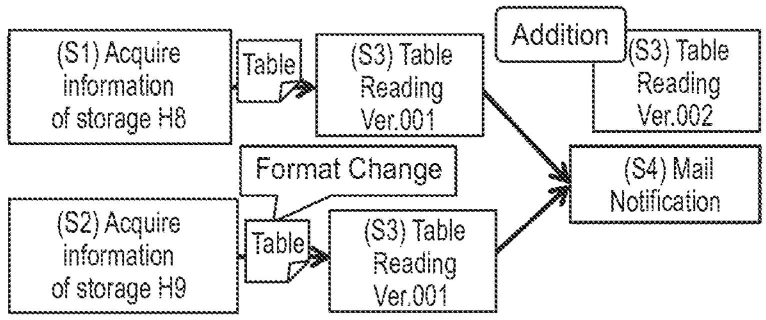
FIG. 33 illustrates a second phase of the use case example.
Figure 34:
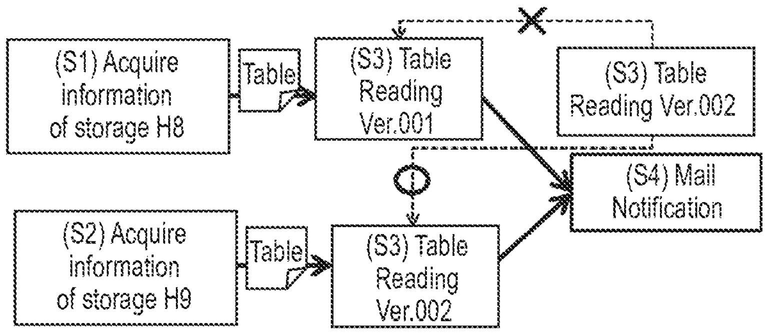
FIG. 34 illustrates a third phase of the use case example.

Then, referring to FIG. 33, let us assume that because the format of the table in which the information of storage H9 is described is changed (for example, an increase or decrease of items or a change of a time display format in the table), the component (S3) (version 002) corresponding to the format change is added. At this point in time, both the two steps (S3) associated with the target ST become old-version steps (components).

Under this circumstance, step (S3) following step (S2) needs to be changed to step (S3) of new version 002, but the version of step (S3) following step (S1) should not be changed.

So, referring to FIG. 34, regardless of whether in the "All apply" mode or in the "Individual apply" mode, the management program 432: identifies, based on the step management table 428, that the plurality of the same steps (S3) are associated with the designated ST (the target ST); and accepts the selection of whether each of the plurality of the same steps (S3) should be the version change target or not, and the designation of a changed version if the relevant step (S3) should be the version change target. According to this use case, the management program 432 accepts the selection of step (S3) following step (S2) as the selection of the version change target step and the designation of version 002 as the changed version from the ST creation user via the user interface. The management program 432 replaces step (S3) (version 001) following step (S2) with step (S3) (version 002) in accordance with the above-described selection and designation and maintains the relationship between step (S1) and step (S3) (version 001).

Figure 35:
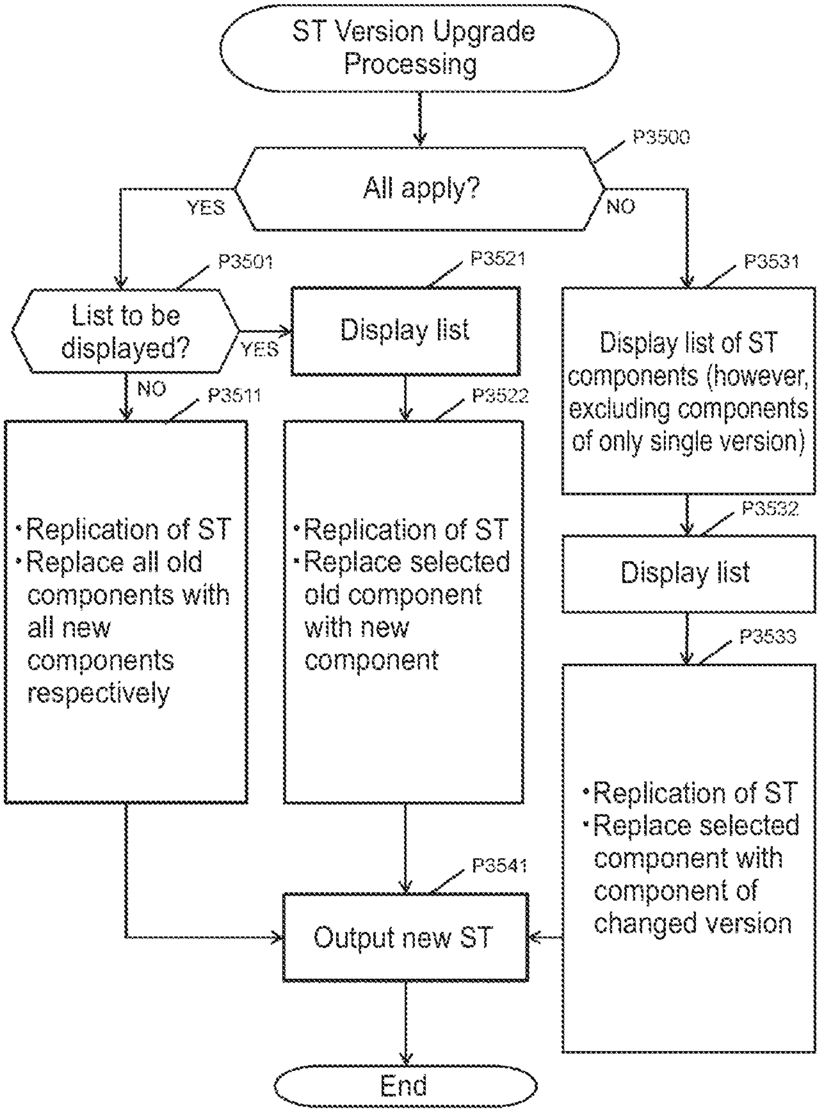
FIG. 35 illustrates a flowchart of ST version upgrade processing.

FIG. 35 is a flowchart of ST version upgrade processing.

When the management program 432 accepts the designation of the ST via, for example, the ST list screen 2700 (see FIG. 27), it displays the ST version upgrade screen 2800 (see FIG. 28). Then, the management program 432 accepts the selection of either the "All apply" tab 2801 or the "Individual apply" tab 2802 (P3500).

When the "All apply" tab 2801 is selected (P3500: YES), the management program 432 judges whether to display the list or not (P3501). For example, when the "Step list to be applied" button 2804 is pressed or when it is identified that the plurality of the same steps are associated with the designated ST, the judgement result of P3501 is affirmative. On the other hand, for example, when the "Apply" button 2803 is pressed, the judgment result of P3501 is negative.

When the judgment result of P3501 is negative (P3501: NO), the management program 432 accepts a version upgrade request associated with the designated ST and performs P3511 in response to the request. Specifically speaking, the management program 432 generates a duplicate of the designated ST and replaces all old steps (old-version steps), which are associated with the designated ST, with all the latest components (components of the latest version), respectively. When this happens, the management program 432 inputs an input value of the component input property of the old step to the component input property of the latest component. Furthermore, when the old step is a child ST, the management program 432 skips the old step without performing the version upgrade. After P3511, the management program 432 displays information (for example, the version after the version upgrade of the ST) about a new ST which is the ST of the upgraded version (the ST duplicate with which the components of the changed version are associated) (P3541).

When the judgment result of P3501 is affirmative (P3501: YES), the management program 432 displays the list 2901 of old steps (old-version steps) associated with the designated ST. Then, when a step is selected from the list 2901 and the "Apply" button 2902 is pressed, the management program 432 accepts a version upgrade request associated with the designated ST and the selected step and performs P3522 in response to the request. Specifically speaking, the management program 432 generates a duplicate of the designated ST and replaces the old step (old-version step) selected from the steps (components), which are associated with the designated ST, with the latest component (the component of the latest version). When this happens, the management program 432 inputs an input value of the component input property of the old step to the component input property of the latest component. After P3522, the management program 432 performs P3541.

When the "Individual apply" tab 2802 is selected (P3500: NO), the management program 432 identifies steps, regarding which a plurality of versions exist, from among the steps associated with the designated ST with reference to the step management table 428 and displays a list of only the identified steps in the component list plane 3001. Specifically speaking, for example, the management program 432 identifies a record, in which values of the latest component name 1907 and the latest version 1908 are not "Null," from the step management table 428 and displays a list of the step names 1904, which are described in the identified records, in the component list plane 3001 (P3531). When a version change target step (component) is selected from this list by the ST creation user, the management program 432 displays the candidate step list 3007 about the selected step (P3532). When a step is selected from the candidate step list 3007, a changed version is designated from the version-designating pull-down menu 3004, and the "Apply" button 3005 is pressed, the management program 432 accepts a version upgrade request, with which the designated ST, the selected step, and the changed version are associated, and performs P3533 in response to the request. Specifically speaking, the management program 432 generates a duplicate of the designated ST and replaces the old step (old-version step), which is selected from the steps (components) associated with the designated ST, with the designated component of the changed version. After P3533, the management program 432 performs P3541.

Figure 41A:
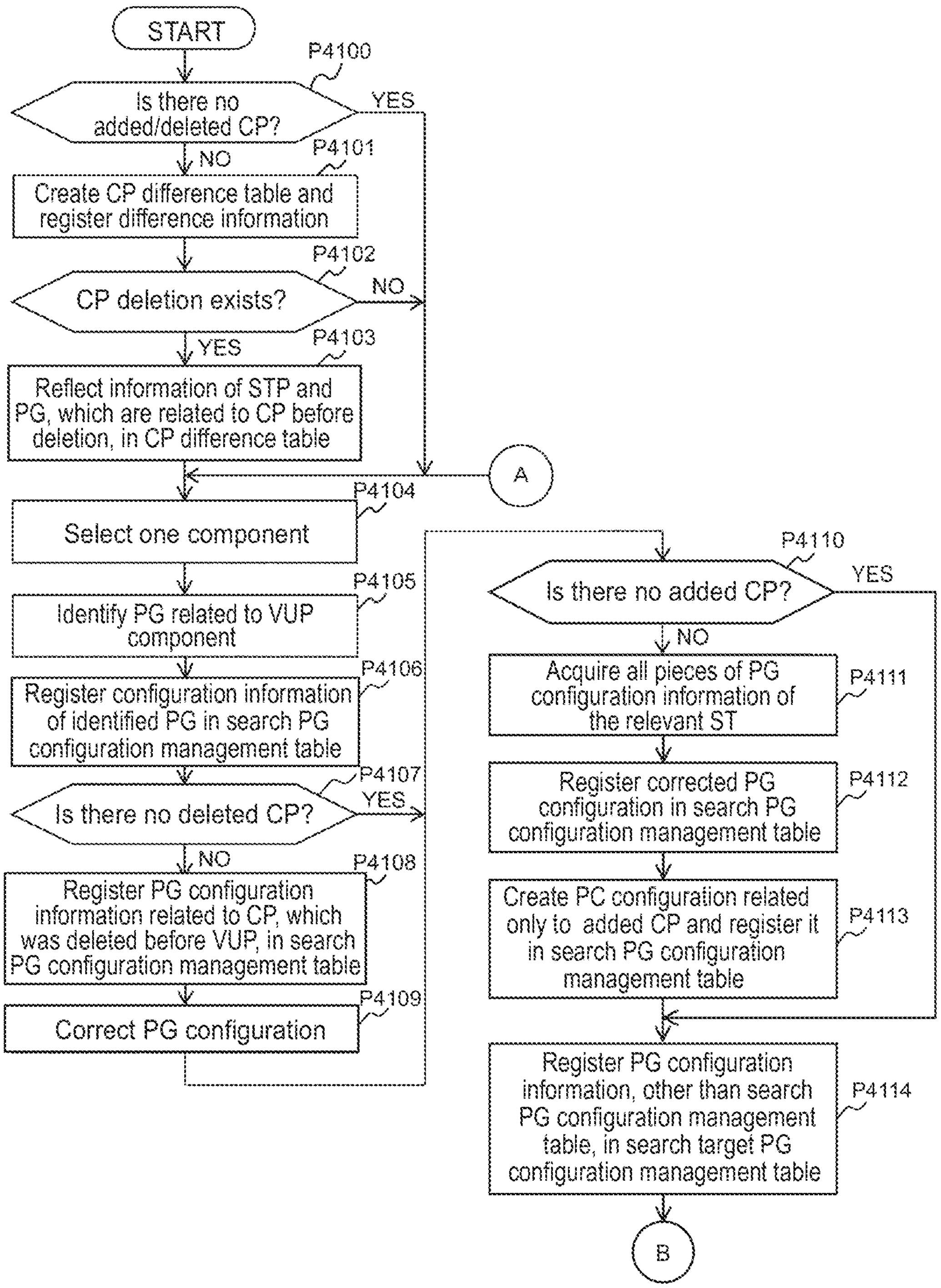
FIG. 41A illustrates a flowchart of property group configuration search processing.
Figure 41B:
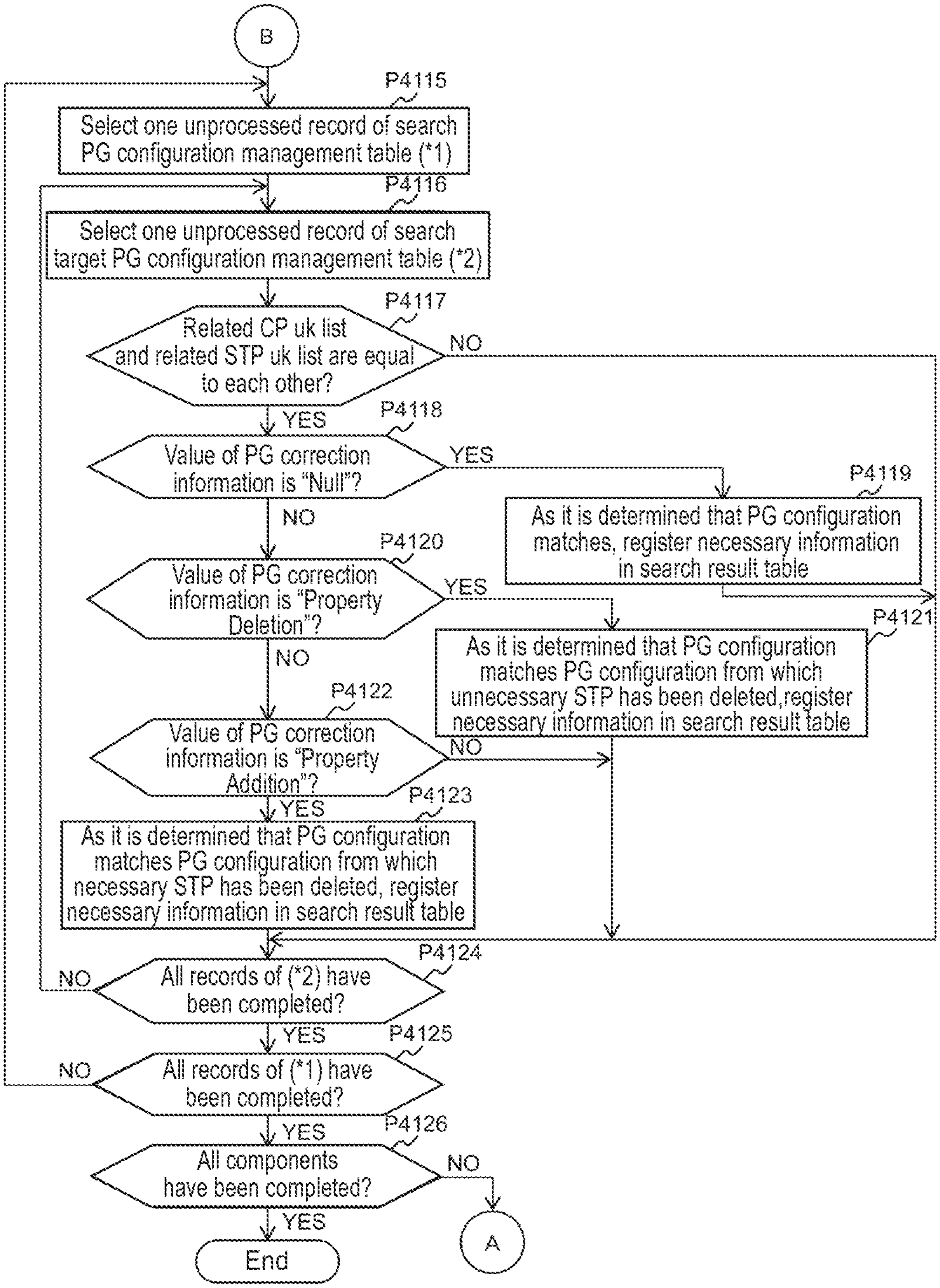
FIG. 41B illustrates a flowchart of the property group configuration search processing.

FIG. 41A and FIG. 41B are flowcharts of related property group configuration search processing executed after the termination of the above-described ST version upgrade processing. The management program 432 estimates possible configurations as a post-reset configuration of each property group associated with the component whose version has been upgraded as a result of the version upgrade of the designated ST in accordance with the processing sequence illustrated in FIG. 41A and FIG. 41B and searches for a property group having such configuration from among property groups associated with other ST's.

Practically, the management program 432 firstly judges whether or not a component property is added to, or deleted from, any one of components with their versions upgraded as a result of the version upgrade of the designated ST, with respect to the designated ST whose version has been upgraded by the ST version upgrade processing (P4100). Specifically speaking, the management program 432 acquires all pieces of information of a record corresponding to the component uk before the version upgrade of the relevant component and information of a record corresponding to the component uk after the version upgrade of the relevant component from the component property management table 422 (FIG. 7) with respect to each component associated with the designated ST whose version has been upgraded. Furthermore, the management program 432 compares the record before the version upgrade with the record after the version upgrade on the basis of these pieces of acquired information and thereby judges whether or not any component with the difference in the component property before and after the version upgrade exists (that is, whether or not any component property is added to, or deleted from, any one of the components whose version has been upgraded).

When the judgment result of P4100 is affirmative (P4100: YES), the management program 432 proceeds to P4104.

On the other hand, the judgment result of P4100 is negative (P4100: NO), the management program 432 creates a component property difference table 4200 illustrated in FIG. 42 and registers necessary information about all the components, whose component properties are added or deleted, from among the components with the versions upgraded as a result of the version upgrade of the designated ST, in this component property difference table 4200 (P4101).

Now, the component property difference table 4200 is a table temporarily created to manage the differences in the configuration before and after the version upgrade of the components whose component properties have been added or deleted as a result of the version upgrade. This component property difference table 4200 has a record for each difference of each component whose component property has been added or deleted as a result of the version upgrade; and each record stores a pre-version-upgrade component uk 4201, a post-version-upgrade component uk 4202, a difference component property uk 4203, a difference type 4204, a related property group uk 4205, and a related ST property uk 4206.

The pre-version-upgrade component uk 4201 is a pre-version-upgrade unique key of the corresponding component; and the post-version-upgrade component uk 4202 is a pre-version-upgrade unique key of that component. Furthermore, the difference component property uk 4203 is a unique key of the component property of the component which has been added or deleted as a result of the version upgrade; and the difference type 4204 is information indicating whether the component property has been added or deleted as a result of the version upgrade. Incidentally, referring to FIG. 42, "Property Addition" indicates that the relevant component property has been added; and "Property Deletion" indicates that the relevant component property has been deleted. Furthermore, the related ST property uk 4206 is a unique key of an ST property which was associated with the component property, which has been added or deleted as a result of the version upgrade, before the version upgrade; and the related property group uk 4205 is a unique key of a property group to which that ST property belonged. Incidentally, referring to FIG. 42, "Null" means that an input value (or an output value) does not exist.

Then, in P4101, the management program 432 registers the pre-version-upgrade component uk and the post-version-upgrade component uk of the relevant component, the unique key of the component property which has been added or deleted as a result of the version upgrade among the component properties of the relevant component, and the difference type (addition or deletion) of that component property in the component property difference table 4200 with respect to each difference of the component which has the difference in its component property before and after the version update detected in P4100 (the component whose component property has been added or deleted).

Subsequently, the management program 432 judges whether or not any record whose difference type 4204 is the "Property Deletion" exists among records of the component property difference table 4200 (P4102). Then, when the judgement result of P4102 is negative (P4102: NO), the management program 432 proceeds to P4104.

On the other hand, when the judgment result of P4102 is affirmative (P4102: YES), the management program 432 registers the ST property, which was associated with the deleted component property before the version upgrade, and information of the property group, to which the relevant ST property belonged, in the component property difference table 4200 with respect to each record whose difference type is the "Property Deletion" (P4103). Practically, the management program 432 acquires information of a record with the mapping destination component property uk 4006, which matches the relevant difference component property uk 4203, from the pre-component-version-upgrade property mapping management table 431 (FIG. 40) on the basis of the difference component property uk 4203 of the relevant record. Furthermore, the management program 432: acquires information of a record with the ST property uk 1003, which matches the mapping destination ST property uk 4005 of the then-acquired record, from the ST property management table 425 (FIG. 10); and registers the property group uk 1009 of that record in the component property difference table 4200 as the related property group uk 4205 of the corresponding record in the component property difference table 4200 and registers the ST property uk 1003 of that record in the component property difference table 4200 as the related ST property uk 4206 of the corresponding record in the component property difference table 4200.

Next, the management program 432 selects one component, regarding which the processing in and after P4105 has not been executed, from among the components whose pre-version-upgrade component uk 4201 and post-version-upgrade component uk 4202 are registered in the component property difference table 4200 (P4104) and identifies all property groups which are associated with the selected component (hereinafter referred to as the target component) after the version upgrade of the target component (P4105). Specifically speaking, the management program 432 acquires information of all records with the component uk 702, which matches the post-version-upgrade component uk of the target component, from the component property management table 422 (FIG. 7). Moreover, the management program 432 acquires information of a record with the mapping destination component property uk 3906, which matches the component uk 702, from the property mapping management table 430 (FIG. 39) based on the component uk 702 of the relevant record with respect to each record whose information is then acquired. Furthermore, the management program 432 acquires information of a record with the ST property uk 1003, which matches the mapping source ST property uk 3903, from the ST property management table 425 (FIG. 10) based on the mapping source ST property uk 3903 of the relevant record with respect to each record whose information is then acquired. Furthermore, the management program 432 identifies the property group uk (the property group uk 1009) of a property group associated with the target component with respect to each record whose information is then acquired, based on that information.

Subsequently, the management program 432 registers configuration information of each property group, whose property group uk was identified in P4105, in a search property group configuration management table 4300 illustrated in FIG. 43 (P4106).

The search property group configuration management table 4300 herein used is a table temporarily created to manage property group configurations which may possibly be associated with the designated ST after the operation to reset the properties of the designated ST whose version has been upgraded. This search property group configuration management table 4300 has a record for each property group configuration having such possibility and each record stores a property group uk 4301, a related component property uk list 4302, a related ST property uk list 4303, and property group configuration correction information 4304.

The property group uk 4301 is a unique key of a property group on which the corresponding property group configuration is based (a property group which was associated with the target component before the version upgrade). The related ST property uk list 4303 is a list of unique keys of the respective ST properties which may possibly belong to the corresponding property group after the version upgrade of the designated ST. Moreover, the related component property uk list 4302 is a list of unique keys of the respective component properties associated with any of the ST properties with their unique keys registered in the related ST property uk list 4303. Furthermore, the property group configuration correction information 4304 indicates whether the property group configuration of the corresponding property group may possibly become the property group configuration of that record when the component property of the target component is either deleted or added. For example, the "Property Deletion" means that when the component property of the target component is deleted, the property group configuration of the corresponding property group becomes the property group configuration of that record; and the "Property Addition" means that when a new component property is added to the target component, the property group configuration of the corresponding property group may possibly become the property group configuration of that record. Incidentally, referring to FIG. 43, "Null" means that an input value (or an output value) does not exist.

Then, in P4106 with respect each property group whose property group uk was identified in P4105, the management program 432 acquires a list in which the unique keys of all the ST properties associated with that property group are registered (the related ST property uk list 4303) by referring to the ST property management table 425 (FIG. 10). Moreover, with respect to each ST property whose unique key is registered in the created related ST property uk list 4303, the management program 432 identifies component properties, with which the relevant ST property is associated (or mapped), by referring to the property mapping management table 430 (FIG. 39) and acquires a list in which the unique keys of all these component properties are registered (the related component property uk list 4302). Then, the management program 432 creates each record for each property group, whose property group uk was identified in P4105, in the search property group configuration management table 4300 based on the thus acquired information.

Subsequently, the management program 432 refers to information of the difference type 4204 of the record corresponding to the target component among entries of the component property difference table 4200 and judges whether there is any component property deleted from the target component as a result of the version upgrade of the target component (P4107).

Then, when the judgment result of P4107 is affirmative (P4107: YES), the management program 432 proceeds to P4110. On the other hand, when the judgment result of P4107 is negative (P4107: NO), the management program 432 registers the configuration information of the property group, which is associated with the deleted component property, in the search property group configuration management table 4300 with respect to each component property deleted at the time of the version upgrade of the target component (P4108). Specifically speaking, the management program 432: acquires the related property group uk 4205 of a record corresponding to the relevant component property in the component property difference table 4200 (FIG. 42) (a record with the component property matching the difference component property uk 4203) with respect to each component property deleted from the target component at the time of the version upgrade; and creates the related ST property uk list 4303, in which the ST property uk's 1003 of all the ST properties associated with the property group with the related property group uk 4205 assigned thereto, from the ST property management table 425 (FIG. 10) based on the acquired related property group uk 4205. Furthermore, with respect to each component property deleted from the target component, the management program 432 detects each record, whose mapping source ST property uk 3903 matches any one of the ST property uk's 1003 acquired above and registered in the list, from among records in the property mapping management table 430 (FIG. 39), acquires the mapping destination component property uk 3906 of each of such records, and creates the related component property uk list 4302 in which all the acquired mapping destination component property uk's 3906 are registered. Then, the management program 432 creates each record, which corresponds to the property group associated with the relevant component property, in the search property group configuration management table 4300 with respect to each component property deleted before the version upgrade of the target component on the basis of the related ST property uk list 4303 and the related component property uk list 4302 which are created and acquired as described above.

Next, the management program 432 corrects the relevant record to delete information about the ST property, which is no longer associated due to the deletion of the component property of the target component, with respect to each property group for which the records were created in the search property group configuration management table 4300 in P4108 (P4109). Specifically speaking, the management program 432: acquires the related property group uk 4205 of a record, which corresponds to the deleted component property, in the component property difference table 4200 (FIG. 42) with respect to each component property deleted from the target component; and deletes a value of an ST property uk, which is registered in the related ST property uk list 4303 of another record, from the related ST property uk list 4303 of records whose property group uk's 4301 of the search property group configuration management table 4300 match each other, based on the acquired related property group uk 4205. Furthermore, the management program 432: corrects the ST property uk list 4303 of the relevant record by deleting the ST property uk, which is registered in the related ST property uk list 4303 of another record, from the related ST property uk list 4303 as described above; and registers the "Property Deletion" in the search property group configuration management table 4300 as the property group configuration correction information 4304 of the relevant record.

Subsequently, the management program 432 refers to information of the difference type 4204 of an entry corresponding to the target component from among entries of the component property difference table 4200 and judges whether or not any component property has been added to the target component as a result of the version upgrade of the target component (P4110).

When the judgment result of P4110 is affirmative (P4110: YES), the management program 432 proceeds to P4114. On the other hand, when the judgment result of P4110 is negative (P4110: NO), the management program 432 acquires each piece of configuration information of all the property groups associated with the designated ST whose version was then upgraded (P4111). Specifically speaking, the management program 432 acquires information of all records, whose ST uk's 3804 match the ST uk of the designated ST (that is, all the records which correspond to each property group associated with the designated ST), from the property group management table 429 (FIG. 38) based on the ST uk of the designated ST. Moreover, the management program 432 creates a list of ST property uk's of the respective ST properties associated with the relevant property group (hereinafter referred to as the "first list") from the ST property management table 425 (FIG. 10) on the basis of the property group uk 3802 of each record, whose information has been thus acquired, with respect to each property group associated with the designated ST. Furthermore, the management program 432 refers to the property mapping management table 430 (FIG. 39) with respect to each such property group based on the thus acquired first list and creates a list of mapping destination component uk's of the respective records whose mapping source ST uk 3903 is registered in the ST property uk of the relevant property group (hereinafter referred to as the "second list").

Next, the management program 432 registers the "Property Addition," as the property group configuration correction information 4304, in a necessary entry of the search property group configuration management table 4300 (P4112). Specifically speaking, the management program 432 creates a list in which all the difference component property uk's 4203 of the respective records with the difference type "Property Addition" are registered, from the component property difference table 4200 (FIG. 42). Moreover, the management program 432 creates a list in which all combination patterns of the difference component property uk's 4203 registered in that list are mentioned (hereinafter referred to as the "combination pattern list"). Then, the management program 432 executes each of the following processing in a sequential order with respect to each combination pattern mentioned in this combination pattern list. Firstly, the management program 432 adds a record corresponding to the then target combination pattern to the search property group configuration management table 4300 (FIG. 43) based on the above-described first and second lists. Moreover, the management program 432 adds each of the component property uk's, which constitute the combination pattern, to the related component property uk list 4302 of the added record. Furthermore, the management program 432 adds dummy data ("0" in this example) in the same amount as that of the respective component property uk's, which constitute the combination pattern, to the related ST property uk list 4303 of the relevant record. Furthermore, the management program 432 registers the "Property Addition" in the search property group configuration management table 4300 as the property group configuration correction information 4304 of the relevant record.

Subsequently, the management program 432 creates all property group configurations, which are associated with only the component property added with respect to the target component, and registers each of the created property group configurations in the search property group configuration management table 4300 (P4113). Specifically speaking, the management program 432 executes each of the following processing in a sequential order with respect to each combination pattern mentioned in the above-described combination pattern list. Specifically speaking, the management program 432 firstly adds a record with the property group uk 4301, which is dummy data ("0" in this example), to the search property group configuration management table 4300. Moreover, the management program 432 adds each of the component property uk's, which constitute the then target combination pattern, to the related component property uk list 4302 of the added record. Furthermore, the management program 432 adds dummy data ("0" in this example) in the same amount as that of the component property uk's, which are added to the related component property uk list 4302 as described above, to the related ST property uk list 4303 of the relevant record. Furthermore, the management program 432 registers the “Property Addition” in the search property group configuration management table 4300 as the property group configuration correction information 4304 of the relevant record.

Furthermore, the management program 432 registers the configuration of a property group other than the property group configurations registered in the search property group configuration management table 4300 (hereinafter referred to as the “search target property group”) in a search target property group configuration management table 4400 illustrated in FIG. 44 (P4114).

The search target property group configuration management table 4400 herein used is a table temporarily created to manage the configuration information of the search target property group after the version upgrade of the target component. The search target property group configuration management table 4400 has a record for each property group other than the property group configurations registered in the search property group configuration management table 4300 and each record stores a property group uk 4401, a related component property uk list 4402, and an ST property uk list 4403.

Then, in P4114, the management program 432 detects all records, regarding which a value of the property group uk 3802 of the relevant record does not match the property group uk 4401 of each record identified in P4105, from among the records of the property group management table 429 (FIG. 38). Moreover, the management program 432 creates an ST property uk list, in which all the ST property uk’s 1003 of the respective ST properties associated with the property group corresponding to the relevant record are listed, with respect to each record which has been then detected, on the basis of the property group uk 3802 of the relevant record. Furthermore, the management program 432 creates a related component property uk list indicating all the mapping destination component property uk’s 3906 of the respective records, whose mapping source ST property uk’s 3903 match each other, from the property mapping management table 430 (FIG. 39) with respect to each such property group on the basis of each ST uk listed in the corresponding list. Then, the management program 432 recognizes the thus created ST property uk list as the ST property uk list 4403, recognizes the related component property uk list as the related component property uk list 4402, and registers the configuration of each search target property group in the search target property group configuration management table 4400.

Subsequently, the management program 432 selects one record, regarding which the processing in and after P4116 has not been executed, from among the records of the search property group configuration management table 4300 (FIG. 43) (P4115). Furthermore, the management program 432 selects one record, regarding which the processing in and after P4117 has not been executed, from among the records of the search target property group configuration management table 4400 (FIG. 44) (P4116).

Then, the management program 432 judges whether the related component property uk list 4302 of the record selected in P4115 is equal to the related component property uk list 4402 of the record selected in P4116 or not and whether the related ST property uk list 4303 of the record selected in P4115 is equal to the related ST property uk list 4403 of the record selected in P4116 or not (P4117).

When the judgment result of P4117 is negative (P4117: NO), the management program 432 proceeds to P4124. On the other hand, when the judgment result of P4117 is affirmative (P4117: YES), the management program 432 judges whether a value of the property group configuration correction information 4304 of the record selected in P4115 is “Null” or not (P4118).

When the judgment result of P4118 is affirmative (P4118: YES), it means that the configuration of the property group corresponding to the record selected in P4115 in the state where there is no addition or deletion of the component property of the target component at the time of the version upgrade of the target component, matches the configuration of the property group corresponding to the record selected in P4116. Thus, when this happens, the management program 432: recognizes that the configuration matches that of the property group corresponding to the record selected in P4116; and registers necessary information in a search result table 4500 in FIG. 45 (P4119).

The search result table 4500 herein used is a table temporarily created to store and retain information about a property group whose configuration matches the configuration of any one of property groups registered in the search property group configuration management table 4300 (FIG. 43) from among the property groups detected by the search processing in and after P4117 and registered in the search target property group configuration management table 4400 (FIG. 44). This search result table 4500 has a record for each property group detected by such search processing and each record stores a property group uk 4501, a matched property group configuration property group list 4502, an unnecessary-ST-property-deleted property group configuration list 4503, and a necessary-ST-property-added property group configuration list 4504.

The property group uk 4501 is a property group uk of a property group corresponding to the record selected in P4115. Moreover, the matched property group configuration property group list 4502 is a property group uk list of each property group detected as having the same configuration as that of the property group corresponding to the record selected in P4115 from among the property groups registered in the search target property group configuration management table 4400. Furthermore, the unnecessary-ST-property-deleted property group configuration list 4503 is a property group uk list of each property group having the same configuration as that of the property group corresponding to the record selected in P4115 from among the property groups registered in the search target property group configuration management table 4400 by deleting an unnecessary ST property. Furthermore, the necessary-ST-property-added property group configuration list 4504 is a property group uk list of each property group having the same configuration as that of the property group corresponding to the record selected in P4115 from among the property groups registered in the search target property group configuration management table 4400 by adding a necessary ST property.

Then, the management program 432 creates one record in the search result table 4500 in P4119 as necessary, stores a property group uk of a property group corresponding to the record then selected in P4115, as the property group uk 4501, in that record, and registers a property group uk of a property group corresponding to the record then selected in P4116 in the matched property group configuration property group list 4502. Then, regarding that record, the management program 432 proceeds to P4124.

On the other hand, when the judgment result of P4118 is negative (P4118: NO), the management program 432 judges whether the value of the property group configuration correction information 4304 of the record selected in P4115 is the "Property Deletion" or not (P4120).

When the judgment result of P4120 is affirmative (P4120: YES), it means that as a result of deleting the component property which is a part of the target component at the time of the version upgrade of the target component, the property group configuration in the state where the ST property associated with that component property is deleted from the corresponding property group (the configuration of the property group corresponding to the record selected in P4115) matches the configuration of the property group corresponding to the record selected in P4116. Thus, when this happens, the management program 432 registers necessary information about the property group corresponding to the record selected in P4116 in the search result table 4500 (P4121). Specifically speaking, the management program 432 creates one record in the search result table 4500 in P4121 as necessary, stores a property group uk of a property group corresponding to the record then selected in P4115, as the property group uk 4501, in that record, and registers a property group uk of a property group corresponding to the record then selected in P4116 in the unnecessary-ST-property-deleted property group configuration list 4503. Then, the management program 432 proceeds to P4124.

On the other hand, when the judgment result of P4120 is negative (P4120: NO), the management program 432 judges whether the value of the property group configuration correction information 4304 of the record selected in P4115 is the "Property Addition" or not (P4122).

When the judgment result of P4122 is negative (P4122: NO), the management program 432 proceeds to P4124. On the other hand, when the judgment result of P4122 is affirmative (P4122: YES), it means that as a result of adding the component property of the target component at the time of the version upgrade of the target component, the property group configuration in the state where the ST property associated with that component property is added (the configuration of the property group corresponding to the record selected in P4115) matches the configuration of the property group corresponding to the record selected in P4116. Thus, when this happens, the management program 432 registers necessary information about the property group corresponding to the record selected in P4116 in the search result table 4500 (P4123). Specifically speaking, the management program 432 creates one record in the search result table 4500 in P4123 as necessary, stores a property group uk of a property group corresponding to the record then selected in P4115, as the property group uk 4501, in that record, and registers a property group uk of a property group corresponding to the record then selected in P4116 in the necessary-ST-property-added property group configuration list 4504.

Subsequently, the management program 432 judges whether or not the processing in and after step SP4117 has been executed on all the records of the search target property group configuration management table 4400, with respect to the property group corresponding to the record selected in P4115 (P4124).

Then, when the judgment result of P4124 is negative (P4124: NO), the management program 432 returns to P4116 and then repeats the processing of P4116 to P4124. Furthermore, when the management program 432 eventually obtains an affirmative result in P4124 by finishing executing the processing in and after step SP4117 on all the records of the search target property group configuration management table 4400 with respect to the property group corresponding to the record selected in P4115 (P4124: YES), the management program 432 judges whether or not it has finished executing the processing in and after step SP4116 on all the records of the search property group configuration management table 4300 (P4125).

Then, when the judgment result of P4125 is negative (P4125: NO), the management program 432 returns to P4115 and then repeats the processing of P4115 to P4125. Furthermore, when the management program 432 eventually obtains an affirmative result in P4125 by finishing executing the processing in and after step SP4116 on all the records of the search property group configuration management table 4300 (P4125: YES), the management program 432 judges whether or not it has finished executing the processing in and after step SP4105 on all the components whose pre-version-upgrade component uk 4201 and post-version-upgrade component uk 4202 are registered in the component property difference table 4200 (P4126).

When the judgment result of P4126 is negative (P4126: NO), the management program 432 resets the search property group configuration management table 4300 and the search target property group configuration management table 4400 and then returns to P4104 and subsequently repeats the processing of P4104 to P4126. Then, when the management program 432 eventually obtains an affirmative result in P4126 by finishing executing the processing in and after P4105 on all the components whose pre-version-upgrade component uk 4201 and post-version-upgrade component uk 4202 are registered in the component property difference table 4200 (P4126: YES), the management program 432 terminates this related property group configuration search processing.

Figure 46:
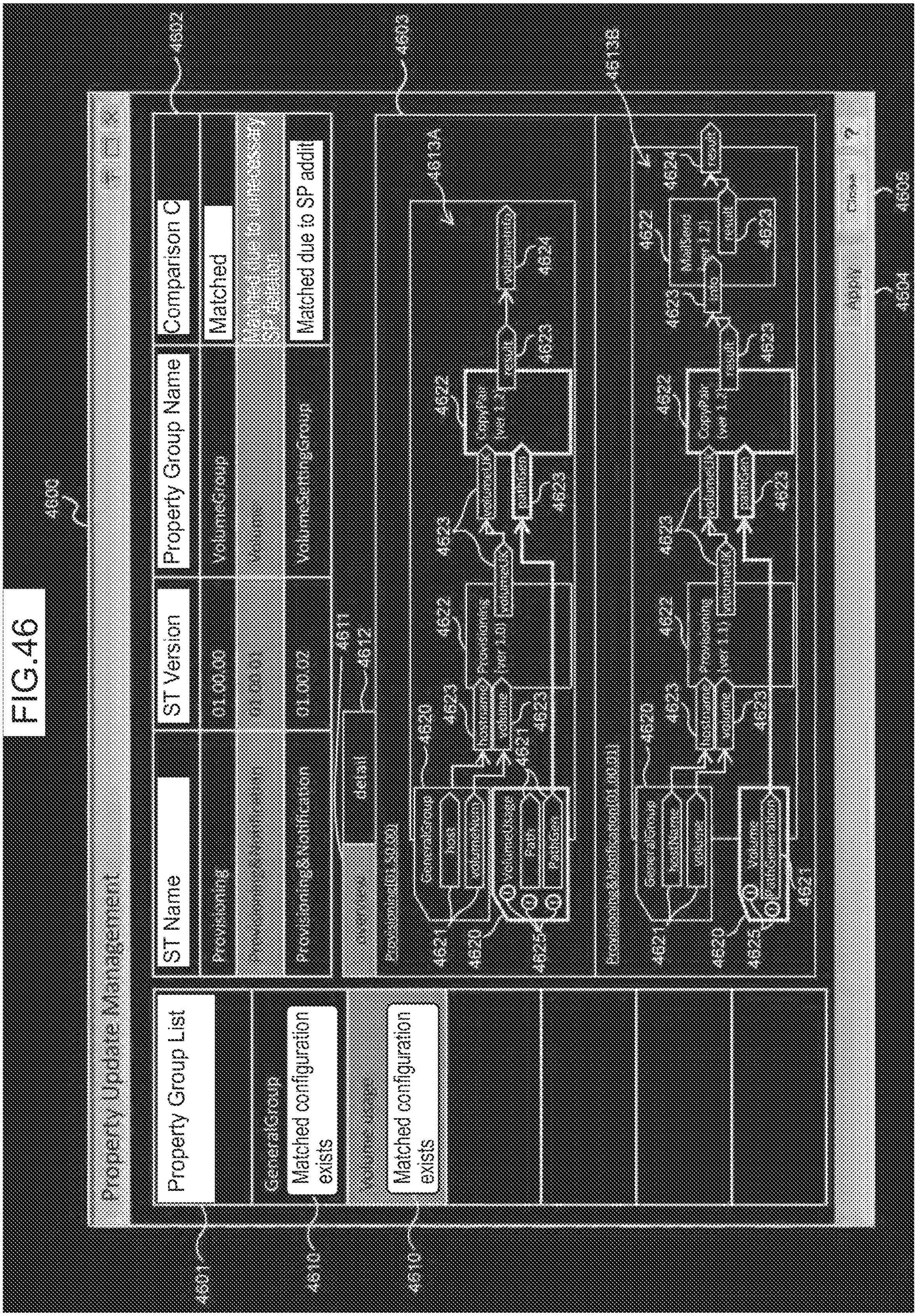
FIG. 46 illustrates the structure of a property group configuration search result screen.

FIG. 46 illustrates a structure example of a related property group configuration search result screen 4600 displayed on the management server 311 (FIG. 3) of the operation automation system 301 (FIG. 3) based on the processing result of the related property group configuration search processing after the termination of the related property group configuration search processing.

The related property group configuration search result screen 4600 includes a property group list plane 4601, a related target ST list plane 4602, a tab display plane 4603, an "Apply" button 4604, and a "Close" button 4605.

The property group list plane 4601 is where a list of property groups associated with components whose versions were upgraded as a result of the version upgrade of the designated ST is displayed. Furthermore, of these property groups, regarding a property group which has been successfully detected as being associated with another ST having the configuration which matches the "possible configuration as the post-reset configuration of the relevant property group as the result of the version update" by the aforementioned related property group configuration search processing (the completely matched configuration or the configuration which matches when the unnecessary ST property is deleted or the necessary ST property is added), information to that effect (for example, a character string 4610 reciting that "Matched configuration exists") is displayed by associating that information with the relevant property group.

Then, regarding the related property group configuration search result screen 4600, specified information about all ST's with which a desired property group is associated can be displayed in the related target ST list plane 4602 by clicking and selecting an area corresponding to the desired property group from among the property groups, regarding which the information indicating that the property group with the matched configuration has been successfully detected is displayed, in the property group list plane 4601.

Practically, under this circumstance, a list indicating the name of the relevant ST ("ST name"), its version ("ST version"), the name of a property group having the configuration which matches the configuration of the property group selected in the property group list plane 4601 ("property group name") among the property groups included in the relevant ST, and a matched configuration type (any one of "Completely Matched," "Matched due to unnecessary SP deletion," or "Matched due to necessary ST property addition") with respect to each corresponding ST is displayed in the related target ST list plane 4602.

Then, regarding the related property group configuration search result screen 4600, specified information about a desired ST can be displayed in the tab display plane 4603 in a state capable of comparing such specified information with the information about the designated ST, by clicking and selecting a row corresponding to the desired ST from among the ST's indicated in the related target ST list plane 4602.

Practically, either an outline tab 4611 or a details tab 4612 can be selectively displayed in the tab display plane 4603. Then, when the outline tab 4611 is selected, a schematic diagram 4613A illustrating the outline of the designated ST is displayed in an upper part of the outline tab 4611 and a similar schematic diagram 4613B about the ST selected in the related target ST list plane 4602 is displayed in a lower part of the outline tab 4611 in the tab display plane 4603 as illustrated in FIG. 46.

Incidentally, regarding these schematic diagrams 4613A, 4613B, icons 4620, each of which represents each property group in the relevant ST (the designated ST or the ST selected in the related target ST list plane), icons 4621, each of which represents the ST property belonging to these property groups, icons 4622, each of which represents each component associated with the ST, icons 4623, each of which represents he component property of these components, and icons 4624 which represent output of the relevant ST are displayed respectively; and objects which are associated with each other among these objects (the property groups, the ST properties, the components, and the component properties) are connected with arrows.

Furthermore, regarding these schematic diagrams 4613A, 4613B, the icon 4620 corresponding to the property group selected in the property group list plane 4601, the icon 4622 corresponding to the component whose version was upgraded by the version upgrade of the designated ST, the icon 4623 corresponding to the component property associated with any one of the ST properties belonging to the relevant property group among the component properties of the above-mentioned component, and the arrows connecting the relevant component properties and such ST properties are highlighted, for example, with bold lines or different colors from those of other parts.

Furthermore, regarding these schematic diagrams 4613A, 4613B, a warning mark 4625 indicating that there is a difference in set values between the designated ST and the ST selected in the related target ST list plane 4602 is displayed at a property group and an ST property which have such difference in the set values, from among the property group associated with the designated ST and the ST properties belonging to such property group, and the property group and ST properties which are associated with the ST selected in the related target ST list plane 4602.

Figure 47:
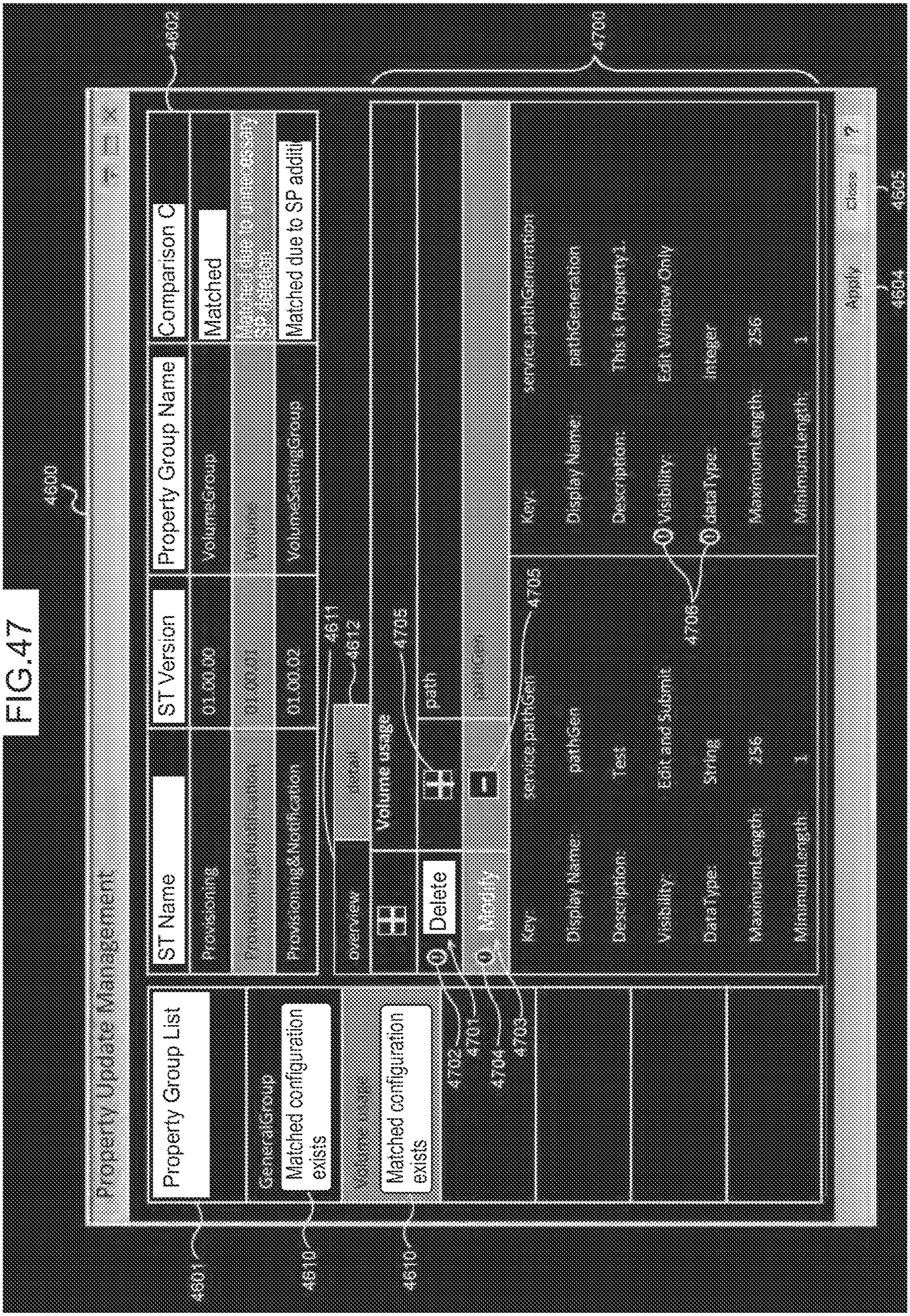
FIG. 47 illustrates the structure of the property group configuration search result screen.

Furthermore, when the details tab 4612 is selected, a list 4700 of ST properties which are associated with the property group selected in the property group list plane 4601 is displayed in the tab display plane 4603 as illustrated in FIG. 47. Then, regarding this list 4700, a character string 4701 reciting "Delete" and a warning mark 4702 are displayed in a row of the relevant ST property with respect to a designated ST property which exists in the designated ST, but does not exist in the ST selected in the related target ST list plane 4602; and a character string 4704 reciting "Modify" and a warning mark 4706 are displayed in a row of the relevant ST property with respect to an ST property which has a difference between a set value in the designated ST and a set value in the ST selected in the related target ST list plane 4602.

Furthermore, regarding such list 4700, an open/close button 4705 is displayed corresponding to each ST property indicated in the list 4700; and by clicking the open/close button 4705 corresponding to a desired ST property and causing a display state of the relevant open/close button to be changed to the display state "Open," set values of the respective items of the relevant ST property and set values of the respective items of the ST property of the ST selected in the related target ST list plane 4602 can be displayed in the state where these set values can be compared to each other. Specifically speaking, the set values of the respective items of the relevant ST property are displayed on the left side of the details tab 4612 and the set values of the respective items of the ST property of the ST selected in the related target ST list plane 4602 are displayed on the right side of the details tab 4612. Furthermore, under this circumstance, regarding any item whose value is different from the set value of the property of the designated ST, from among the set values of the respective items of the ST property of the ST selected in the related target ST list plane 4602 displayed on the right side of the details tab 4612, a warning mark 4706 is displayed corresponding to the relevant item.

Then, on the related property group configuration search result screen 4600, the setting content of the property group selected in the property group list plane 4601 for the designated ST can be updated to the setting content of the corresponding property group for the ST which is then selected in the related target ST list plane 4602, by clicking the "Apply" button 4604 in the state where the desired ST is selected in the related target ST list plane 4602. As a result, the operation to reset the properties of the necessary property group can be easily performed with respect to the designated ST after the version upgrade.

An embodiment has been explained above; however, this is for illustrative purposes only to explain the present invention and is not intended to limit the scope of the present invention to only this embodiment. The present invention can be also executed in other various embodiments.

For example, a custom UI may be applied to the ST version upgrade screen (for example, a version-designating UI in the Individual apply mode [for example, not a text field, but a pull-down menu]).

Furthermore, in the embodiment, a test is executed on an ST before the ST type is changed to "Release"; and if no problem is found, the ST type of that ST is changed to "Release" and editing of the ST corresponding to the ST type "Release" cannot be made thereafter. However, if any problem is found about the ST after its ST type is changed to "Release," a duplicate of the ST may be generated, the ST type corresponding to the duplicate of the ST may be set to "Debug," and the duplicate of the ST may be improved. Specifically speaking, even after the ST type is changed to "Release," improvements can be made by creating a duplicate of the relevant ST.

Furthermore, for example, during the ST version upgrade processing, the management program 432 does not necessarily have to perform replication of the designated ST in P3511, P3522, and P3533 and may perform replication of the designated ST before these steps (for example, before P3500). For example, as triggered by pressing of the "Update" button 2703 in FIG. 27, the management program 432 may create a duplicate of the designated ST and display the screen in FIG. 28 (after the duplicate of the designated ST is created, the management program 432 may accept the selection of either the "All apply" mode or the "Individual apply" mode).

INDUSTRIAL APPLICABILITY

The present invention can be applied to the management system for supporting automation of the system operation.

REFERENCE SIGNS LIST

301: operation automation system
310: computer system
311: management server
312: management client
411: processor
412: memory
414: port
432: management program
4600: related property group configuration search result screen

The invention claimed is:

1. A management system comprising:
an interface device connected to an operation target system including one or more operation target apparatuses:
a storage resource that stores a management program; and
a processor that creates or edits a template for operation automation, which is a service template associated with one or more components, by executing the management program,
wherein each property of the service template is included in one or more property groups and each property of the service template is associated with a component property, which is a property of each of the components associated with the service template,
wherein the processor:
(1) receives a version upgrade request which designates the service template;
(2) upgrades a version of a target component associated with the designated service template or a duplicate of the designated service template in response to the version upgrade request by replacing the target component with a different version of the target component;
(3) estimates each of all possible property group configurations as a post-reset configuration caused by the version upgrade of the target component with respect to each property group before resetting including one or more properties of the designated service template or the duplicate of the designated service template, which are associated with the version-upgraded target component, from among the property groups including one or more properties of the designated service template or the duplicate of the designated service template, wherein a configuration of each property group is a combination of a number of the properties of service templates belonging to the property group and the component property to which each of the properties of service templates is associated;
(4) searches for a property group having any of the estimated configurations from among property groups formed that include more properties of a service template other than the designated service template or the duplicate of the designated service template; and
(5) displays setting content of the property group detected by the search.

2. The management system according to claim 1,
wherein in the processor estimates the number of the properties of service templates belonging to the property group and a component property of a component associated with each of the properties of service templates as a possible property group configuration as the post-reset configuration caused by the version upgrade of the target component of each property group including the properties of service templates associated with the version-upgraded target component.

3. The management system according to claim 1,
wherein in the processor displays setting content of each of the properties of service templates belonging to the property group detected in.

4. The management system according to claim 3,
wherein in the processor displays the setting content of the properties of service templates belonging to the property group detected in the fourth step in a state where such setting content can be compared with setting content of the corresponding properties of service templates of the corresponding property group of the designated service template or the duplicate of the designated service template.

5. The management system according to claim 1,
wherein the processor updates the setting content of the properties associated with the version-upgraded target component of the designated service template or the duplicate of the designated service template to the setting content of the corresponding properties of service templates of the corresponding property group detected in response to a specified operation input.

6. A management method executed in a management system for managing an operation target system including one or more operation target apparatuses, the management system including:
an interface device connected to the operation target system:
a storage resource that stores a management program; and
a processor that creates or edits a template for operation automation, which is a service template associated with one or more components, by executing the management program,
wherein each property of the service template is included in one or more property groups and each property of the service template is associated with a component property, which is a property of each of the components associated with the service template,
the management method comprising:
a first step executed by the processor receiving a version upgrade request which designates the service template;
a second step executed by the processor upgrading a version of a target component associated with the designated service template or a duplicate of the designated service template in response to the version upgrade request by replacing the target component with a different version of the target component;
a third step executed by the processor estimating each of all possible property group configurations as a post-reset configuration caused by the version upgrade of the target component with respect to each property group before resetting including one or more properties of the designated service template or the duplicate of the designated service template, which are associated with the version-upgraded target component, from among the property groups including one or more properties of the designated service template or the duplicate of the designated service template, wherein a configuration of each property group is a combination of a number of the properties of service templates belonging to the property group and the component property to which each of the properties of service templates is associated;

a fourth step executed by the processor searching for a property group having any of the estimated configurations from among property groups that include one or more properties of a service template other than the designated service template or the duplicate of the designated service template; and a fifth step executed by the processor displaying setting content of the property group detected by the search.

7. The management method according to claim 6, wherein in the third step, the processor estimates the number of the properties of service templates belonging to the property group and a component property of a component associated with each of the properties of service templates as a possible property group configuration as the post-reset configuration caused by the version upgrade of the target component of each property group including the properties of service templates associated with the version-upgraded target component.

8. The management method according to claim 6, wherein in the fifth step, the processor displays setting content of each of the properties of service templates belonging to the property group detected in the fourth step.

9. The management method according to claim 8, wherein in the fifth step, the processor displays the setting content of the properties of service templates belonging to the property group detected in the fourth step in a state where such setting content can be compared with setting content of the corresponding properties of service templates of the corresponding property group of the designated service template or the duplicate of the designated service template.

10. The management method according to claim 6, further comprising:

a sixth step of the processor updates the setting content of the properties associated with the version-upgraded target component of the designated service template or the duplicate of the designated service template to the setting content of the corresponding properties of service templates of the corresponding property group detected in response to a specified operation input.

* * * * *